United States Patent
Mejegård et al.

(10) Patent No.: US 10,380,511 B2
(45) Date of Patent: Aug. 13, 2019

(54) OUTDOOR POWER EQUIPMENT FLEET MANAGEMENT SYSTEM WITH OPERATOR PERFORMANCE MONITORING

(71) Applicant: Husqvarna AB, Huskvarna (SE)

(72) Inventors: Peter Mejegård, Jönköping (SE); Per Wahlström, Mölnlycke (SE); Stefan Holmberg, Huskvarna (SE); Gary Philpott, Gloucester (GB); Håkan Wahlgren, Huskvarna (SE)

(73) Assignee: HUSQVARNA AB, Huskvarna (SE)

( * ) Notice: Subject to any disclaimer, the term of this patent is extended or adjusted under 35 U.S.C. 154(b) by 1375 days.

(21) Appl. No.: 14/383,653

(22) PCT Filed: Mar. 8, 2013

(86) PCT No.: PCT/US2013/030014
§ 371 (c)(1),
(2) Date: Sep. 8, 2014

(87) PCT Pub. No.: WO2013/134715
PCT Pub. Date: Sep. 12, 2013

(65) Prior Publication Data
US 2015/0081359 A1  Mar. 19, 2015

Related U.S. Application Data

(60) Provisional application No. 61/608,516, filed on Mar. 8, 2012.

(51) Int. Cl.
*G06Q 10/06*  (2012.01)
*G01M 99/00*  (2011.01)
(Continued)

(52) U.S. Cl.
CPC ......... *G06Q 10/0631* (2013.01); *B60W 40/08* (2013.01); *B60W 40/09* (2013.01);
(Continued)

(58) Field of Classification Search
CPC ..................................................... G06Q 10/06
(Continued)

(56) References Cited

U.S. PATENT DOCUMENTS 3,568,161 A  3/1971  Knickel
3,942,113 A  3/1976  Wilson
(Continued)

FOREIGN PATENT DOCUMENTS

CN  101477188 A  7/2009
CN  201560802 U  8/2010
(Continued)

OTHER PUBLICATIONS

International Search Report and Written Opinion in the International patent application No. PCT/SE2010/050927 dated Dec. 23, 2010.
(Continued)

*Primary Examiner* — Nadja N Chong Cruz
(74) *Attorney, Agent, or Firm* — Burr Forman McNair

(57) ABSTRACT

Embodiments of the invention are directed to a fleet management system that assists a fleet, such as a landscaping crew, forestry company, grounds care manager, or the like, with management and monitoring the fleet's collection of outdoor power equipment, like lawn mowers, trimmers, chainsaws, and/or the like, and the operators of the outdoor power equipment. In this regard, embodiments of the invention are directed to systems and methods for automatically gathering data about one or more pieces of outdoor power equipment and one or more human operators of the equipment, processing the data into more useful data and data formats, and providing useful feedback, data, and tools to users of the system to assist with management of one or more fleets.

18 Claims, 35 Drawing Sheets

(51) Int. Cl.

| | | |
|---|---|---|
| *G01P 3/00* | (2006.01) | |
| *B60W 40/08* | (2012.01) | |
| *B60W 40/09* | (2012.01) | |
| *B60W 50/14* | (2012.01) | |
| *G01C 21/34* | (2006.01) | |
| *G07C 5/00* | (2006.01) | |
| *G07C 5/08* | (2006.01) | |
| *H04W 64/00* | (2009.01) | |
| *H04W 4/80* | (2018.01) | |

(52) U.S. Cl.
CPC .............. *B60W 50/14* (2013.01); *G01C 21/34* (2013.01); *G01M 99/00* (2013.01); *G01M 99/008* (2013.01); *G01P 3/00* (2013.01); *G06Q 10/06* (2013.01); *G06Q 10/0639* (2013.01); *G06Q 10/06312* (2013.01); *G06Q 10/06398* (2013.01); *G07C 5/008* (2013.01); *G07C 5/0816* (2013.01); *G07C 5/0841* (2013.01); *H04W 4/80* (2018.02); *H04W 64/00* (2013.01)

(58) Field of Classification Search
USPC ........................................................ 705/7.12
See application file for complete search history.

(56) References Cited

U.S. PATENT DOCUMENTS

| | | | |
|---|---|---|---|
| 4,608,954 A | 9/1986 | Gray | |
| 4,945,759 A | 8/1990 | Krofchalk et al. | |
| 5,074,144 A | 12/1991 | Krofchalk et al. | |
| 5,205,161 A | 4/1993 | Erwin | |
| 5,212,635 A | 5/1993 | Ferriter | |
| 5,218,367 A | 6/1993 | Sheffer et al. | |
| 5,337,003 A | 8/1994 | Carmichael et al. | |
| 5,369,344 A | 11/1994 | Mezzatesta, Jr. et al. | |
| 5,577,485 A | 11/1996 | Lindsley | |
| 5,617,819 A | 4/1997 | Dery et al. | |
| 5,808,907 A | 9/1998 | Shetty et al. | |
| 5,904,727 A | 5/1999 | Prabhakaran | |
| 6,108,591 A | 8/2000 | Segal et al. | |
| 6,112,152 A | 8/2000 | Tuttle | |
| 6,127,752 A | 10/2000 | Wiesler | |
| 6,253,129 B1 | 6/2001 | Jenkins et al. | |
| 6,275,765 B1 | 8/2001 | Divljakovic et al. | |
| 6,292,724 B1 | 9/2001 | Apsell et al. | |
| 6,339,745 B1 | 1/2002 | Novik | |
| 6,609,357 B1 * | 8/2003 | Davis .................. | A01D 34/006 56/10.2 A |
| 6,622,083 B1 | 9/2003 | Knockeart et al. | |
| 6,879,910 B2 | 4/2005 | Shike et al. | |
| 6,965,876 B2 | 11/2005 | Dabbiere | |
| 7,005,997 B1 | 2/2006 | Wiewiura | |
| 7,086,096 B1 | 8/2006 | Montero | |
| 7,113,839 B2 * | 9/2006 | Ferguson ............. | G07C 5/0808 700/111 |
| 7,191,097 B1 | 3/2007 | Lee et al. | |
| 7,228,211 B1 | 6/2007 | Lowrey et al. | |
| 7,298,258 B1 | 11/2007 | Hudgens et al. | |
| 7,389,178 B2 | 6/2008 | Raz et al. | |
| 7,406,399 B2 | 7/2008 | Furem et al. | |
| 7,457,693 B2 | 11/2008 | Olsen et al. | |
| 7,512,156 B2 | 3/2009 | Beronja | |
| 7,512,477 B2 | 3/2009 | Quigley et al. | |
| 7,561,054 B2 | 7/2009 | Raz et al. | |
| 7,714,705 B2 | 5/2010 | Rennie et al. | |
| 7,715,961 B1 | 5/2010 | Kargupta | |
| 7,725,216 B2 | 5/2010 | Kim | |
| 7,783,507 B2 | 8/2010 | Schick et al. | |
| 7,904,219 B1 | 3/2011 | Lowrey et al. | |
| 8,055,403 B2 | 11/2011 | Lowrey et al. | |
| 8,060,400 B2 | 11/2011 | Wellman | |
| 8,306,731 B2 | 11/2012 | Waggaman, III | |
| 8,315,802 B2 | 11/2012 | Brown | |
| 8,370,225 B2 | 2/2013 | Davis, Jr. et al. | |
| 8,405,384 B1 | 3/2013 | Antoine et al. | |
| 8,416,067 B2 | 4/2013 | Davidson et al. | |
| 8,554,468 B1 | 10/2013 | Bullock | |
| 8,561,921 B1 | 10/2013 | Showman et al. | |
| 8,825,269 B2 | 9/2014 | Schnelle et al. | |
| 9,129,233 B2 | 9/2015 | Moughler et al. | |
| 9,373,203 B1 | 6/2016 | Fields et al. | |
| 2001/0018628 A1 | 8/2001 | Jenkins et al. | |
| 2001/0032195 A1 | 10/2001 | Graichen et al. | |
| 2002/0089434 A1 | 7/2002 | Ghazarian | |
| 2002/0123340 A1 | 9/2002 | Park | |
| 2002/0167519 A1 | 11/2002 | Olsen | |
| 2003/0069648 A1 | 4/2003 | Douglas et al. | |
| 2003/0093188 A1 | 5/2003 | Morita et al. | |
| 2003/0149607 A1 | 8/2003 | Ogasawara et al. | |
| 2004/0049524 A1 | 3/2004 | Toyota et al. | |
| 2004/0129662 A1 | 7/2004 | Baker | |
| 2004/0236474 A1 | 11/2004 | Chowdhary et al. | |
| 2004/0254698 A1 | 12/2004 | Hubbard et al. | |
| 2005/0035659 A1 | 2/2005 | Hahn et al. | |
| 2005/0053447 A1 | 3/2005 | Bucher et al. | |
| 2005/0121005 A1 | 6/2005 | Edwards | |
| 2005/0162253 A1 | 7/2005 | Wilson et al. | |
| 2005/0192722 A1 | 9/2005 | Noguchi | |
| 2005/0209814 A1 * | 9/2005 | Song ....................... | G01P 3/44 702/145 |
| 2005/0213776 A1 | 9/2005 | Honji et al. | |
| 2005/0267713 A1 * | 12/2005 | Horkavi .................. | G07C 5/008 702/188 |
| 2005/0278055 A1 | 12/2005 | Ferguson et al. | |
| 2006/0006991 A1 | 1/2006 | Tyndall et al. | |
| 2006/0017430 A1 | 1/2006 | Hagan | |
| 2006/0055564 A1 | 3/2006 | Olsen et al. | |
| 2006/0087443 A1 | 4/2006 | Frederick et al. | |
| 2006/0161315 A1 | 7/2006 | Lewis et al. | |
| 2006/0179473 A1 | 8/2006 | Innami et al. | |
| 2006/0200008 A1 | 9/2006 | Moore-Ede | |
| 2006/0208879 A1 | 9/2006 | Bratkovski | |
| 2006/0244632 A1 | 11/2006 | Corcoran, III | |
| 2007/0038354 A1 | 2/2007 | Kang | |
| 2007/0055766 A1 | 3/2007 | Petropoulakis et al. | |
| 2007/0145109 A1 | 6/2007 | Dawson | |
| 2007/0150073 A1 | 6/2007 | Dawson | |
| 2007/0161456 A1 | 7/2007 | Kato et al. | |
| 2007/0175447 A1 | 8/2007 | Begg et al. | |
| 2007/0203625 A1 | 8/2007 | Quigley et al. | |
| 2007/0241862 A1 | 10/2007 | Dimig et al. | |
| 2007/0247789 A1 | 10/2007 | Benson et al. | |
| 2007/0268128 A1 | 11/2007 | Swanson et al. | |
| 2007/0285256 A1 | 12/2007 | Batra | |
| 2008/0018472 A1 | 1/2008 | Dasilva et al. | |
| 2008/0149081 A1 | 6/2008 | Allain | |
| 2008/0177646 A1 | 7/2008 | Frink | |
| 2008/0201108 A1 | 8/2008 | Furem et al. | |
| 2008/0250259 A1 * | 10/2008 | Kraft .................... | E02F 9/2246 713/323 |
| 2008/0252446 A1 | 10/2008 | Dammertz | |
| 2008/0255722 A1 | 10/2008 | McClellan et al. | |
| 2008/0266110 A1 | 10/2008 | Hayford et al. | |
| 2008/0269978 A1 | 10/2008 | Shirole et al. | |
| 2008/0270074 A1 | 10/2008 | Horkavi et al. | |
| 2008/0319602 A1 | 12/2008 | McClellan et al. | |
| 2009/0015410 A1 | 1/2009 | Puzio et al. | |
| 2009/0088924 A1 | 4/2009 | Coffee et al. | |
| 2009/0128356 A1 | 5/2009 | Nitta et al. | |
| 2009/0133482 A1 * | 5/2009 | Iwata ..................... | F02P 17/02 73/114.63 |
| 2009/0198422 A1 * | 8/2009 | Vik ........................ | G07C 5/008 701/50 |
| 2009/0210257 A1 | 8/2009 | Chalfant et al. | |
| 2009/0249892 A1 | 10/2009 | Raymond et al. | |
| 2009/0273436 A1 | 11/2009 | Gluck et al. | |
| 2009/0306839 A1 | 12/2009 | Youngquist et al. | |
| 2009/0312919 A1 | 12/2009 | Foster et al. | |
| 2009/0318121 A1 | 12/2009 | Marumoto | |
| 2010/0042297 A1 | 2/2010 | Foster et al. | |
| 2010/0070145 A1 | 3/2010 | Foster et al. | |
| 2010/0131304 A1 | 5/2010 | Collopy et al. | |

(56) References Cited

U.S. PATENT DOCUMENTS

| | | |
|---|---|---|
| 2010/0158051 A1 | 6/2010 | Hadzic et al. |
| 2010/0161175 A1 | 6/2010 | Yamada et al. |
| 2010/0214121 A1 | 8/2010 | Puro et al. |
| 2010/0289744 A1 | 11/2010 | Cohen |
| 2010/0332294 A1 | 12/2010 | Geis et al. |
| 2011/0046832 A1 | 2/2011 | Francoeur |
| 2011/0050421 A1 | 3/2011 | Duron et al. |
| 2011/0095215 A1 | 4/2011 | Larsson et al. |
| 2011/0115629 A1 | 5/2011 | Holler et al. |
| 2011/0131269 A1 | 6/2011 | Gilleland et al. |
| 2011/0161138 A1 | 6/2011 | Keaveny et al. |
| 2011/0184784 A1 | 7/2011 | Rudow et al. |
| 2011/0248821 A1 | 10/2011 | Merten |
| 2011/0282564 A1 | 11/2011 | Park et al. |
| 2012/0046981 A1 | 2/2012 | Wellman |
| 2012/0081123 A1 | 4/2012 | Thompson et al. |
| 2012/0253888 A1 | 10/2012 | Davidson |
| 2013/0335221 A1 | 12/2013 | Prieto |
| 2013/0338886 A1 | 12/2013 | Callea et al. |
| 2014/0244098 A1 | 8/2014 | Ueda et al. |
| 2015/0066557 A1 | 3/2015 | Lichti |

FOREIGN PATENT DOCUMENTS

| | | |
|---|---|---|
| DE | 102004062641 A1 | 7/2006 |
| EP | 2221757 A1 | 8/2010 |
| KR | 20020016277 A | 3/2002 |
| WO | 8603902 A1 | 7/1986 |
| WO | 9938124 A1 | 7/1999 |
| WO | 156204 A1 | 8/2001 |
| WO | 161216 A2 | 8/2001 |
| WO | 2008143532 A1 | 11/2008 |

OTHER PUBLICATIONS

International Search Report and Written Opinion in the International patent application No. PCT/US2013/029808 dated May 14, 2013.
International Search Report and Written Opinion in the International patent application No. PCT/US2013/029817 dated May 21, 2013.
International Search Report and Written Opinion in the International patent application No. PCT/US2013/030023 dated May 28, 2013.
International Search Report and Written Opinion in the International patent application No. PCT/US2013/030004 dated May 28, 2013.
International Search Report and Written Opinion in the International patent application No. PCT/US2013/030014 dated Jun. 25, 2013.
International Search Report and Written Opinion in the International patent application No. PCT/US2013/030018 dated Jul. 12, 2013.
Liu, Z., et al., "A Wireless Sensor Network Based Personnel Positioning Scheme in Coal Mines with Blind Areas," Sensors (Basel), vol. 10, Issue 11, pp. 9891-9918, Nov. 3, 2010.
"Wi-Fi Location: Let's Play Tag—Here's how to use your WLAN to track high-dollar assets and ensure tight security", accessed at http://sip-trunking.tmcnet.com/news/2007/08/20/2874582.htm, Aug. 20, 2007, pp. 3.

* cited by examiner

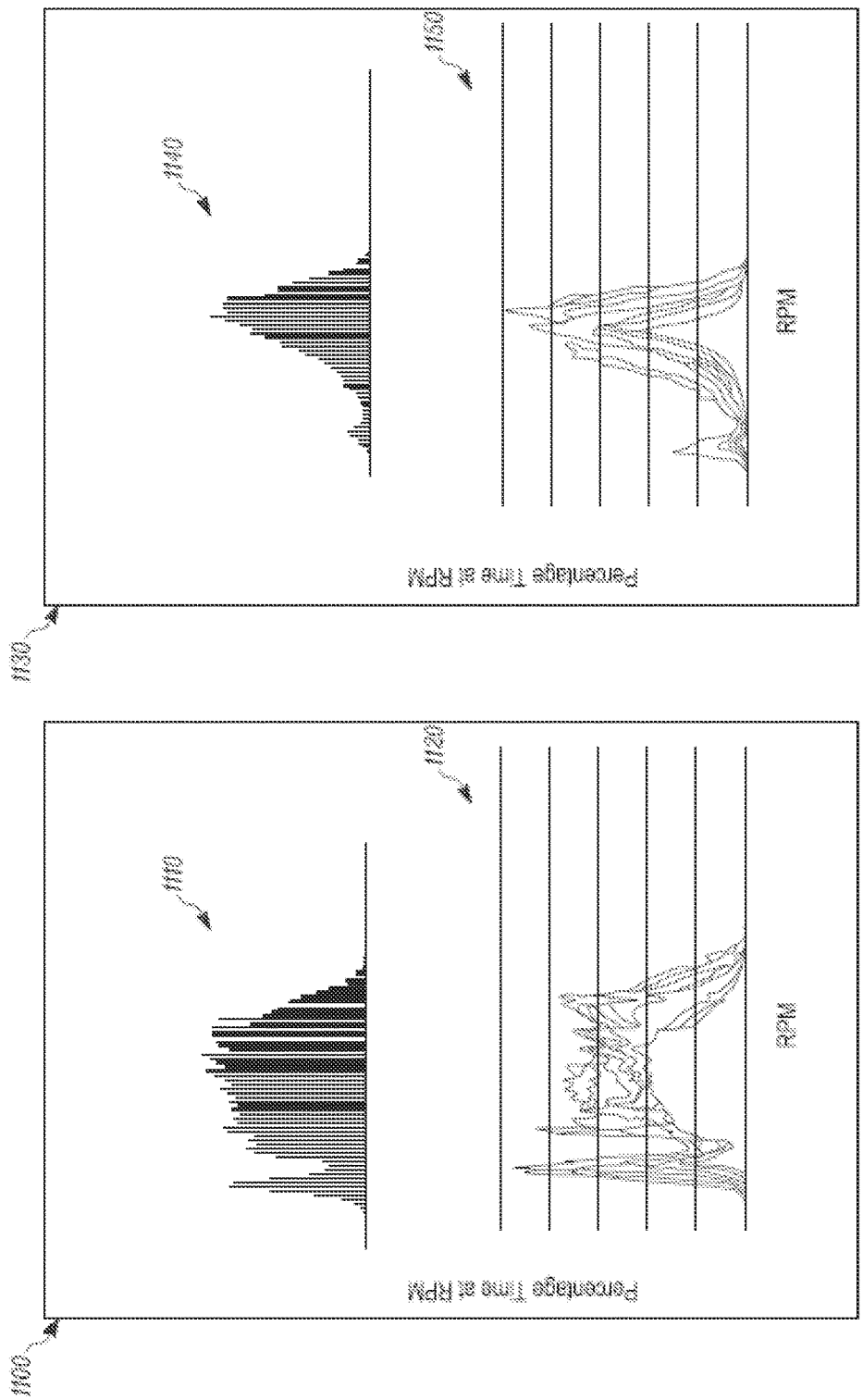

*FIG. 18*

Tabs: Summary | Work day log | Handling | Service plan | Service history | Register service 1800 (figure), 1802, 1804, 1806, 1808 (callouts)

| Description | 200 Hrs | 400 Hrs | 600 Hrs | 800 Hrs | 1000 Hrs | 1200 Hrs | 1400 Hrs | 1600 Hrs | 1800 Hrs | 2000 Hrs |
|---|---|---|---|---|---|---|---|---|---|---|
| Starter system | | | | | | | | | | |
| Remote starter | : | : | : | : | : | : | : | : | : | : |
| Recoil spring | Verify | Replace | Verify | Replace | Verify | Replace | Verify | Replace | Verify | Replace |
| Starter rope | Verify | Replace | Verify | Replace | Verify | Replace | Verify | Replace | Verify | Replace |
| Starter pulley | Verify | Verify | Verify | Verify | Verify | Verify | Verify | Verify | Verify | Verify |
| Starter housing | Verify | Verify | Verify | Verify | Verify | Verify | Verify | Verify | Verify | Verify |
| Starter pawls | Verify | Verify | Verify | Verify | Verify | Verify | Verify | Verify | Verify | Verify |
| Engine | | | | | | | | | | |
| Cooling flanges | Clean | Clean | Clean | Clean | Clean | Clean | Clean | Clean | Clean | Clean |
| Spark plug | Clean and adjust | Replace | Clean and adjust | Replace | Clean and adjust | Replace | Clean and adjust | Replace | Clean and adjust | Replace |
| Muffler | Clean and inspect | Clean and inspect | Clean and inspect | Clean and inspect | Clean and inspect | Clean and inspect | Clean and inspect | Clean and inspect | Clean and inspect | Clean and inspect |
| Spark arrestor screen | Replace | Replace | Replace | Replace | Replace | Replace | Replace | Replace | Replace | Replace |
| Catalytic converter* | Inspect | Inspect | Inspect | Inspect | Inspect | Inspect | Inspect | Inspect | Inspect | Inspect |
| Exhaust port (muffler and cylinder) | Clean | Clean | Clean | Clean | Clean | Clean | Clean | Clean | Clean | Clean |
| Piston | Verify | Verify | Verify | Verify | Verify | Verify | Verify | Verify | Verify | Verify |
| Fuel system | | | | | | | | | | |
| Airfilter | Replace | Replace | Replace | Replace | Replace | Replace | Replace | Replace | Replace | Replace |
| Throttle cable nipple | Inspect | Inspect | Inspect | Inspect | Inspect | Inspect | Inspect | Inspect | Inspect | Inspect |
| Fuel filter | Inspect | Replace | Inspect | Replace | Inspect | Replace | Inspect | Replace | Inspect | Replace |
| Fuel hoses / purge | Inspect | Inspect | Inspect | Inspect | Inspect | Inspect | Inspect | Inspect | Inspect | Inspect |
| Valve housing | Inspect | Inspect | Inspect | Inspect | Inspect | Pressure test | Inspect | Pressure test | Inspect | Pressure test |
| Fuel tank | Inspect | Pressure test | Inspect | Pressure test | Inspect | Pressure test | Inspect | Pressure test | Inspect | Pressure test |
| Tank cap | Inspect | Inspect | Inspect | Inspect | Inspect | Inspect | Inspect | Inspect | Inspect | Inspect |

| Summary | Work day log | Handling | Service plan | Serv |

Team 1 545RX #1

Common information

Please fill out the basic details of this service event. The pre-entered number of engine hours is gathered from the last time machine came into contact with the base station Service interval
[ 200 hours ◁▷ ] ← *2012*

Engine hours
[ 198 ] ← *2014*

Service Date
[ 2011-03-28 ] ← *2016*

( Previous ) ( Next )—*2018*

OUTDOOR POWER EQUIPMENT FLEET MANAGEMENT SYSTEM WITH OPERATOR PERFORMANCE MONITORING

BACKGROUND

Outdoor power equipment is widely used for performing maintenance operations and modifications of land areas, including landscaping, forest care, lawn mowing, etc. Examples of such equipment include string trimmers, brush cutters, chain saws, blowers, aerators, spreaders, sprinklers, edgers, dethatchers, riding lawn mowers, walk behind lawn mowers, robotic lawn mowers, other cutting machines, etc. Usually the equipment is operated and controlled by an operator performing various actions in the area being worked and, in many situations, particularly in cases of professional use, at least two operators are working together in the same land area. In cases of large scale maintenance work with a fleet comprising multiple operators, e.g., as in landscaping industries, it may be difficult to keep track of the many operators and machines involved in a maintenance operation. Likewise it may be complicated to keep informed about the status of individual machines that are part of the fleet. This can lead to a situation where it is more or less impossible to be updated on the general performance of a machine fleet (e.g., how the different machines have been handled, the amount of working hours, performance, efficiency, etc.) and it may also become difficult to know the operational status (e.g., repairs, maintenance, cost of operation) of individual machines. This may cause additional costs related to repairs and downtime.

Another challenge related to fleet management is the amount of turnover of workers and the frequency with which inexperienced newcomers are placed in charge of a machine. Often there is a start-up period during which a beginner will be relatively inefficient. It may be difficult to monitor the beginner and provide the beginner or even other workers with detailed feedback regarding technique and machine operation simply because it is very inefficient to keep a constant watch during progressing working operation. Even after finishing an activity, it may be hard to provide constructive advice. Therefore worker training often takes much longer than desired. This may lead to inefficient and unsafe use of the machine, increased emission and fuel consumption, and increased wear and tear on the equipment.

Large-scale maintenance work such as landscaping, foresting, and ground care often involves a number of operators working in parallel leading to a very dynamic and continuously changing operative situation. Such a situation can easily get complex and may even involve a safety risk. For example, when several persons are spread out in an area it may be difficult for the individual person to keep track of surrounding co-workers due to characteristics of the landscape, noise levels, and reduced visibility. Under these conditions, two or more operators may accidentally get too close and interfere with each other's work. This could lead to damage to the equipment and, in a worst case scenario, injury to the personnel.

SUMMARY OF SOME EMBODIMENTS OF THE INVENTION

Some embodiments of the present invention provide a fleet management system which is cost efficient, intuitive and easy to implement, and which is suitable for a dynamic fleet comprising often a plurality of operators handling a plurality of powered machines, such as in the case of professional grounds care, landscaping, forest work, etc. It is, therefore, an object of some embodiments of the invention to provide a system that assists with collection of informative data related to the running of individual powered machines, and to use this collected data to evaluate the performance and status of the machine. It is a further object of some embodiments of the invention to provide a quick, efficient, and automated way of pairing a specific machine to a specific operator who has been running the machine, thereby being able to match the performance of the machine to the behavior of a specific operator and evaluate the operator's performance, e.g. for training purposes. It is a further object of some embodiments of the invention to provide a fleet management system for monitoring a fleet comprising a plurality of operators handling a plurality of powered machines, where the fleet management system provides a situational awareness regarding productivity, efficiency, health, safety, service status, quality, location, etc., of the fleet including the fleet's equipment, operators, teams, customers, jobs, etc. Another object of some embodiments of the invention includes achieving one or more of the above objects in a more cost effective manner. Other objects of various embodiments of the invention will become clear from the following description and drawings.

BRIEF DESCRIPTION OF THE DRAWINGS

Figure 1:
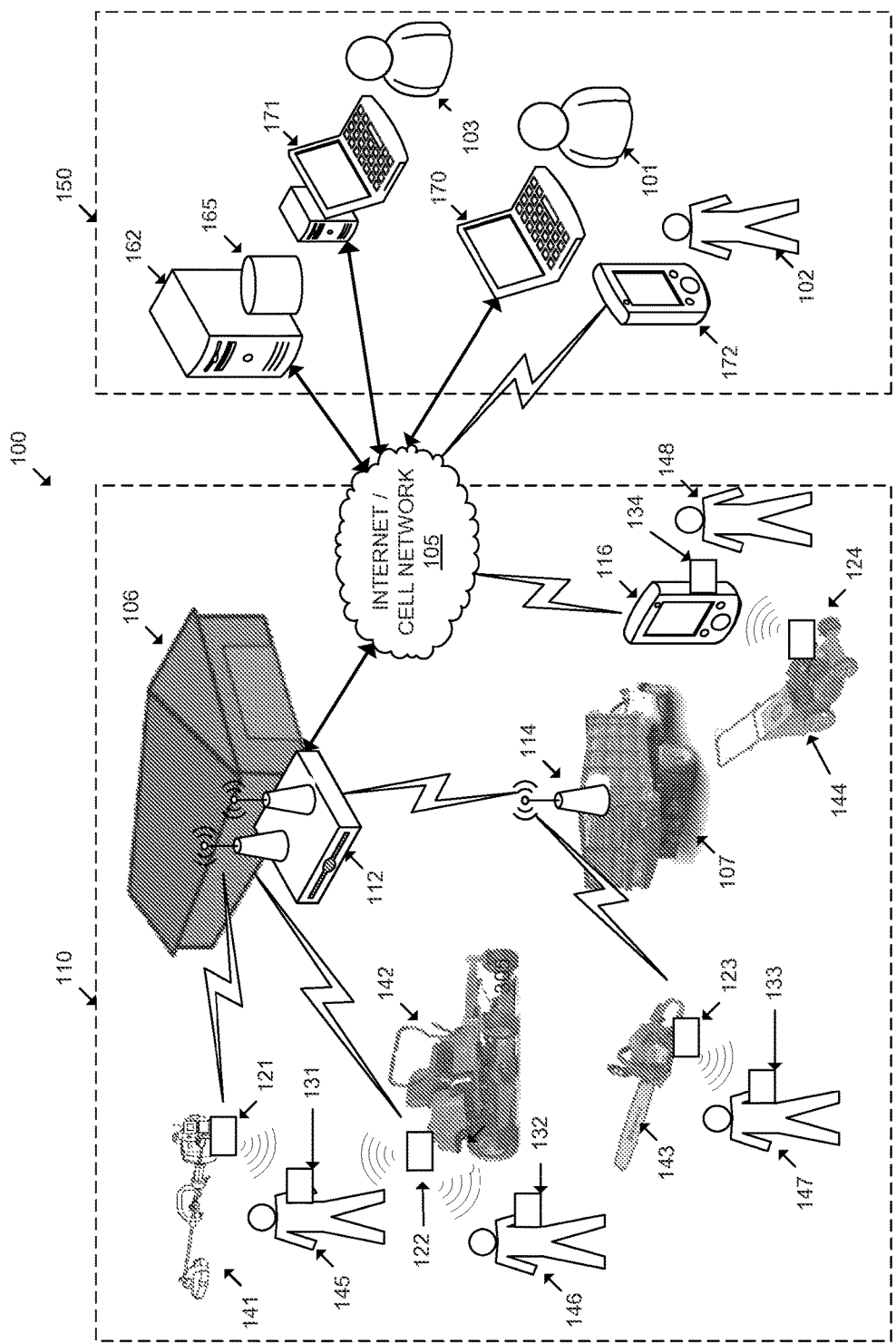
Figure 2A:
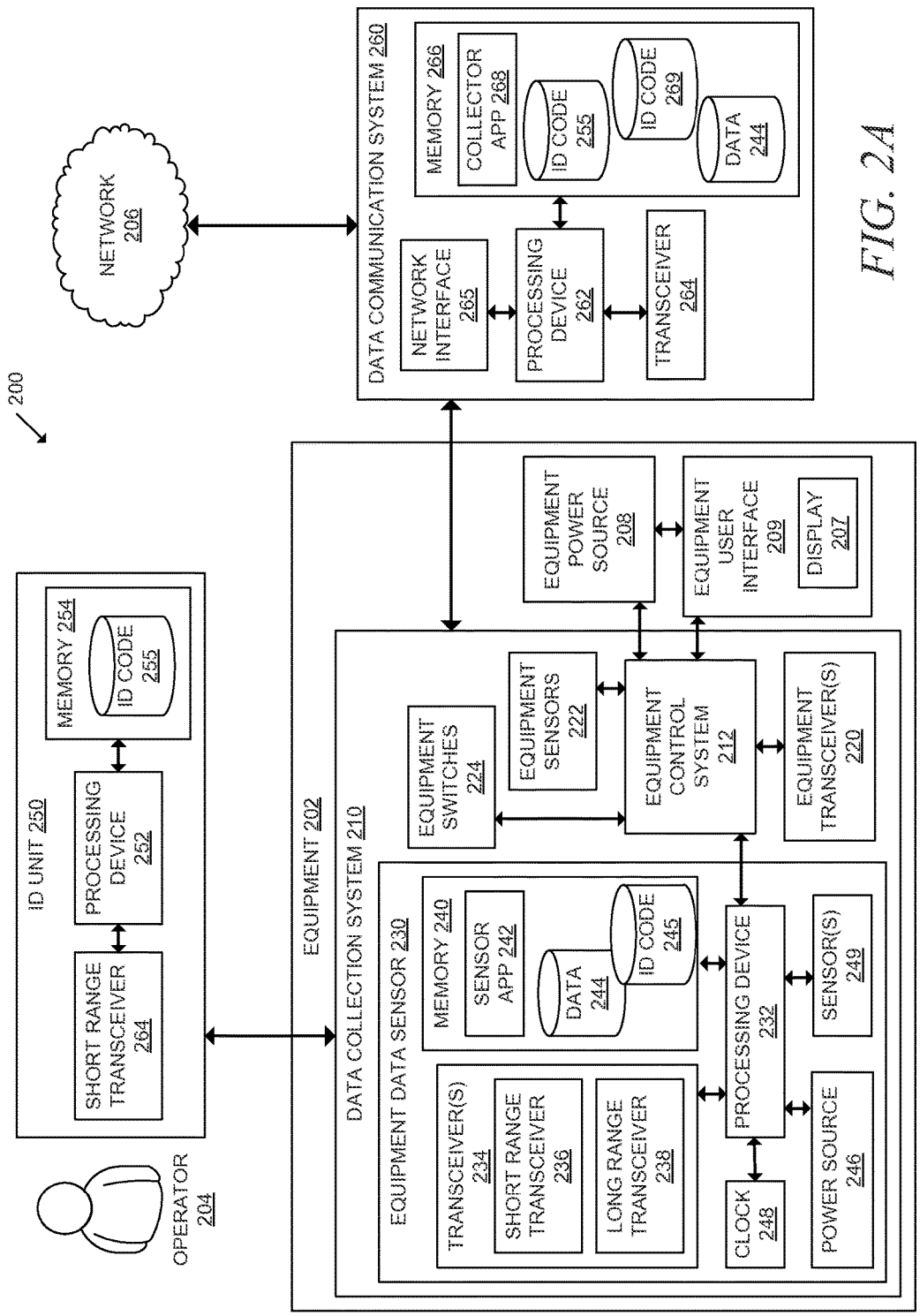
Figure 2B:
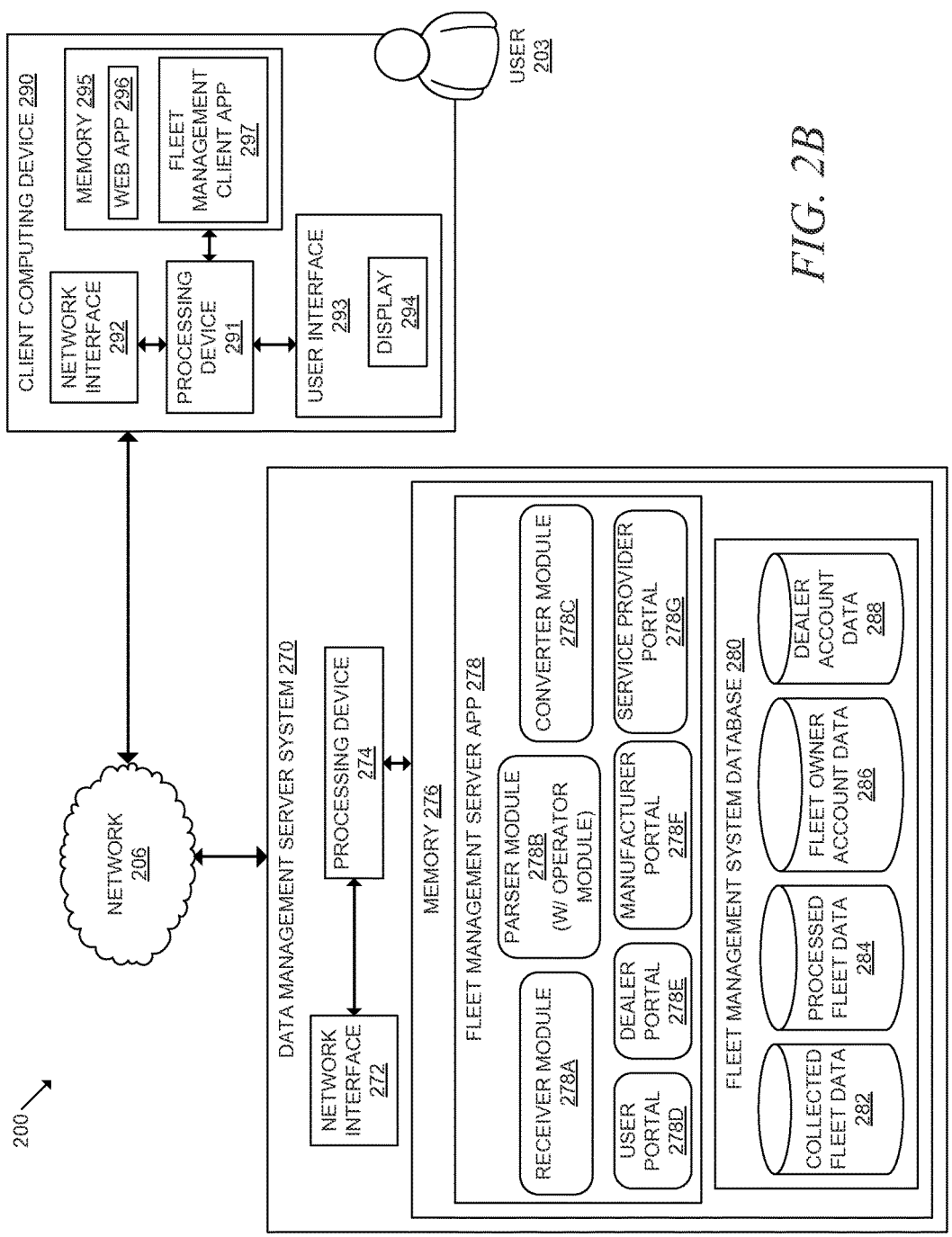
Figure 3A:
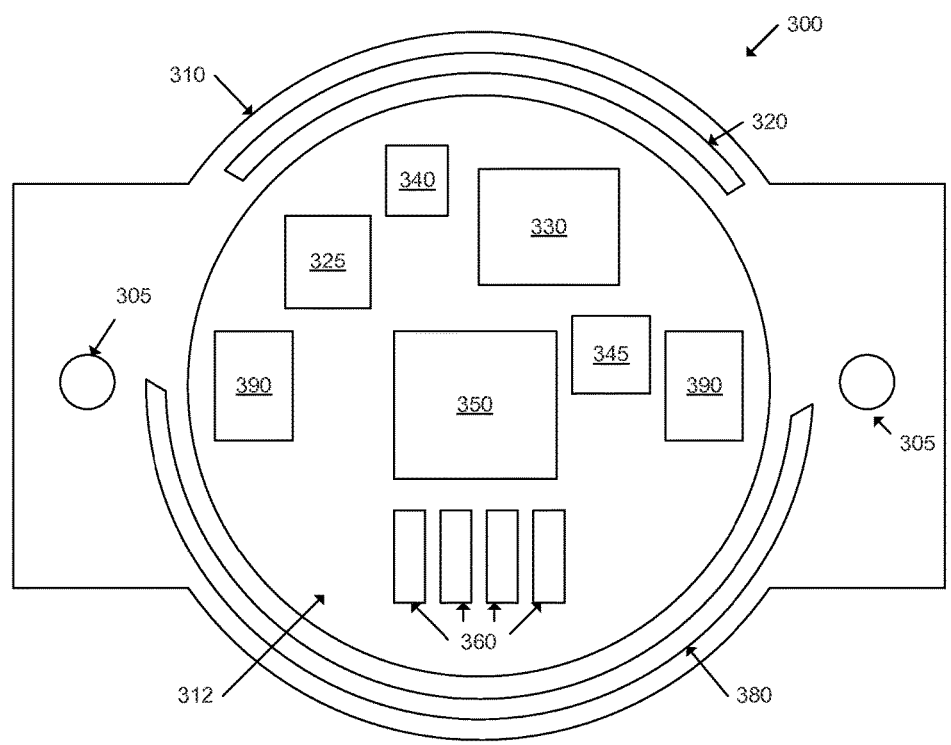
Figure 3B:
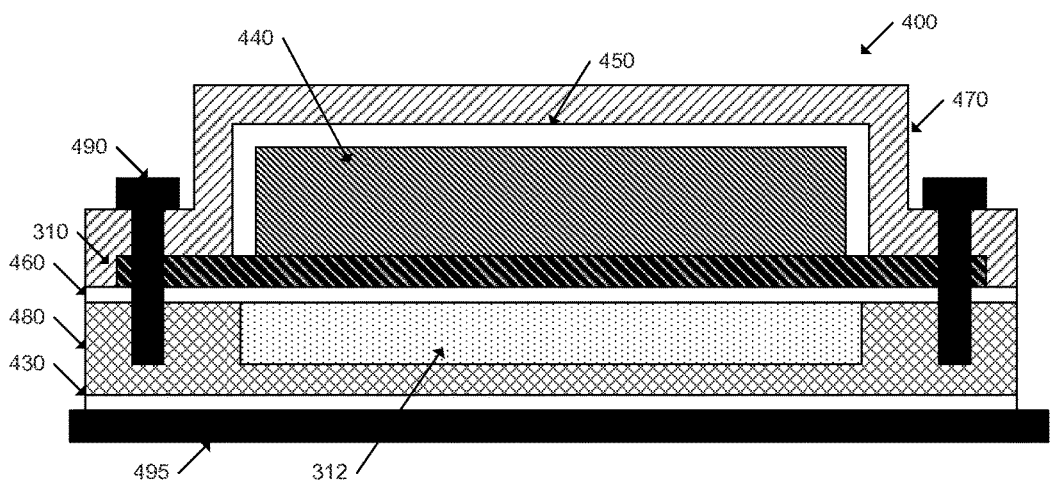
Figure 4A:
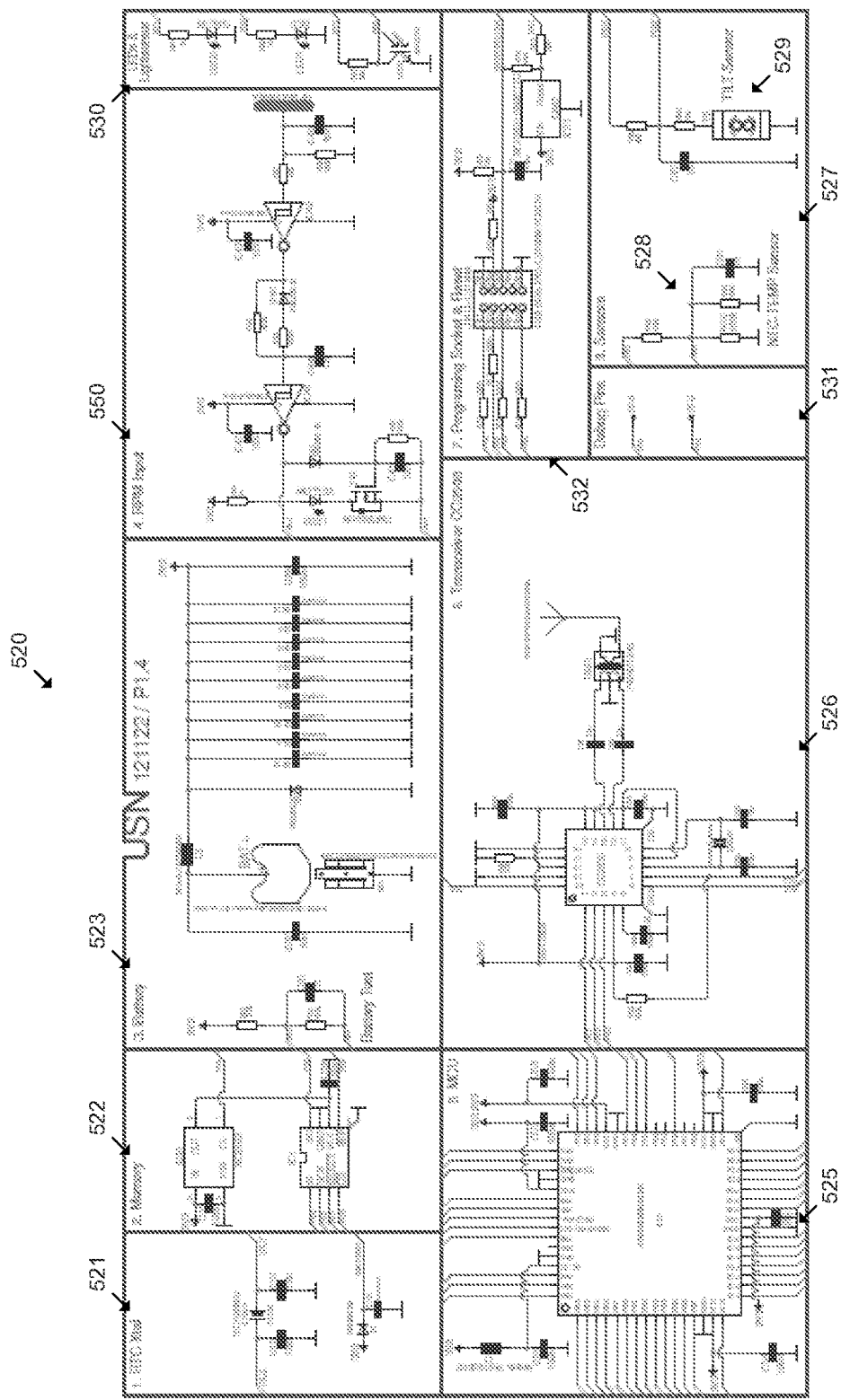
Figure 4B:
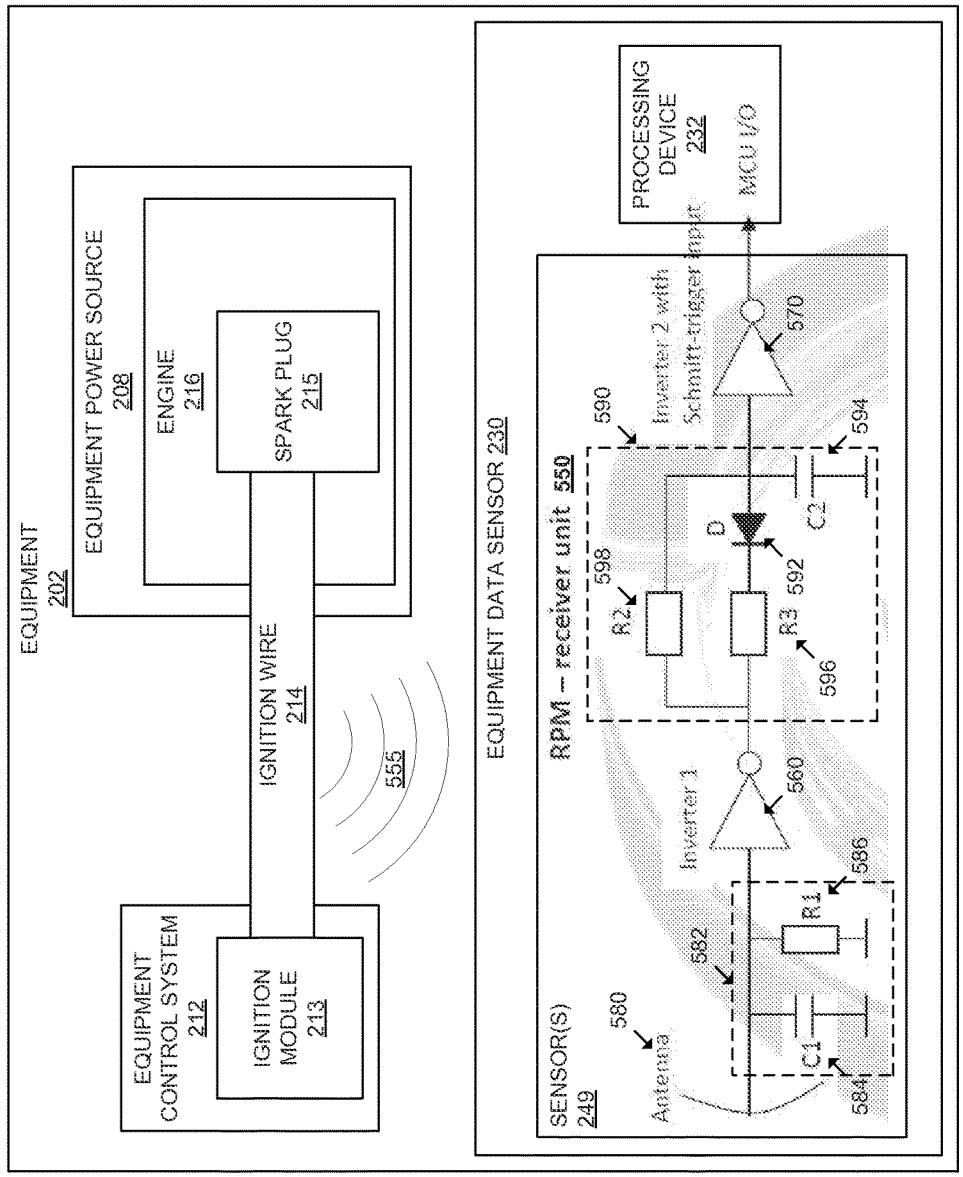
Figure 5:
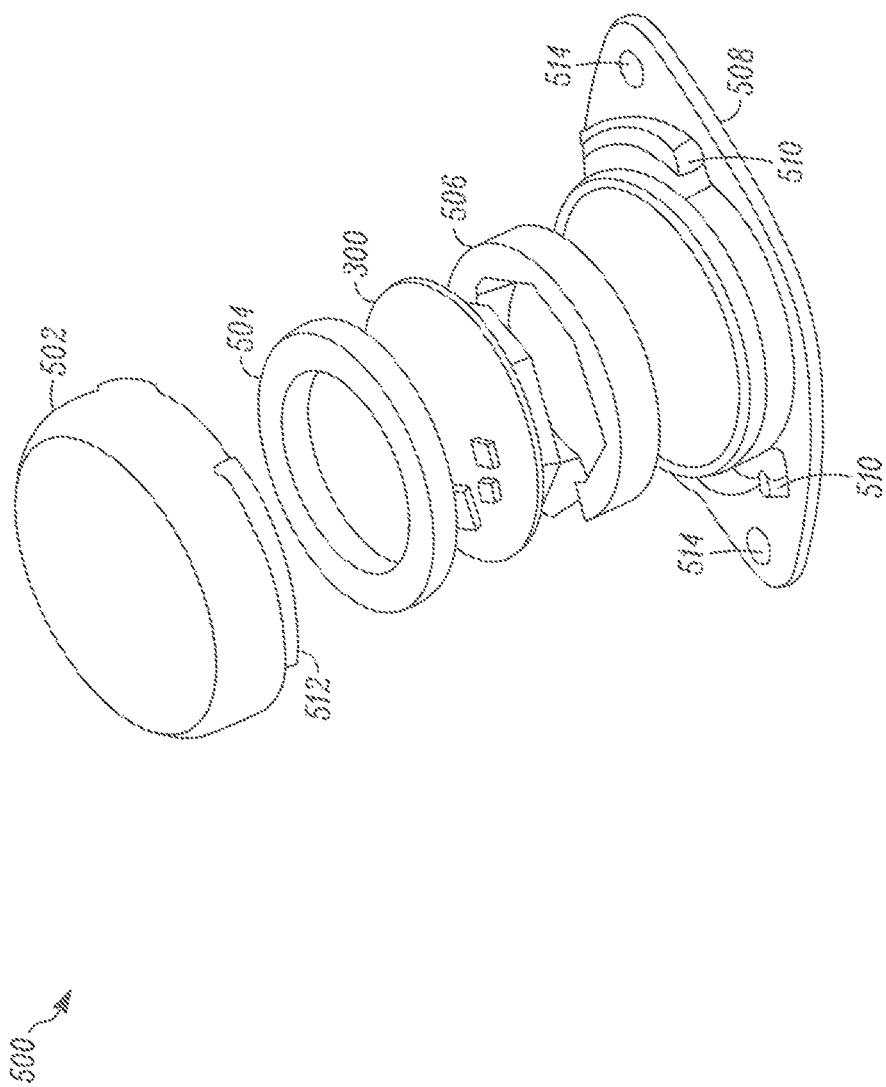
Figure 6A:
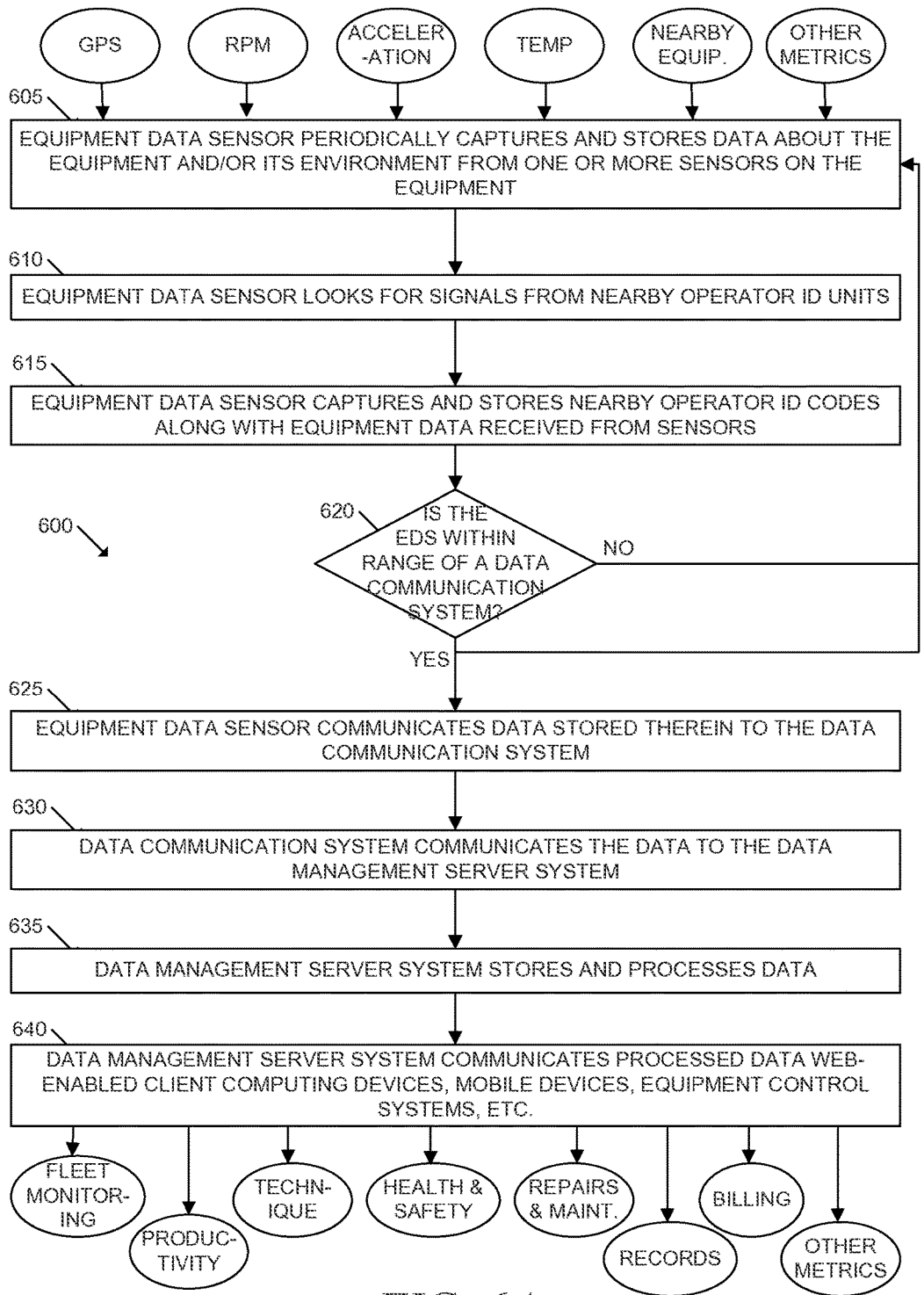
Figure 6B:
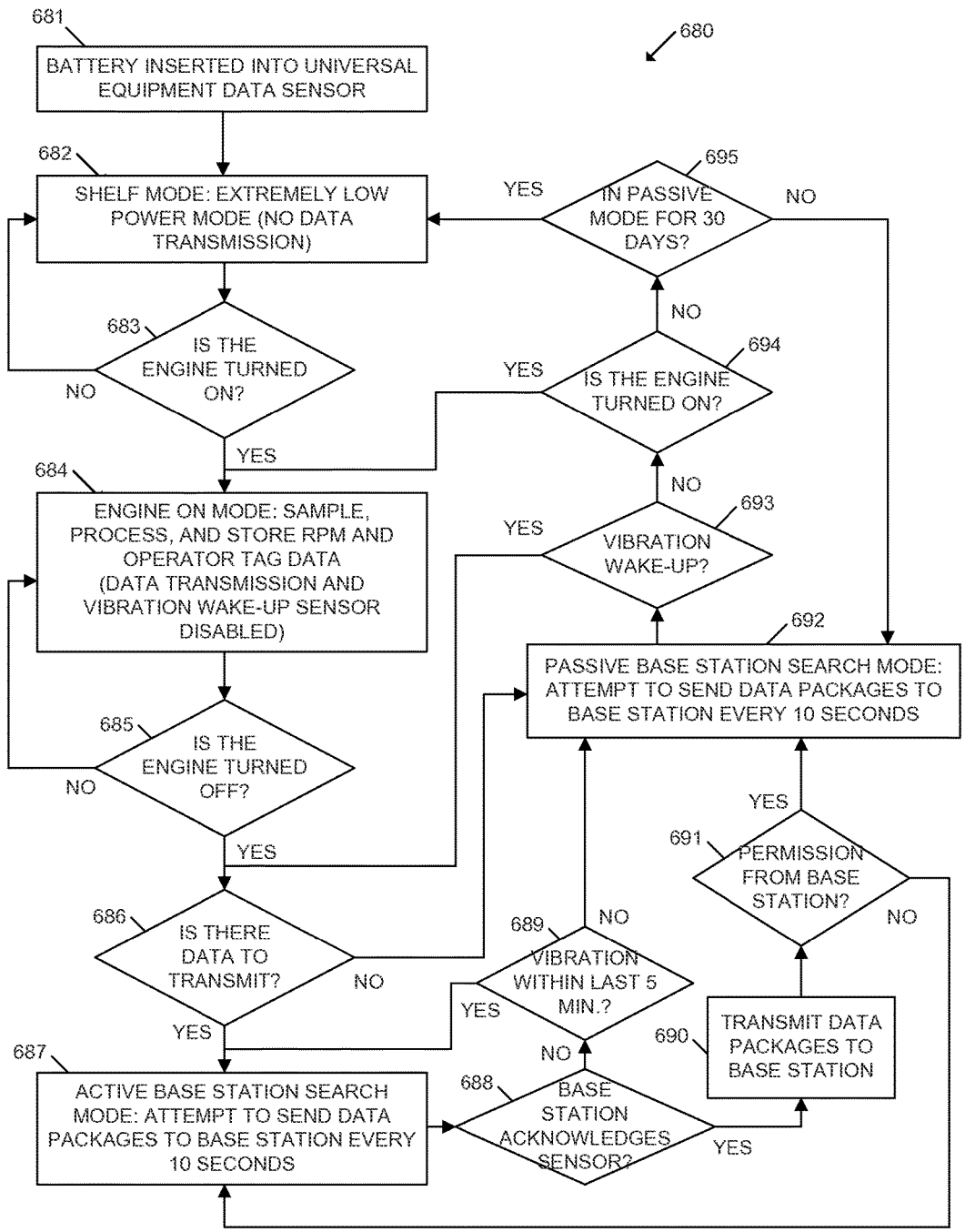
Figure 7A:
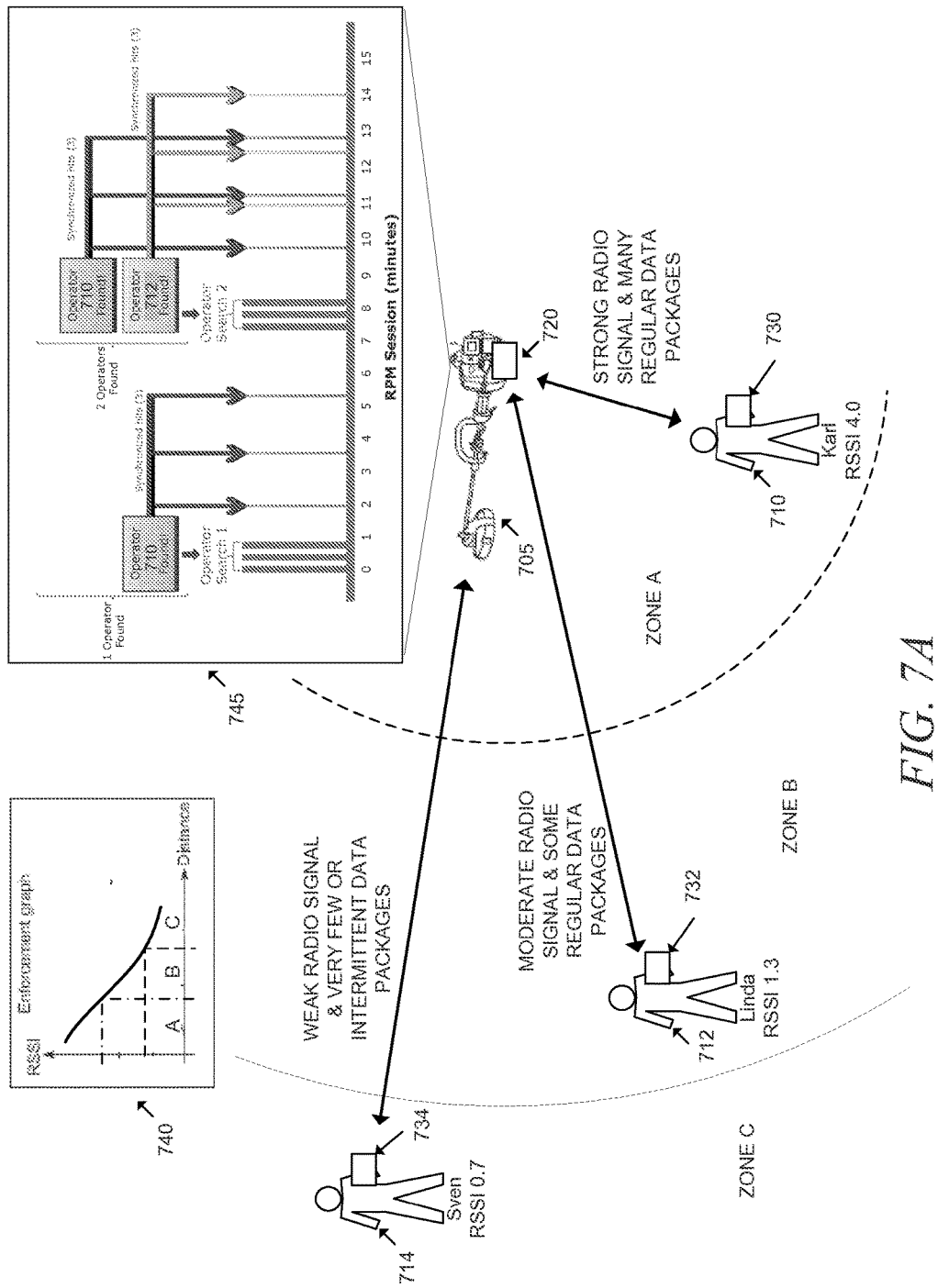
Figure 7B:
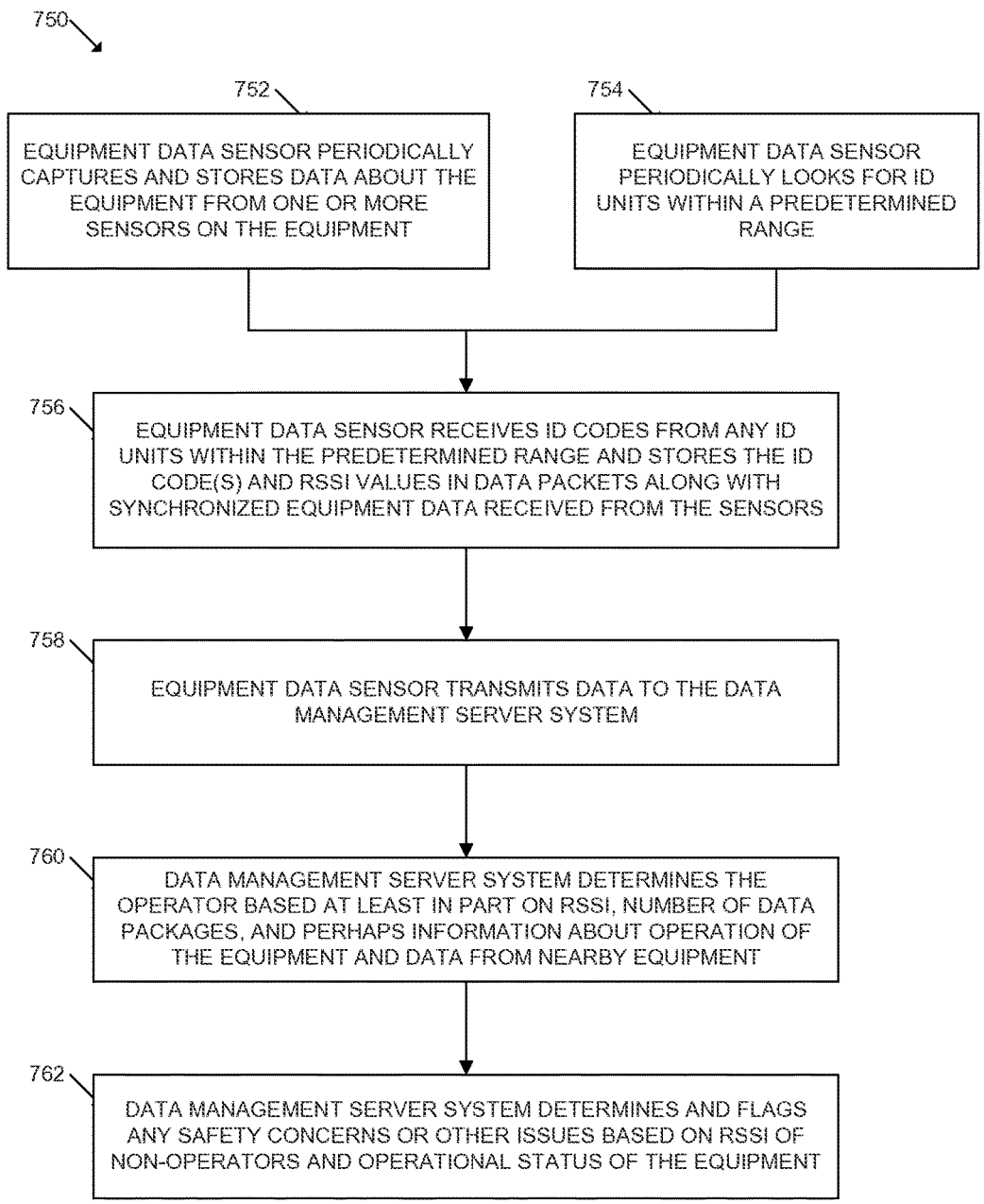
Figure 7C:
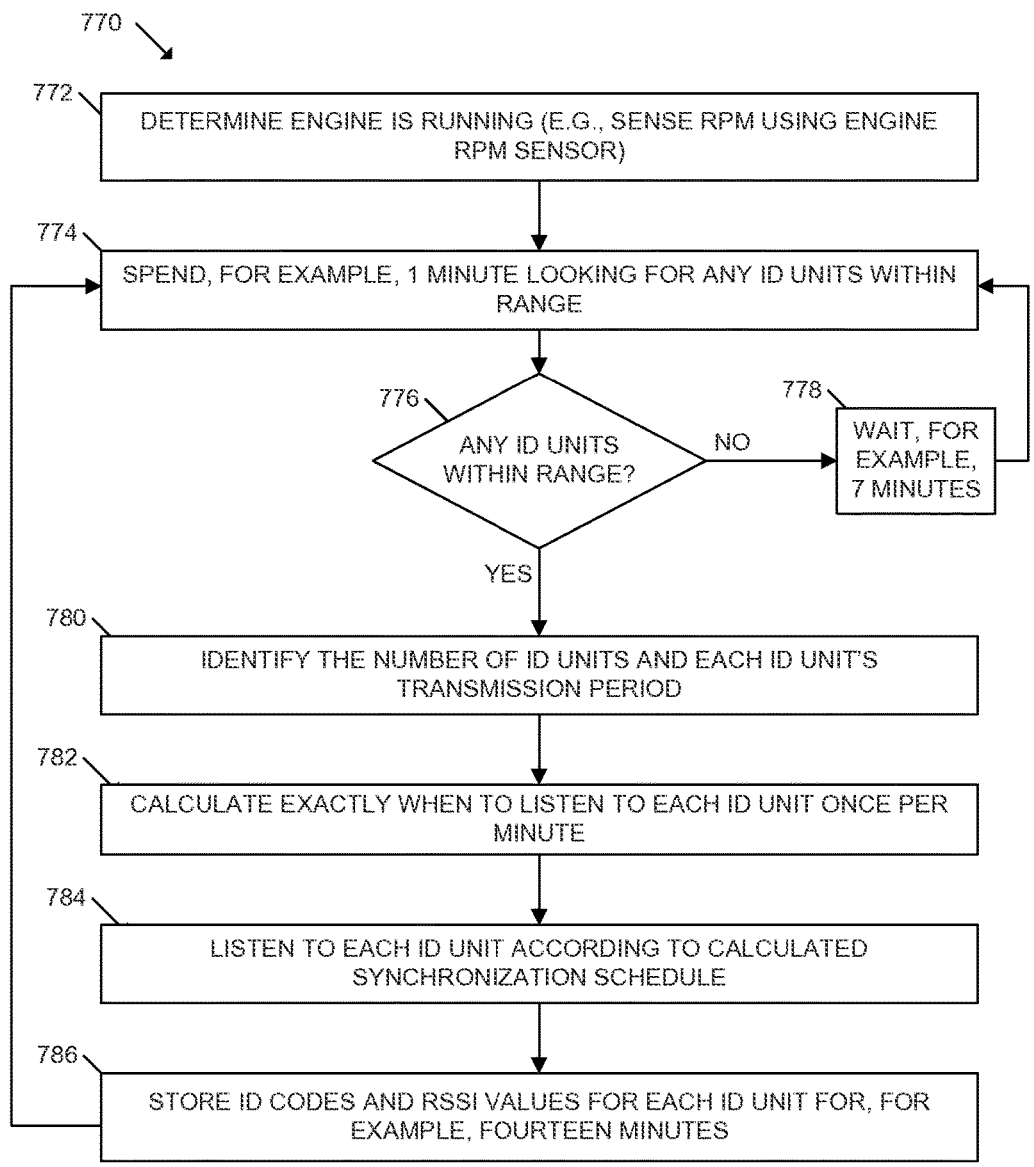
Figure 8:
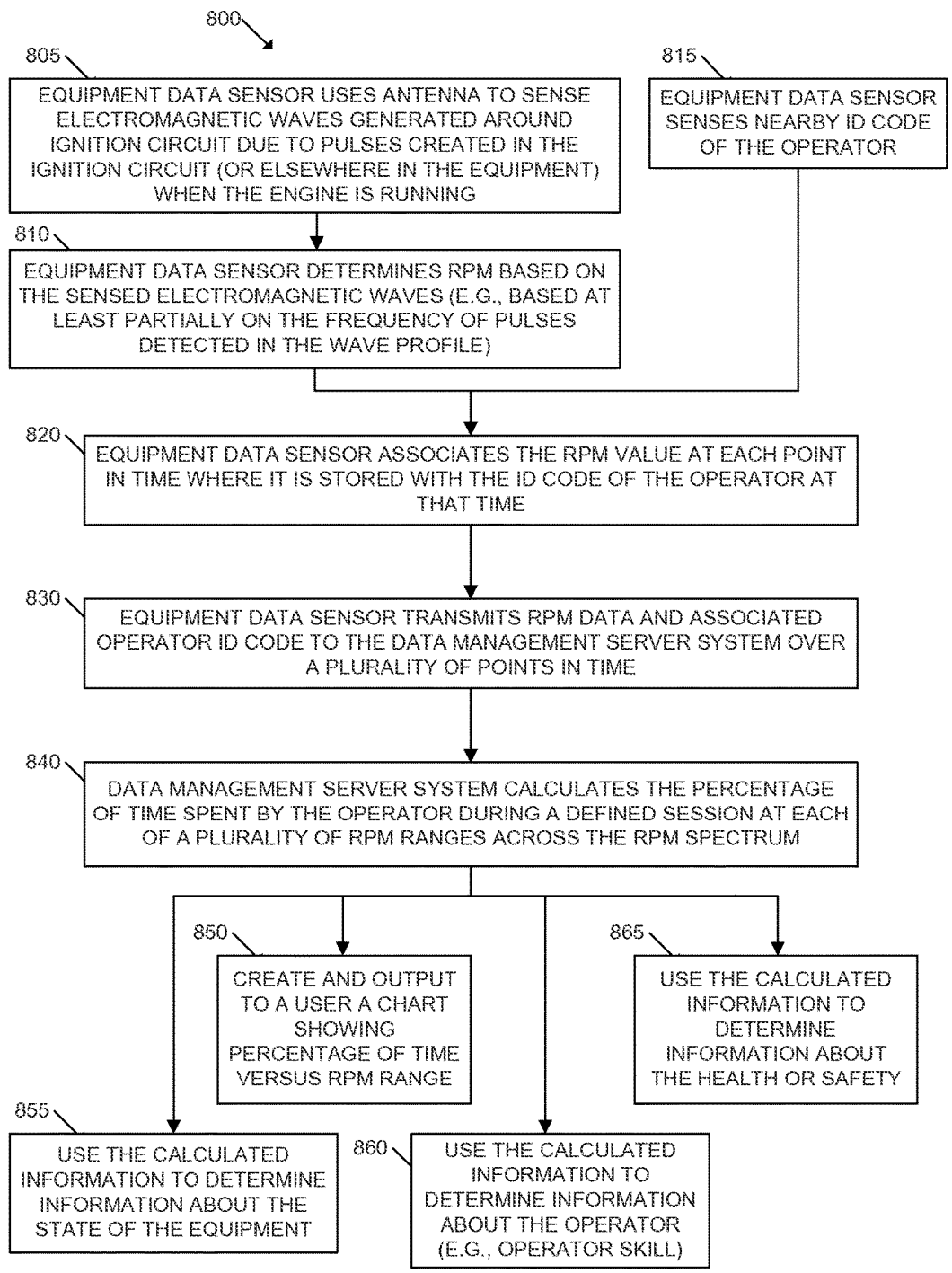
Figure 9:
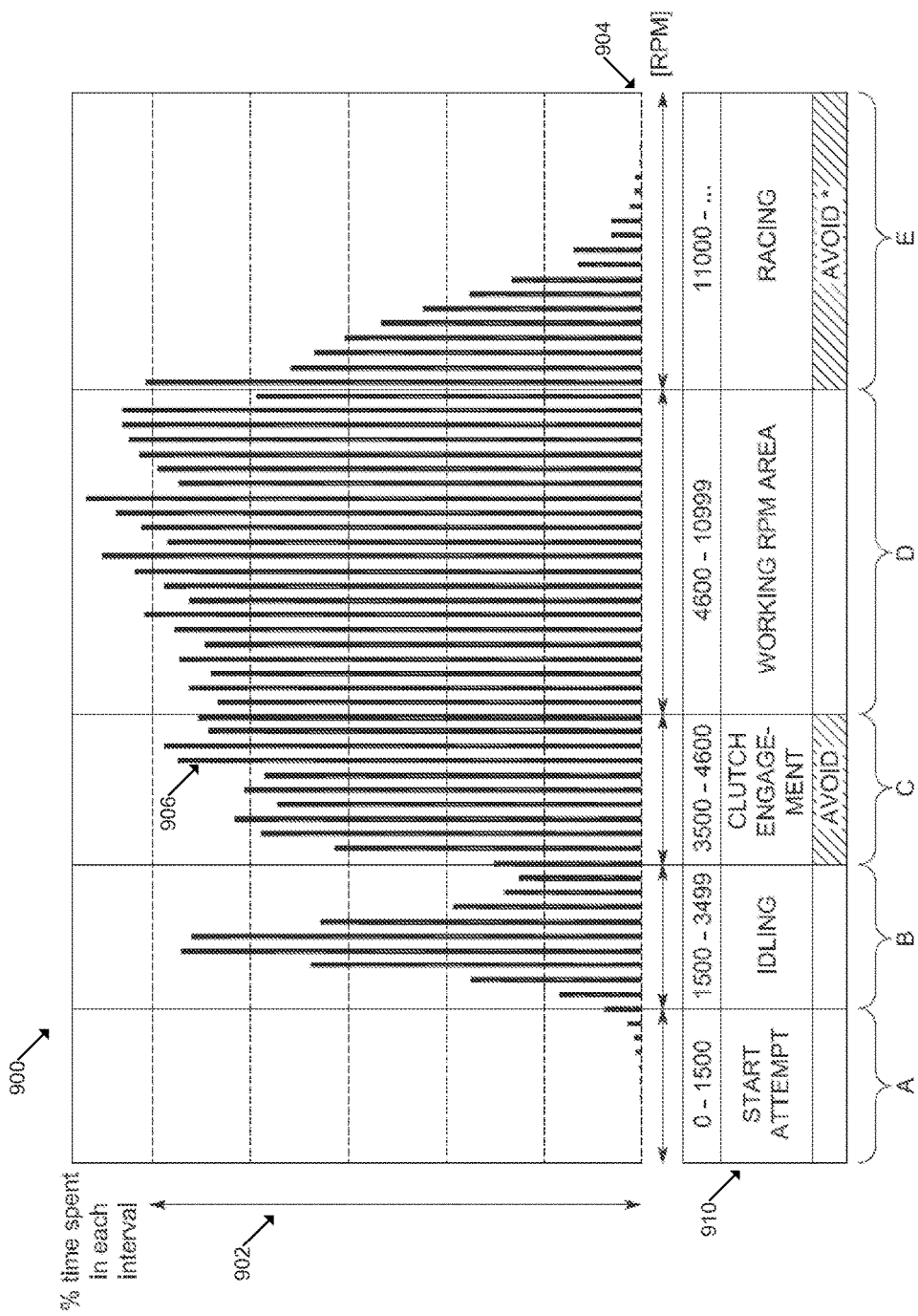
Figure 10A:
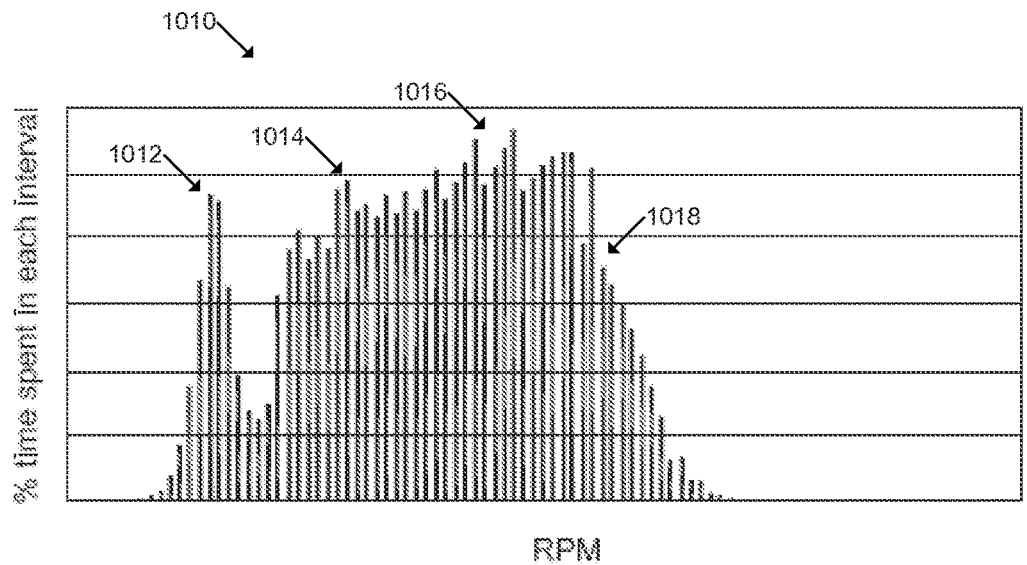
Figure 10B:
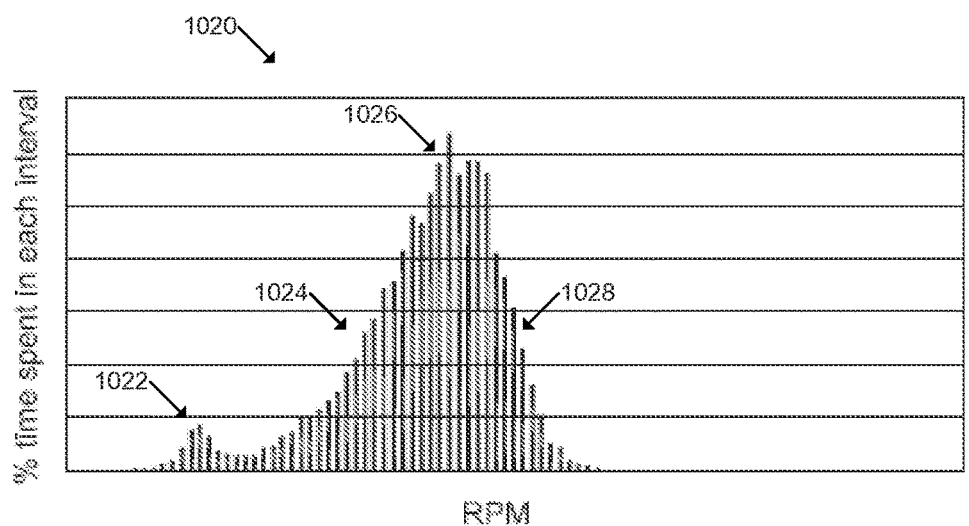
Figure 12A:
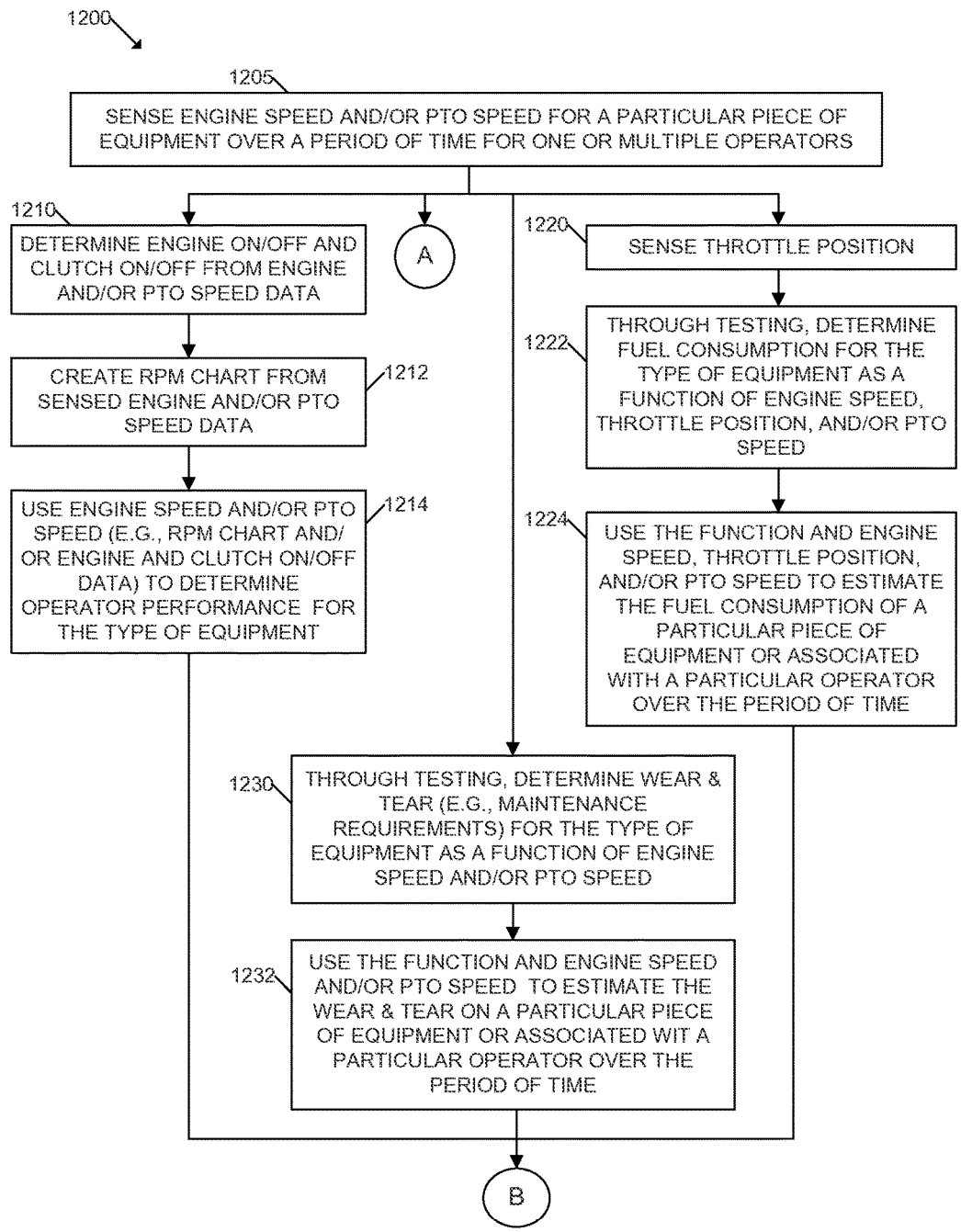
Figure 12B:
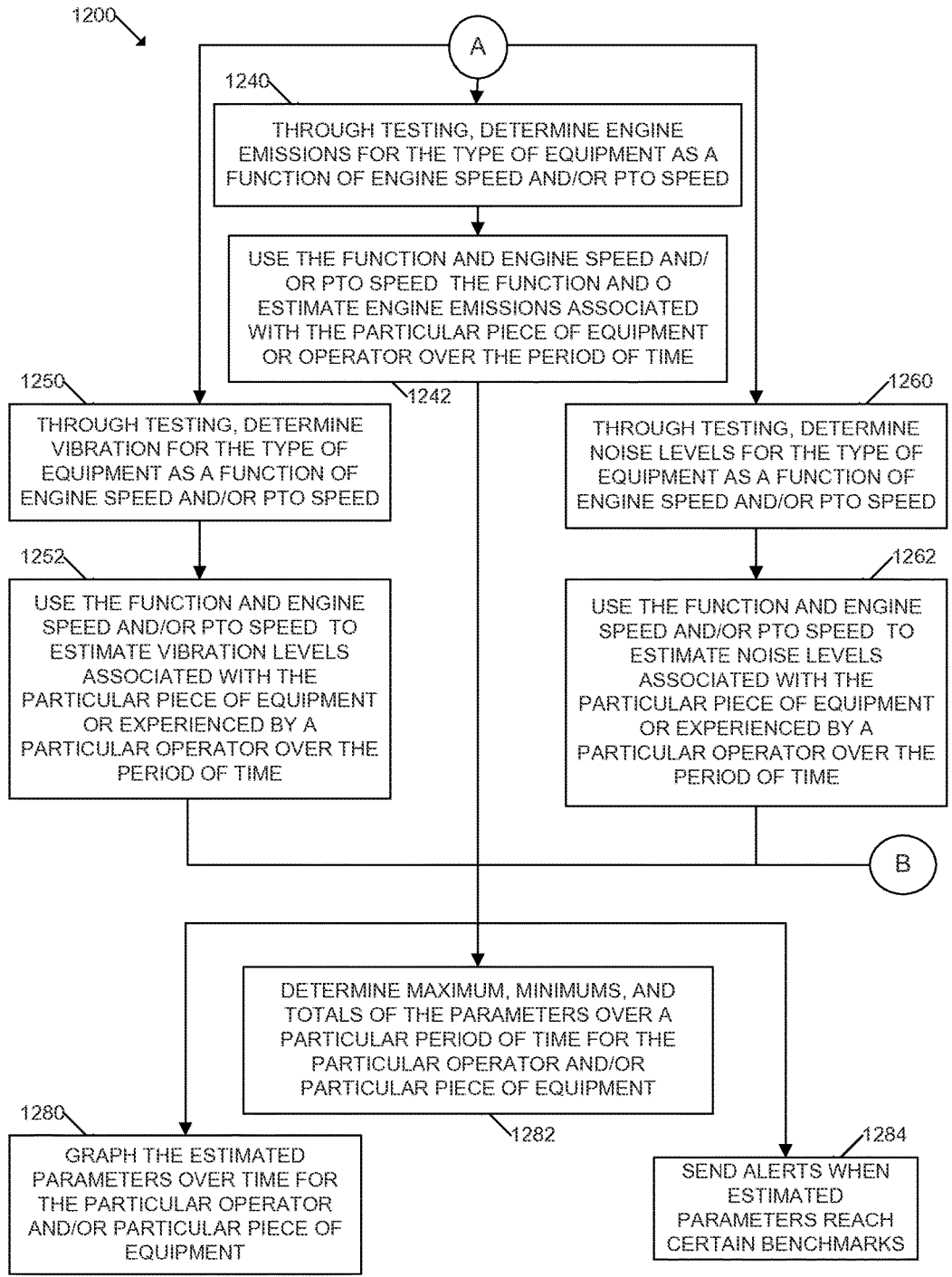
Figure 14:
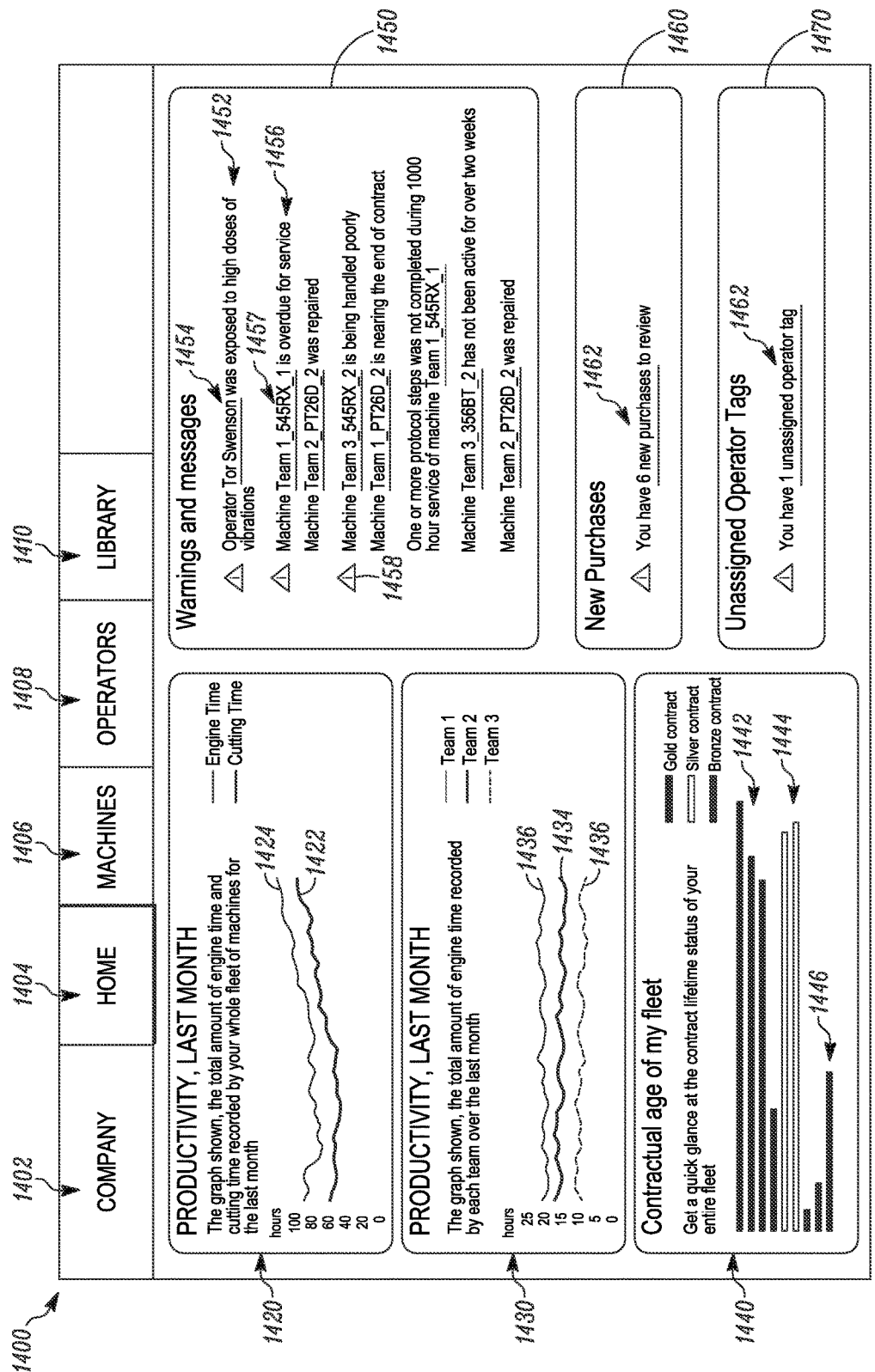
Figure 15:
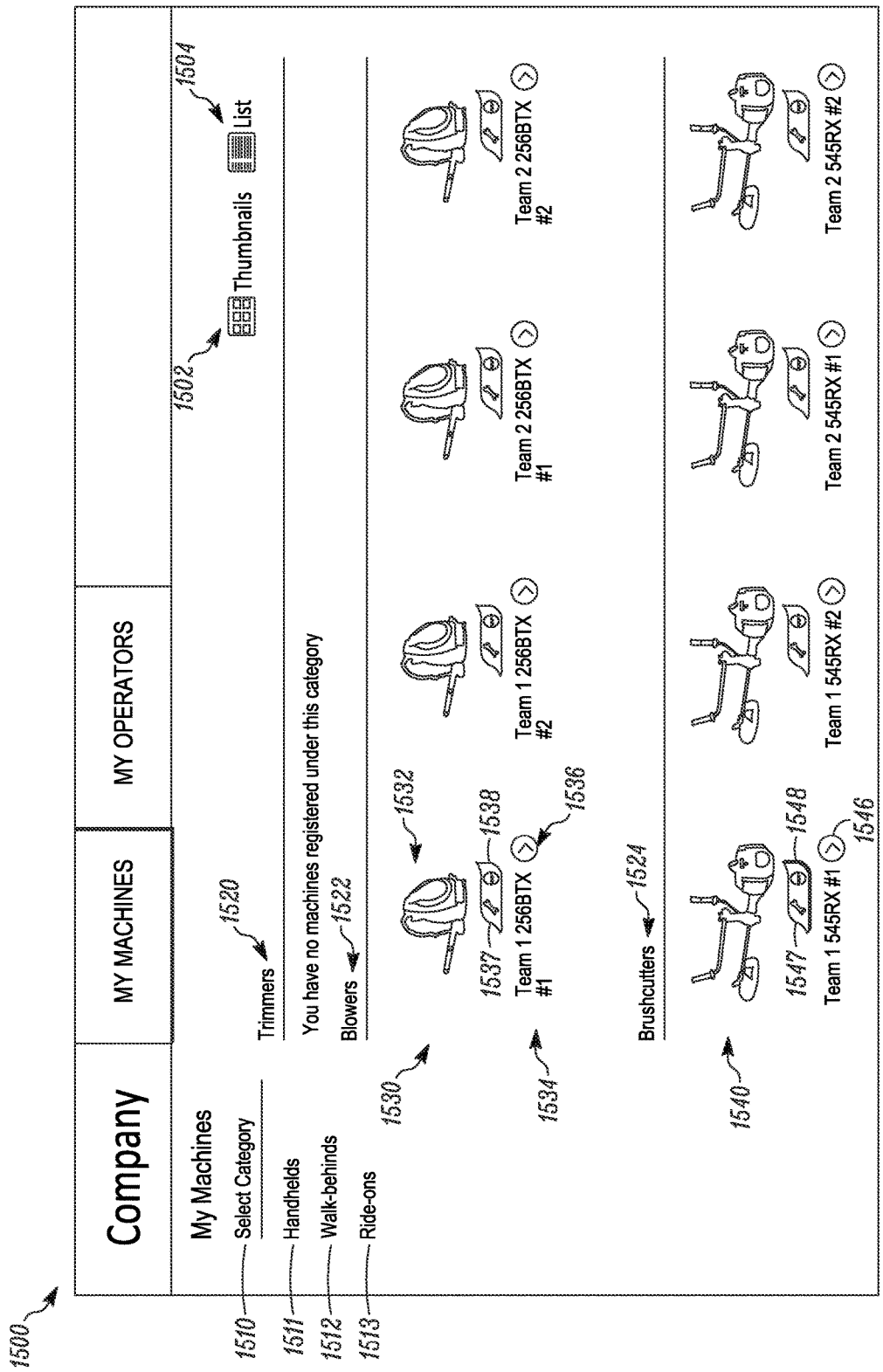
Figure 16:
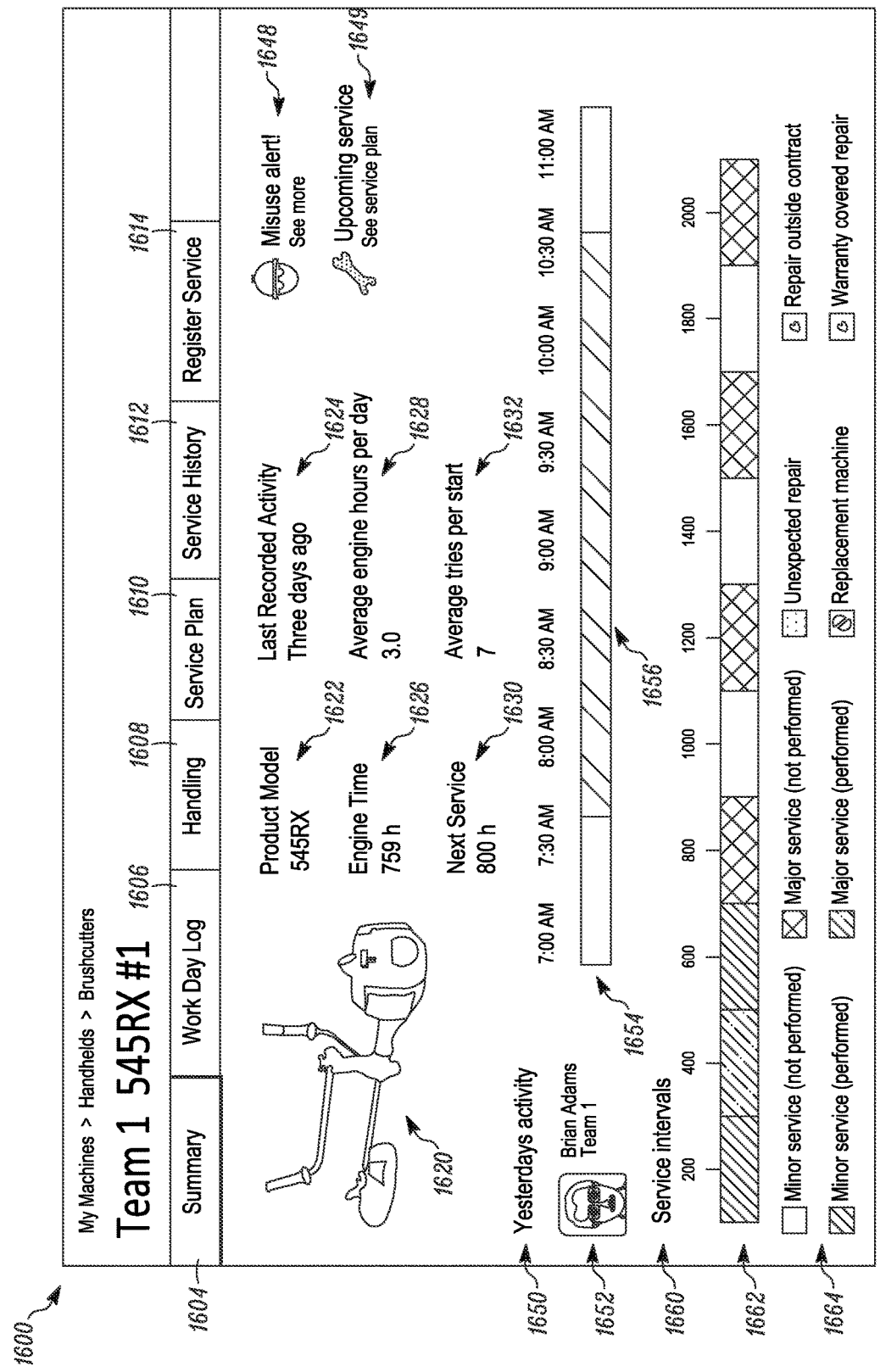
Figure 17:
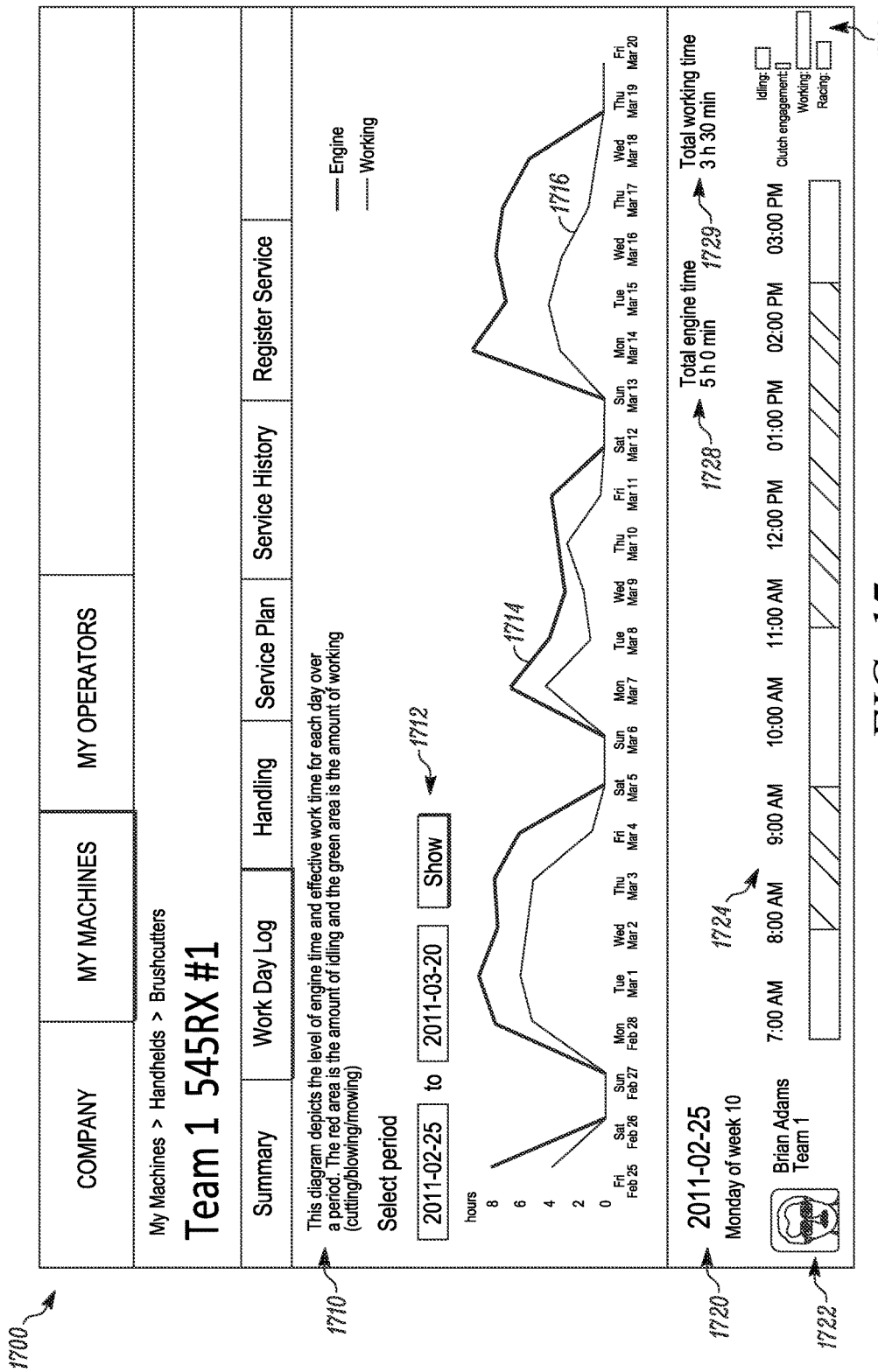
Figure 19:
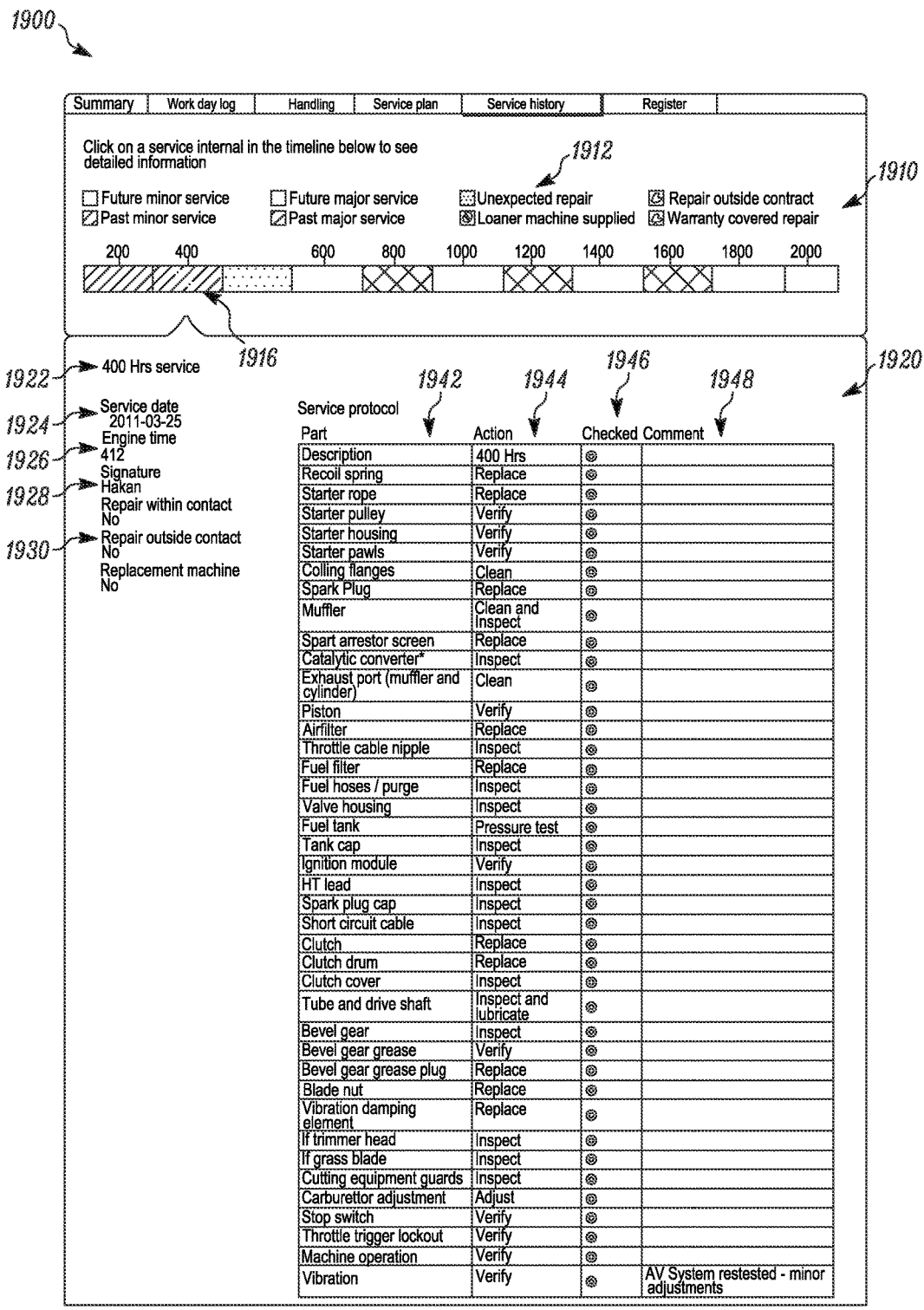
Figure 20A:
Figure 20C:
Figure 20D:
Figure 21:
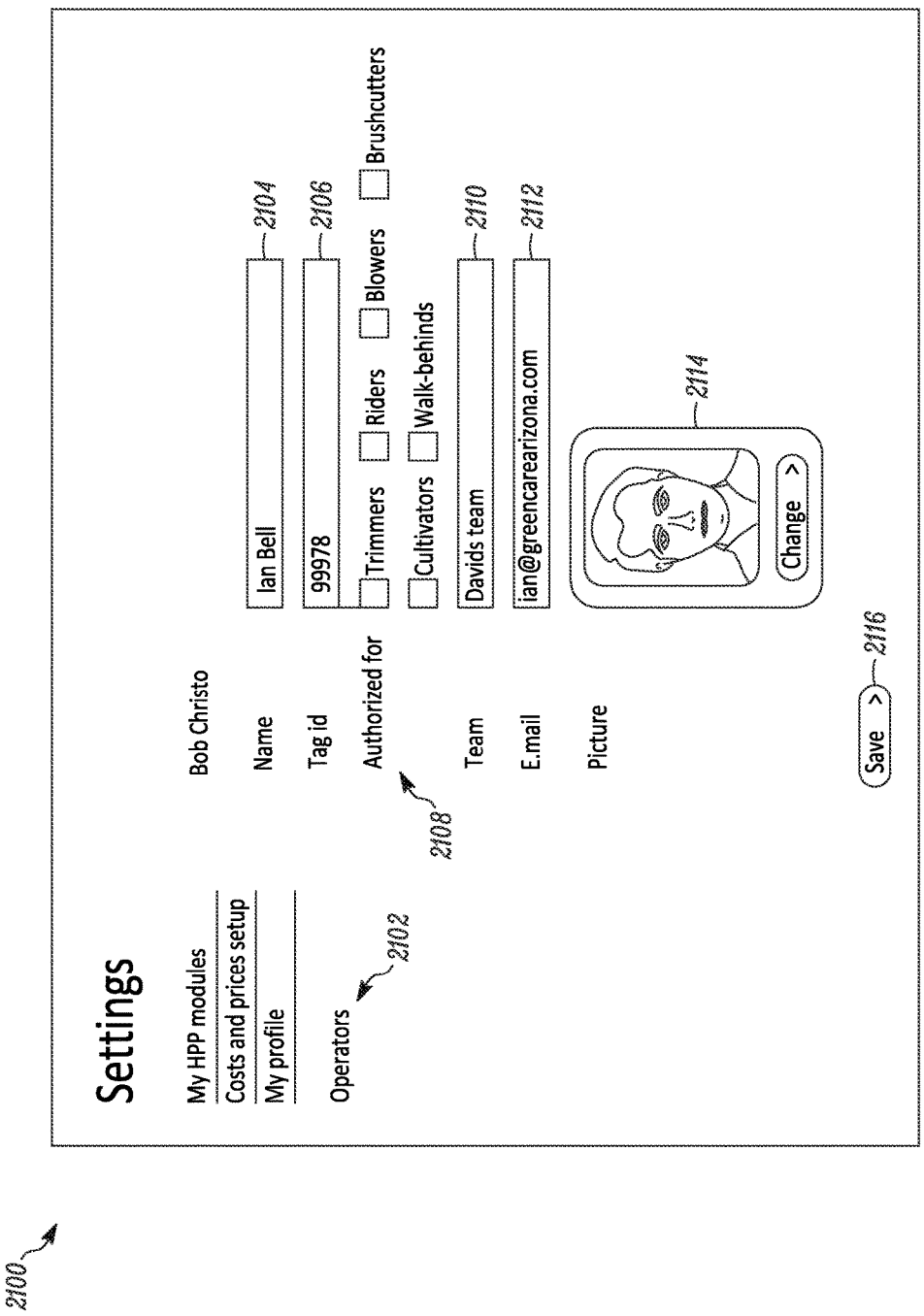
Figure 22:
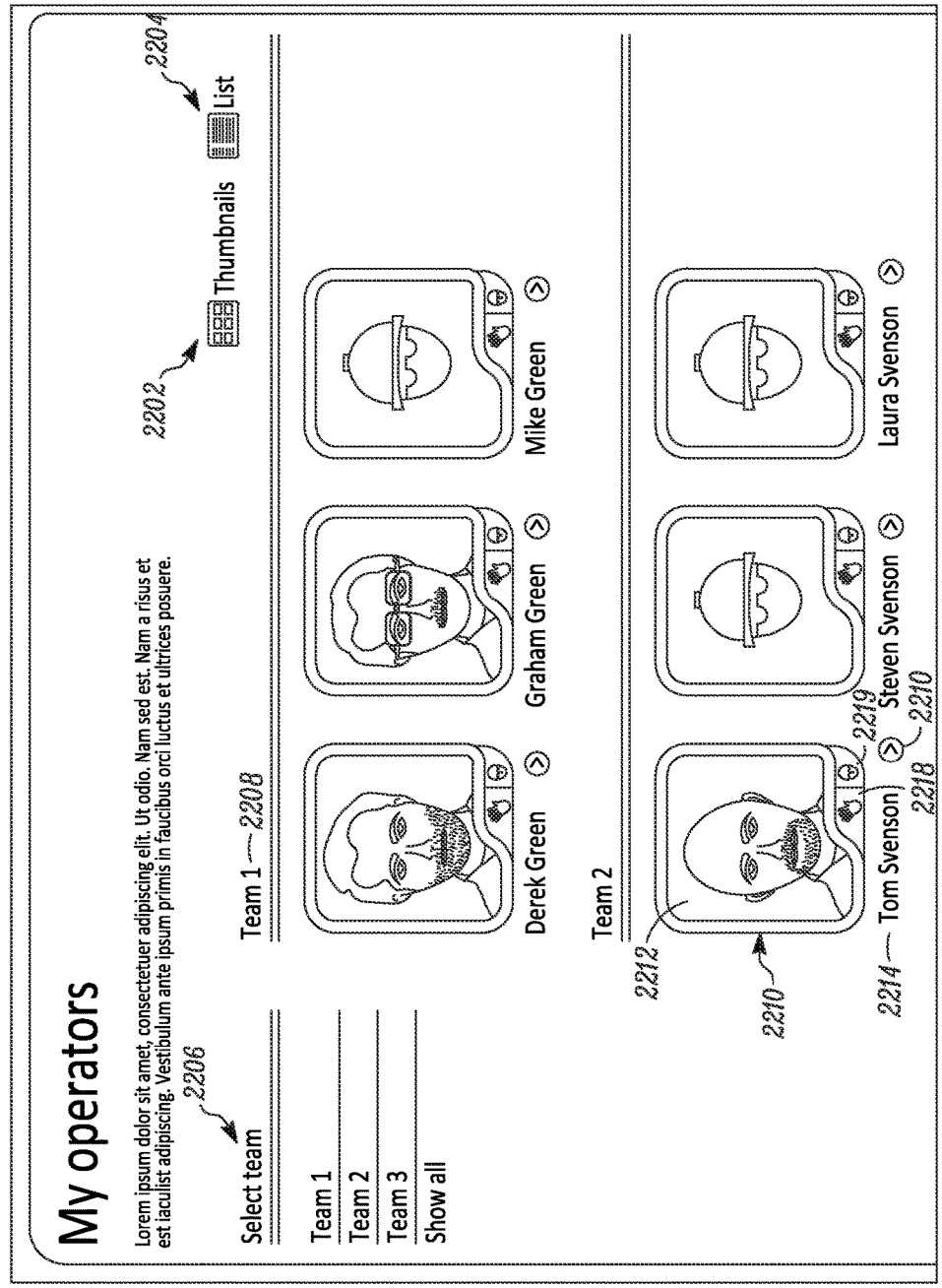
Figure 23:
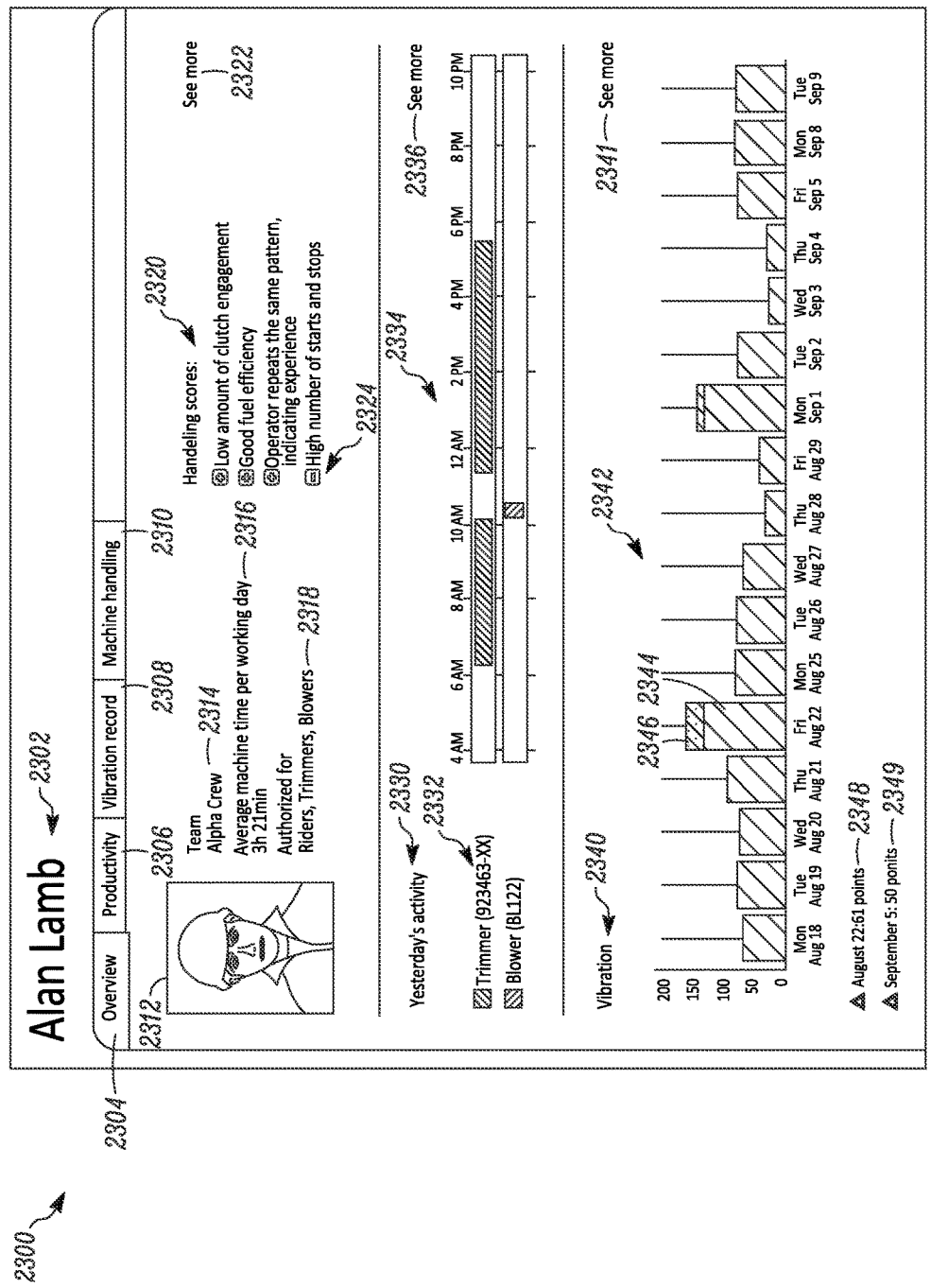
Figure 24:
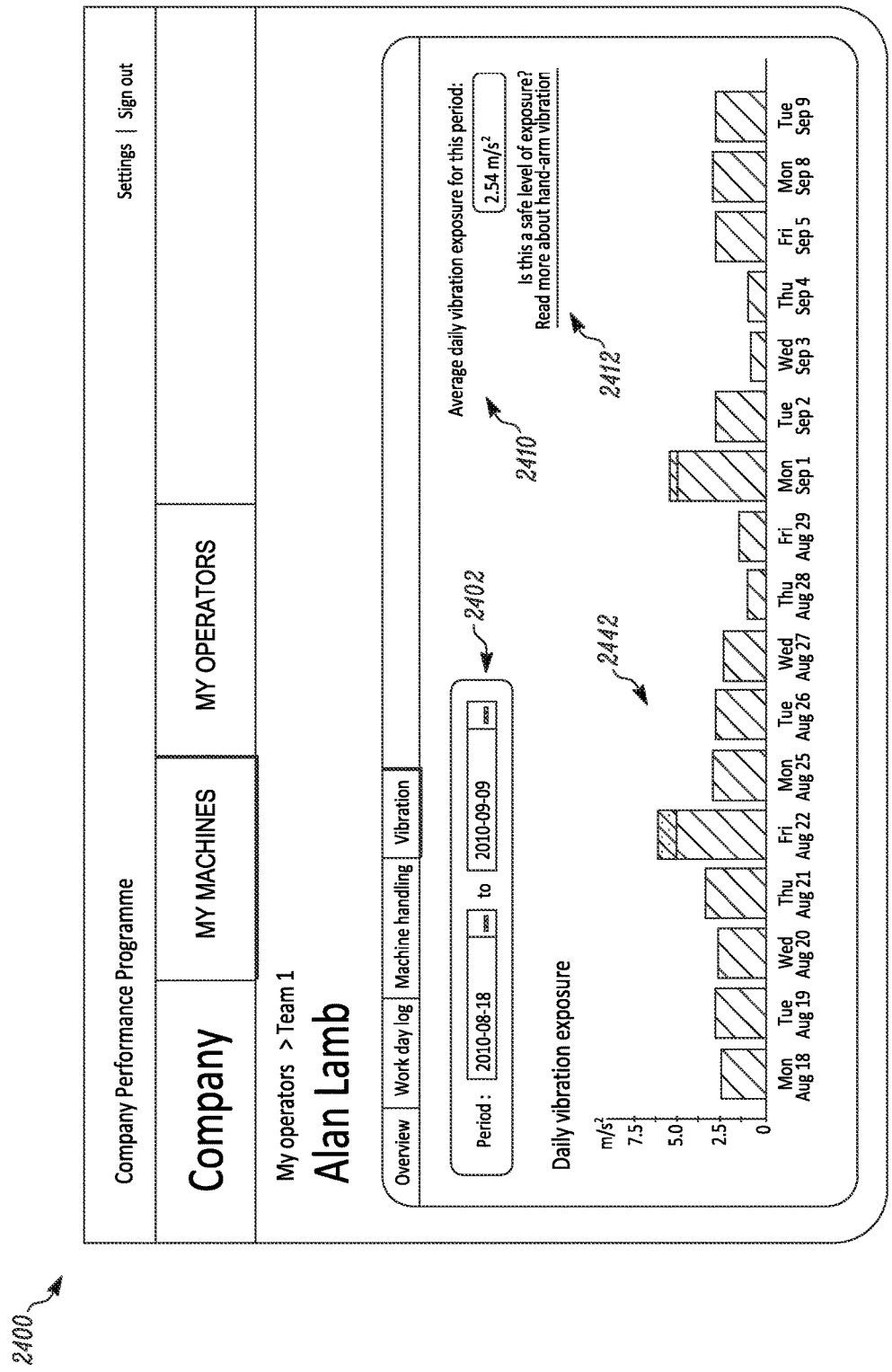
Figure 25:
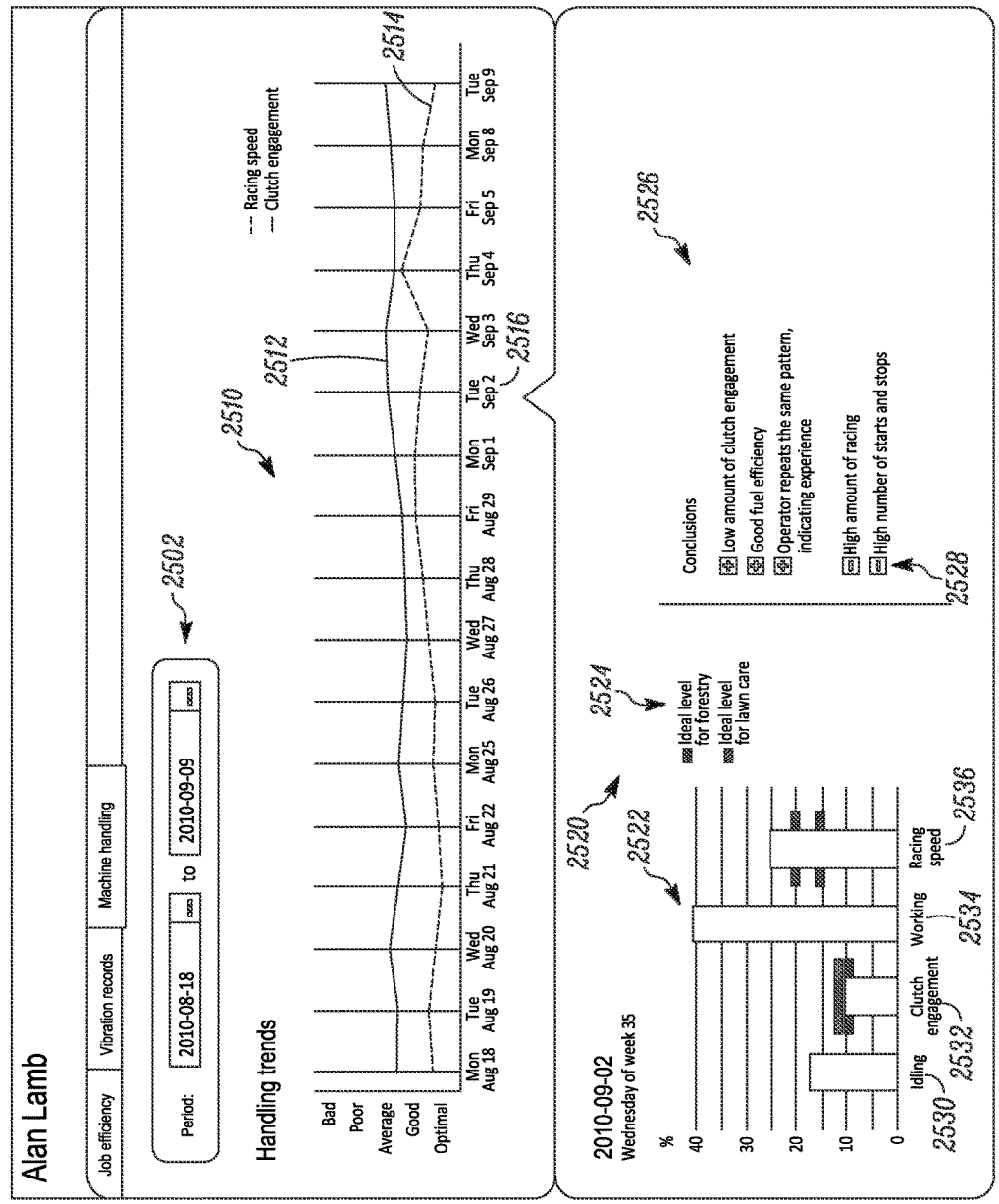

Having thus described some embodiments of the invention and objects thereof in general terms, reference will now be made to the accompanying drawings, wherein:

FIG. 1 illustrates schematically an overview of a fleet management system, according to some embodiments of the invention;

FIGS. 2A and 2B provide a block diagram showing components of a fleet management system according to some embodiments of the invention;

FIG. 3A is a schematic diagram of a universal equipment data sensor, according to some embodiments of the invention;

FIG. 3B illustrates one possible construction and installation system of an equipment data sensor according to some embodiments of the invention;

FIG. 4A is an electrical diagram of an equipment data sensor, according to some embodiments of the invention;

FIG. 4B is an electrical diagram of a RPM sensor used in an equipment data sensor, according to some embodiments of the invention;

FIG. 5 illustrates another construction and installation system of an equipment data sensor according to some embodiments of the invention;

FIG. 6A is a flow chart illustrating a process performed by the fleet management system to collect and utilize data from one or more fleets according to some embodiments of the invention;

FIG. 6B is a flow chart illustrating various modes of operation of an embodiment of the equipment data sensor and a process performed by the equipment data sensor for selecting the proper mode of operation and communicating with other devices in the fleet management system, according to some embodiments of the invention;

FIG. 7A is a schematic diagram illustrating automatic operator identification and operator-equipment pairing according to some embodiments of the invention;

FIG. 7B is a flow chart illustrating automatic operator identification and operator-equipment pairing according to some embodiments of the invention;

FIG. 7C is a flow chart illustrating a process that may be performed by an equipment data sensor to look for, monitor, and store operator identification codes from a plurality of operator identification codes within range of the equipment data sensor, according to some embodiments of the invention;

FIG. 8 is a flow chart illustrating a process performed by the fleet management system for collecting and using engine speed (e.g., RPM) data according to some embodiments of the invention;

FIG. 9 illustrates an example chart that analyzes RPM of a particular piece of outdoor power equipment during a defined period of operation by a particular operator, according to some embodiments of the invention;

FIGS. 10A and 10B compare the RPM charts like the one in FIG. 9 for two different operators to indicate information that can be gathered therefrom about the skill or technique of individual operators, according to some embodiments of the invention;

FIGS. 11A and 11B illustrate other RPM charts comparing the technique of the two different operators over a plurality of different periods of operation, according to some embodiments of the invention;

FIGS. 12A and 12B provide a process for using engine speed (e.g., RPM), cutting element speed (e.g., RPM), PTO speed, and/or the like to calculate various other equipment and/or operator metrics, according to some embodiments of the invention;

FIGS. 13A, 13B, 13C, and 13D illustrate examples of how four example parameters, vibration, fuel consumption, power, and wear and tear can be expressed as a function of RPM and then used in conjunction with sensed RPM data to determine information about operator and/or tool performance, in accordance with an embodiment of the invention;

FIG. 14 illustrates a fleet owner's home dashboard in the fleet management portal, in accordance with an embodiment of the invention;

FIG. 15 illustrates a fleet owner's machine fleet overview dashboard in the fleet management portal, in accordance with an embodiment of the invention;

FIG. 16 illustrates a fleet owner's machine summary dashboard in the fleet management portal, in accordance with an embodiment of the invention;

FIG. 17 illustrates a fleet owner's machine work day log dashboard in the fleet management portal, in accordance with an embodiment of the invention;

FIG. 18 illustrates a fleet owner's machine service plan dashboard in the fleet management portal, in accordance with an embodiment of the invention;

FIG. 19 illustrates a fleet owner's machine service history dashboard in the fleet management portal, in accordance with an embodiment of the invention;

FIGS. 20A, 20B, 20C, and 20D illustrate the process and interfaces used to allow a fleet owner to enter new service events into the fleet management portal, in accordance with an embodiment of the invention;

FIG. 21 illustrates a fleet owner's dashboard in the fleet management portal for pairing a particular operator with a particular operator ID code and ID unit, in accordance with an embodiment of the invention;

FIG. 22 illustrates a fleet owner's operator fleet overview dashboard in the fleet management portal, in accordance with an embodiment of the invention;

FIG. 23 illustrates a fleet owner's operator overview dashboard in the fleet management portal, in accordance with an embodiment of the invention;

FIG. 24 illustrates a fleet owner's operator vibration dashboard in the fleet management portal, in accordance with an embodiment of the invention; and FIG. 25 illustrates a fleet owner's operator machine handling dashboard in the fleet management portal, in accordance with an embodiment of the invention.

DESCRIPTION OF EMBODIMENTS OF THE INVENTION

Embodiments of the present invention now will be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

Fleet Management System

Embodiments of the invention are directed to and/or facilitate systems for assisting with management of a fleet of outdoor power equipment and/or equipment operators. Therefore, embodiments of the invention are directed to systems for collecting, communicating, processing, and/or presenting data related to outdoor power equipment, operators of the equipment, and/or tasks performed by the equipment. Although the term "fleet" is used herein to describe the system, it will be appreciated that, depending on the user of the system, the "fleet" may comprise many machines of many different types with many different operators, or, for some users, may comprise only one or two machines with only one or two operators. Furthermore, although embodiments of the invention described herein have often been particularly configured for use with outdoor power equipment, some embodiments, aspects, and/or components of the invention may have broader applicability and may be similarly used to sense and/or manage information from and/or about other types of machines and/or the operators of the machines.

FIG. 1 illustrates a high-level view of a fleet management system 100 according to some embodiments of the invention. The fleet management system 100 generally includes: (1) a data collection and communication system 110 for collecting data from the equipment and the equipment operators and communicating the data to a central location; and (2) a data management and presentation system 150 for receiving the collected data, processing the collected data into useful data and formats, and presenting the processed data to persons or systems that can utilize the data for management of the equipment and/or operators.

The data collection and communication system 110 is, in some embodiments, applied in connection to land maintenance and/or modification operations, including such operations as landscaping (e.g., lawn mowing, edging, trimming, aerating, clipping, clearing, seeding, concrete or stone cutting, etc.) and forest care (e.g., forest thinning, clearing, brush cutting, etc.). These operations may be undertaken by a fleet owner 101 who owns a fleet of one or more pieces of equipment. The fleet owner 101 may be one or more individual persons or a company. The equipment may include, for example, a handheld trimmer 121, a ride-on lawn mower 122, a chainsaw 123, and a walk-behind lawn mower 124. It will be appreciated that, in some embodiments, the equipment may be any outdoor power equipment, or even any other type of equipment, including (without limitation) zero-turn riding mowers, articulating riding mowers, lawn tractors, robotic lawn mowers, string trimmers, edgers, hedgers, brush cutters, chainsaws, walk-behind lawn mowers, aerators, tillers, dethatchers, seeders, spreaders, sprayers, stump grinders, stone/concrete cutters, blowers, sprinklers, and/or the like.

Except in the case of robotic equipment, the equipment is typically operated by one or more operators, who may be different persons from (e.g., employees of) or the same person as the fleet operator 101. In the illustration, the handheld trimmer 141 is operated by one operator 145, the riding lawn mower 142 is operated by another operator 146, the chainsaw 143 is operated by another operator 147, and the walk behind mower 144 is operated by yet another operator 148.

According to the embodiment shown in FIG. 1, the data collection and communication system 110 comprises an equipment data sensor installed in each piece of equipment, an operator identification unit uniquely associated with each operator; and one or more communication units. For example, in FIG. 1, the handheld trimmer 141 has an equipment data sensor 121 installed therein/thereon, the riding lawn mower 142 has another equipment data sensor 122 installed therein/thereon, the chainsaw 143 has another equipment data sensor 123 installed therein/thereon, and the walk behind mower 144 has yet another equipment data sensor 123 installed therein/thereon. The equipment data sensors gather data about the status and operation of the equipment on which it is installed and, in some embodiments, may also gather data about the equipment's environment, including data about the equipment's operator and other nearby persons and equipment. The equipment sensors may be installed in the equipment during manufacture of the equipment or, in some embodiments, may be after-market additions to the equipment. In some embodiments the equipment data sensor is a self-powered (e.g., battery-powered) universal sensor that can be installed on different types of equipment with little or no modification to the sensor and/or the equipment, while in other embodiments the equipment data sensor may be specifically tailored for one or more particular types of equipment and/or integrated into the equipment's hardware. Embodiments of the equipment data sensors will be described in more detail below.

As also illustrated in FIG. 1, each operator has an identification (ID) unit associated with an operator ID code that uniquely identifies the operator. In this regard, the operator 145 of the trimmer 141 has an ID unit 131, the operator 146 of the riding mower 142 has another ID unit 132, the operator 147 of the chainsaw 143 has another ID unit 133, and the operator 148 of the walk behind mower 144 has yet another ID unit 134. The ID unit may be, for example, a data card that the operator holds in a clothing pocket or on a lanyard. In other embodiments, the ID unit may be a key fob, wristband, ankle band, ring, watch, dongle, and/or other wearable article. In still other embodiments, the ID unit is a data unit stored on the operator's mobile phone 116, as also illustrated in FIG. 1. Embodiments of the ID units will be described in more detail below. The operator ID code may uniquely identify a particular operator by way of being unique amongst the ID codes in existence of at least amongst those used in a particular fleet or area, thereby allowing the ID code to uniquely identify the operator that is carrying the ID unit in which the ID code is stored. The fleet management system may or may not have a database associating each ID code with actual operator names and, in some embodiments, may only uniquely identify the operator using the actual ID code or some other particular code that a user can then, on his or her own, link to an operator name.

Each equipment data sensor is configured to identify any ID units within a predetermined range (e.g., within range of a radio-frequency antenna in the equipment data sensor) and, in some embodiments, the equipment data sensor wirelessly obtains an ID-code stored in each ID unit within a particular range. In this way, the equipment data sensors can store information about which operator is using or is near each piece of equipment at different points in time. For example, the equipment data sensor 123 in the chainsaw 143 may periodically look for any ID units within range of its wireless transceiver and, in doing this, identify the ID unit 133 held by the operator 147 of the chainsaw 143. The equipment data sensor 123 may store this information along with other equipment and environment data that it periodically collects. Likewise, the equipment data sensor 122 in the riding lawn mower 142 also periodically looks for any ID units within a certain range and may, for example, find both the ID unit 132 held by the operator 146 of the riding mower 142 and the ID unit 131 held by the operator 145 of the trimmer 141 who happens to be, at this time, trimming nearby to where the riding lawn mower 142 is being operated. In such situations, the equipment data sensor 122 may be configured to store both IDs. As is described in greater detail below, the equipment data sensor 122 or another device that receives data therefrom may be able to distinguish between the two IDs to determine (e.g., based in whole or in part on signal strength) which ID represents the operator of the riding lawn mower 142 and which ID is that of another person located proximate to, but not operating, the riding lawn mower 142.

In some embodiments of the fleet management system 100, some equipment may not use ID units and may, instead, have a biosensor, such as a fingerprint reader or an iris scanner, installed thereon for identifying the operator of the equipment.

In one or more of these ways, the equipment data sensor gathers data about the operator, nearby operators, and/or nearby equipment. The equipment data sensor also has one or more sensors built into it and/or is communicably coupled to one or more sensors on the equipment that measure data about the equipment, status of equipment components, and/or the equipment's environment. Such data may, for example, include (without limitation) engine revolutions per minute (RPM), engine oil temperature, engine operation, clutch engagement, ambient temperature, vibration, geographic positioning data, speed, throttle valve position, brake engagement, power-take-off (PTO) system engagement, fuel consumption, inclination, acceleration, pressure, load, battery status, shock, user input, time, feature operation and status, humidity, nearby equipment, fuel level, oil level, and/or the like. The equipment data sensor may capture this data periodically and have a non-transitory memory device, such as a flash memory drive, that stores the captured data in a time sequence or along with timestamps indicating the moment in time when the data was captured. The equipment data sensor may store this data at least temporarily until the data communication system portion of the data collection and communication system 110 can transfer this data to the data management and presentation system 150.

In this regard, the data collection and communication system 110 includes a data communication system comprised of one or more communication units for obtaining data from the equipment data sensor(s) and communicating the data to the data management and presentation system 150 via a global or wide area network such as the Internet and/or a cellular network 105. For example, some embodiments include a base station 112 that periodically looks for equipment data sensors that come within range of its wireless transceiver and then uploads data from the identified equipment data sensors. For example, the base station 112 may be located in the fleet owner's garage 106 or other storage unit so that it captures data from the fleet's equipment data sensors whenever the equipment is returned to the garage 106 at the end of each work day. This base station 112 may have some local memory for temporarily storing some data, but it may be connected to the Internet so that it can transfer the data it receives to a remote web server 165 of the data management and presentation system 150. The data collection and communication system 110 may also have one or more satellite stations 114 that relay data from the equipment data sensors to the base station 112. For example, such satellite stations 114 may be installed on the trucks 107 or trailers that carry the equipment to the worksites. The communication units may also have ID codes associated with them so that they may be used to help track the location of equipment in the fleet. For example, a satellite station 114 installed on each truck could help identify which equipment is on which truck and a base station 106 located in a garage could help identify which equipment is in the garage and when the equipment is removed and/or returned to the garage.

In some embodiments the communication unit may even be a mobile phone or other mobile device that is configured to communicate information between one or more equipment data sensors and the data management and presentation system 150 using a global mobile network, such as a cellular telephone network 105. For example, as illustrated in FIG. 1, the operator 148 of the walk behind mower 144 may hold a mobile smart phone 116 in his pocket that has a short-range transceiver, such as a Bluetooth® system or the like. The mobile phone 116 may also have a downloaded fleet management system software application stored in the phone's memory that allows the mobile phone 116 to wirelessly receive data from the equipment data sensor 124 of the mower 144 using the short-range transceiver and then relay the data to the data management and presentation system 150 via the cellular network 105. In this way, it may be possible for the data management and presentation system 150 to receive data in real-time or near-real-time and/or, for some users, it may also negate the need for other system-specific communications units. This may be particularly well suited for some owner-operators or homeowners that would like to utilize the fleet management system 100 with less of an investment in communication units like base stations 112 and satellite stations 114. In some embodiments, the ID unit 134 may be stored in the mobile phone 134 which may also negate the need for such equipment as operator data cards or wristbands. In such embodiments, the equipment data sensor 124 may receive the ID code from the mobile phone 116 or, alternatively, if the mobile phone 116 is the communication unit, the mobile phone 116 may associate the ID code stored in the ID unit 134 in the phone 116 with the data the phone 116 receives from the equipment data sensor 124 prior to sending the combined data and ID code to the data management and presentation system 150. This could also potentially reduce the cost of the equipment data sensor 124 since some functionality of reading nearby ID units may not be needed in the equipment data sensor 124 in such an embodiment.

As illustrated in FIG. 1, the data collected by the data collection and communication system 110 is then communicated to the data management and presentation system 150 via a network 105. The network 105 may be, for example, a wide or global area network including the Internet and/or a cellular telephone network. The data management and presentation system 150 includes a data management server system 162, such as a web server, that receives the data from the data collection and communication system 110, stores the data in a database 165, processes the data, and presents the data or other data derived therefrom to one or more users in a useful format. For example, the data management server system 162 may provide a web portal where users can track information about a fleet's equipment and operators, including (for example, without limitation) such information as equipment run time, equipment performance, equipment maintenance records, equipment repair records, equipment safety concerns, equipment productivity, equipment cost, equipment location, equipment use, operator productivity, operator work time, operator machine handling information, operator performance, operator location, operator safety concerns, operator vibration records, team productivity, job resource requirements, customer information, jobsite information, parts information, contract information, warranty information, library resources, and/or the like, as is described in greater detail below. The data management server system 162 analyzes the collected data and, utilizing the collected data, provides some or all of the information listed above in a format useful to the user.

In some embodiments, the user, such as the fleet owner 101, accesses the web portal via a personal computing device 170 and a web browsing application stored thereon. The data management server system 162 provides the information to a secure web page in the format of graphs, charts, tables, and other graphics that help the user to quickly and intuitively see and understand what is being presented. The data management server system 162 also receives user input from the personal computing device 170, including input about information to be displayed, user preferences, and additional data about the fleet. In some embodiments, the personal computing device is a mobile phone 172, which may be operated by, for example, a team manager 102, an operator, a mechanic, or other team member in the field. In some embodiments, the mobile phone 172 has a fleet management application stored thereon that works with the data management server system 162 to communicate information back and forth between the user and the server system 162.

In some embodiments, the data management server system 162 provides different experiences, features, functions, and permissions to different types of users. As mentioned above, some types of user may include a fleet owner/manager 101, a team manager 102, an operator, and/or a mechanic. Another type of user may be a dealer 103 or other salesperson or the equipment manufacturer. The dealer 103 or manufacturer may also access the web portal via a computing device or company-owned server and may have access to a dealer portal or a manufacturer portal configured to provide information useful to dealers or manufacturers and configured to allow the dealer or manufacturer to enter information about equipment, equipment use, and/or customers that can be used by the data management server system 162, in conjunction with data collected by equipment data sensors, to provide equipment and operator information to a fleet manager, an equipment operator, or other user.

FIGS. 2A and 2B provide a block diagram 200 that illustrates components of the fleet management system 100 in more detail, in accordance with some embodiments of the invention. In this regard, FIG. 2A provides a block diagram of the data collection and communication portion of the system 100, including a data collection system 210 with an equipment data sensor 230, a data communication system 260, and an ID unit 250. FIG. 2B provides a block diagram of the data management and presentation portion of the system 100, including a data management server system 270 and a client computing device 290.

As used herein, the terms "processing device" and "processor" refer to circuitry for implementing one or more of the communication and/or logic functions of the device within which the processor/processing device is installed. For example, the processing devices described herein may include a digital signal processor device, a microprocessor device, and various analog to digital converters, digital to analog converters, and/or other support circuits. Control and signal processing functions of the device within which the processing device is installed are allocated between these circuitry devices according to their respective capabilities. The processing device thus may also include the functionality to encode and interleave messages and data prior to modulation and transmission. The processing device can additionally include an internal data modem, a data bus, and/or a power bus for communicating data and or power to other components and devices that are communicably coupled to the processing device. Further, the processing device may include functionality to operate one or more software programs, which may be stored in the memory to which the processing device is coupled. For example, the processing device may be capable of operating a connectivity program, such as a web browser application. The web browser application may then allow the device to transmit and receive web content, such as, for example, location-based content and/or other web page content, according to a Wireless Application Protocol (WAP), Hypertext Transfer Protocol (HTTP), and/or the like. A processing device may include a single processor or a plurality of processors that together perform the stated function(s). Where a processing device includes a plurality of processing devices/processors, the processing devices/processors are generally communicably coupled to each other via one or more communication devices, but they may not be physically coupled to each other; in other words, such processors may be located together or may be located separate and apart from each other.

The processing devices described herein may be configured to use one or more transceivers, network interfaces, or other communication interfaces to communicate with one or more other devices or networks. In this regard, "transceivers" described herein generally include an antenna operatively coupled to a transmitter and/or a receiver and configured to passively and/or actively send and/or receive data and/or power via electromagnetic waves (e.g., radio frequency waves, infrared waves, etc.) and wave modulation. The processing device may, therefore, be configured to provide signals to and/or receive signals from the transceiver. Where the transceiver is configured to communicate with a cellular network, the signals may include signaling information in accordance with the air interface standard of the applicable cellular system of the wireless telephone network. The transceiver may also be configured to operate in accordance with other communication mechanisms and standards, such as via a wireless local area network (WLAN), a Bluetooth® standard, a RFID (radio frequency identification) tag standard, proprietary wireless communication protocols, and/or other communication/data standards and networks.

As used herein, "memory" or "memory device" includes any computer readable medium (as defined herein below) configured to store data, computer-executable program code (e.g., software), or other information. Memory may include volatile memory, such as volatile Random Access Memory (RAM) including a cache area for the temporary storage of data. Memory may also include non-volatile memory, which can be embedded and/or may be removable. The non-volatile memory can additionally or alternatively include an electrically erasable programmable read-only memory (EEPROM), flash memory or the like. The memory may be configured to store any of a number of applications which comprise computer-executable instructions/code executed by the processing device to implement the functions of the devices described herein. The memory can also store any of a number of pieces of information/data used by the devices described herein. Memory or a memory device may include a single memory device or a plurality of memory devices that together perform store the stated information. Where the memory or memory device includes a plurality of memory devices, the memory devices are generally communicably coupled to each other via one or more communication devices and/or processing devices, but they may not be physically coupled to each other; in other words, such memory devices may be located together or may be located separate and apart from each other.

Referring again to FIG. 2A, a block diagram of an ID unit 250 is provided, according to an example embodiment of the invention. The ID unit 250 includes a processing device 252 communicably coupled to a short-range transceiver 264 and memory 254. The memory 254 includes a unique ID code 255 stored therein. Being unique, this ID code 255 can be associated with a particular operator 204 in order to uniquely identify the operator. For example, a particular ID code 255 may be associated with a particular operator 204 if the operator 204 always or usually carries an ID unit 250 with the same ID code 255 stored therein. In some embodiments, a particular ID code 255 may be associated with a particular operator 204 in a database stored in the memory 276 of the data management server system 270, described in greater detail below. The code can be any alphabetic, numeric, alphanumeric, or other type of code.

The processing device 202 is configured to use the short-range transceiver 264 to communicate the ID code 255 to the data collection system 210 at appropriate times using an appropriate wireless communication standard. For example, in one embodiment of the ID unit 250, the transceiver 264 comprises a 2.4 GHz antenna that is configured to work close to an operator's body. In one embodiment, the reading range for the transceiver 264 is two meters, although other ranges are possible. In some embodiments, the ID unit 250 is a passive RFID tag where the short-range transceiver 264 receives a wireless signal from the equipment data sensor 230 and, by virtue of this signal being received in the transceiver's antenna, the ID unit 250 is powered and automatically responds by transmitting the ID code 255 via a wireless signal that is received by the equipment data sensor 230. In other embodiments, the ID unit 250 comprises a battery (not shown) and actively transmits the ID code 255 either continuously, periodically (e.g., every second), or in response to receiving a signal from an equipment data sensor 230. In some embodiments where the ID unit 250 comprises a battery, the ID unit 250 also comprises a motion detector (not shown) and, to conserve battery, is configured to stop transmitting signals when no motion is detected for longer than a predetermined amount of time and then resume transmissions when motion is detected again. Where the ID unit 250 has a battery, it may be preferable to configure the ID unit 250 and the battery so that the battery life is at least one year.

In one embodiment of the invention, the operator ID unit 250 uses the CC 2510 Short Range Device (SRD) RF transceiver provided by Texas instruments, which is a system on chip transceiver with a built-in microprocessor. In one such embodiment, the operator ID unit 250 uses the CC 2510 which is based on the CC 2500 used for the transceiver in both the equipment data sensor 230 and the data communication system 260. The supported modulation schemes at 250 kbit/s are OOK, 2-FSK, GFSK and OQPSK Offset Quadrature Shift Keying). The frequency range is 2.400 GHz to 2.483 GHz allocated as ISM (Industrial, Scientific and Medical). The data rate over the air may be 250 kbit/s. The receiver sensitivity may be 81 dBm.

As described above, the ID unit 250 may take a variety of forms, but is preferably a water-resistant, wearable device that can be easily carried by or attached to an operator 204. For example, the ID unit may be a data card (e.g., a credit-card sized card), a wristband, a chip sewn into the operator's gloves, a key fob, a watch, a necklace, and/or the like. Although the typical example may utilize RFID technology, other wireless communication arrangements are conceivable such as, e.g., Bluetooth® or WiFi. As described above, in some embodiments of the invention the ID unit 250 is combined with a mobile phone and, as such, the memory 254, processing device 252, and short-range transceiver 264 may be those of a mobile phone capable of also performing other functions of the mobile phone. In some embodiments, the ID unit 250 may also include a user interface (e.g., a keypad, touch pad, display, LED, or the like) (not shown) for receiving user input and/or providing user output. For example, the ID unit 250 may have a keypad for receiving a PIN code or a biometric device for authenticating the operator holding the ID unit. In some embodiments, the ID unit 250 may have the ID code 255 printed thereon along with the operator's name and/or image or a place for an operator to write his or her name or attach a picture.

Although only a single ID unit 250 and operator 204 are shown in FIG. 2A, it will be appreciated that the fleet management system may comprise a large number of operators and ID units, where each ID unit is carried by or otherwise associated with a particular operator. In some embodiments, one or more ID units 250 come with the purchase of a piece of equipment 202 and/or an equipment data sensor 230, but also can be purchased individually or in packs.

FIG. 2A further provides a block diagram of a data collection system 210 comprising an equipment data sensor 230, in accordance with an example embodiment of the invention. As illustrated, each piece of outdoor power equipment 202 in the fleet that is to be monitored by the fleet management system 100 is equipped with a data collection system 210 for collecting data about parameters related to the equipment and/or the equipment's environment and communicating the collected data to the data communication system 260. Each data collection system 210 generally includes an equipment data sensor 230 installed on the equipment 202 or otherwise positioned proximate to the equipment 202 during operation of the equipment 202. The equipment data sensor 230 may encompass the whole data collection system 210 or the equipment data sensor 230 may be combined with other components, such as other components of the equipment 202, to form the data collection system 210. Each equipment data sensor 230 includes a processing device 232 communicably coupled to one or more transceivers 234, a clock/timer 248, a power source 246, memory 240, and one or more sensors 249.

The memory 240 includes a sensor application 242 stored therein. The sensor application 242 comprises computer readable program code (e.g., software, etc.) for instructing the processing device 232 to operate the various hardware components and to store, process, and communicate data 244. The memory 240 can be any computer-readable medium, such as flash memory. In one embodiment, the equipment data sensor 230 is configured to automatically update the sensor application 242, and any firmware in the other hardware, when in communication with a data communication system 260 that is connected to the data management server system 270.

The processing device 232 executes the sensor application 242 to, amongst other things:

(i) use the transceiver(s) 234 to receive and process wireless signals from one or more ID units 250 or other equipment data sensors;

(ii) use the transceiver(s) 234 to send wireless signals to one or more ID units 250 or other equipment data sensors;

(iii) use the sensor(s) 249 and/or communicate with the equipment's control system 212 to gather other data about the equipment 202 or its environment;

(iv) store data in the memory 244;

(v) use the transceiver(s) to send data to and receive data from the data communication system 260;

(vi) use the clock 248 to determine absolute or relative time and associate data with a time; and/or (vii) use the equipment's user interface 209 to communicate information to the operator 204.

The memory 240 also, at least temporarily, stores the data 244 collected by the processing device 232 from the sensor (s) 249 and/or the equipment's control system 212. This data 244 may be comprised of individual data packets/packs, where each data packet relates to one instance or period of time and includes: (i) sensor data or other equipment-related data collected at that point in time; (ii) any ID codes identified from nearby ID units 250 at that point in time; (iii) any identification codes identified from other equipment data sensors nearby at that point in time; (iv) any identification codes identified from data communication systems 260 nearby at that point in time; (v) a timestamp indicating the point in time; and/or other data. This data 244 may be deleted from the memory 240 after the data 244 is uploaded to a data communication system 260 or the data management server system 270, and/or the data 244 may be deleted after it reaches a certain age or as the memory 244 reaches certain capacities.

As illustrated, some embodiments of the equipment data sensor 230 are also uniquely associated with an ID code 245 that can be used by the data management server system 270 to identify the particular equipment data sensor 230 and, thereby, the particular piece of equipment 202 to which the equipment data sensor 230 is attached or otherwise associated. This equipment ID code 245 may be transmitted to the data management server system 270 via the data communication system 260 along with data 244. This way the data 244 can be properly associated with a particular piece of equipment. For example, the equipment ID code 245 may be transmitted at the beginning and/or end of any transmission from the equipment data sensor 230 and/or the equipment data sensor 230 could add the equipment Id code 245 to each data packet along with the captured equipment data and any operator ID codes. The equipment ID code 245 may also assist with routing communications back to a particular equipment data sensor 230 from a data communication system 260 and/or the data management server system 270.

The equipment data sensor 230 also includes one or more transceiver(s) 234, which may comprise one or more transmitters and/or receivers. In some embodiments of the invention, the transceiver 234 is comprised of a relatively short-range transceiver 236 and a relatively long/medium-range transceiver 238. In such an embodiment, the short-range transceiver 236 may be used to identify and communicate with nearby ID units 250 and/or equipment data sensors on other equipment, and the long-range transceiver 238 may be used to identify and communicate with data communication systems 260 (e.g., base stations 112, satellite stations 114, mobile phones 116, or other communication units) to send collected data to the data communication systems 260 and/or to receive information or updates from the data communication systems. In one such an embodiment, the short-range transceiver 236 is configured to have a maximum range of approximately two meters and the long-range transceiver 238 is configured to have a range of at least twenty meters. Of course, these ranges are examples and other ranges are possible. In some embodiments the short-range transceiver 236 and the long-range transceiver 238 share a single antenna, such as a 2.4 GHz antenna but use different communication protocols, modulation techniques, and/or amounts of power. In other embodiments a single transceiver 234 is used to communicate to both the ID units 250 and the data communication systems 260, but the equipment data sensor 230 may be configured to adjust the power to limit the range in which ID units 250 are recognized to something less than the range used to communicate with the data communication system 260.

In addition to communicating wireless signals to and/or from operator ID units 250 and data communication systems 260, in some embodiments the processing device 232 uses the short range transceiver 236 of the equipment data sensor 230 to periodically broadcast an equipment ID code 245 over a short range to allow the equipment ID code 245 to be sensed by other equipment data sensors that may be in the nearby area. Also, in some embodiments, the equipment data sensor's transceiver 234 communicates with other types of ID units similar to the operator ID unit 250 that uniquely identify equipment that do not have equipment data sensors 230 (such as a ID data tag on the bed of a truck in the fleet or in a storage unit or service garage).

The equipment data sensor 230 also includes a clock 248 which may be any timing device. The clock 248 may keep track of global standard time or a relative time and is used to allow the processing device 232 to perform actions, such as capturing data from the sensors 249 or transmitting signals using the transceiver 234, in regular intervals. The clock 248 also allows the processing device 232 to store collected data in time sequence or with a timestamp that shows when the data was collected relative to when other data was collected and, in some embodiments, relative to global standard time or another standardized temporal indicator.

The processing device 232 of the equipment data sensor 230 is configured to communicate with one or more sensors to collect data about the equipment, operation of the equipment, and/or the equipment's environment. In some embodiments, the equipment data sensor 230 has sensors 249 built into the equipment data sensor 230, itself. In fact, in some embodiments the equipment data sensor 230 is entirely self-contained, and in some cases self-powered, and does not require any hard-wired connections to any electrical components of the equipment 202. Such an embodiment may make installation of the equipment data sensor 230 easier and more universal, particularly if the installation occurs after manufacturing of the equipment 202.

In other embodiments, in addition to or as an alternative to having sensors 249 incorporated into the equipment data sensor 230, the processing device 232 may be configured to collect data from one or more sensors 222 that are built into the equipment 202 apart from the equipment data sensor 202. For example, the equipment data sensor 230 may be configured to obtain and store in memory 240 the status of an operator presence sensor typically built into the seat of a riding lawn mower to identify whether an operator is seated in the seat of the riding lawn mower. In this regard, the processing device 232 may be communicably coupled (e.g., coupled by a wired or wireless connection) to an equipment control system 212 of the equipment 202 to "tap into" the equipment's electrical system and receive data from the equipment sensors 222. As such, some embodiments of the equipment data sensor 230 include a wiring harness arranged to exhibit connecting ports for providing connection between the processing device 232 of the equipment data sensor 230 and the equipment control system 212 and/or various external sensors 222 or switches 224. The equipment control system 212 may include a processing device (e.g., one or more processors, a data bus, circuits, etc.) for communicating with the equipment's sensors 222. It should be appreciated that the equipment sensors 222 may include switches 224 where the sensed data from a switch 224 comprises the status of the switch 224 (e.g., on, off, etc.). The equipment control system 212 may also be communicably coupled to the equipment power source 246 and the equipment user interface 209 and, therefore, in some embodiments the processing device 232 of the equipment data sensor 230 can receive and store information about user inputs entered through the equipment user interface 209 and provide user output via the equipment user interface 209 (e.g., user output that may originate from the data management server system 270).

In some embodiments, the sensors 249 and/or 222 that are communicably coupled to the processing device 232 of the equipment data sensor 230 include one or more of the following: GPS receivers, RPM sensors (e.g., RPM-sensing antennas), three-axis accelerometers or other accelerometers, electro-mechanical switches, inclinometers, thermocouples or other temperature sensors, proximity sensors, fluid level sensors, pressure transducers or other pressure sensors, moisture sensors, motion detectors, magnets and magnetic field sensors, Hall-effect switches, RF antennas, infrared sensors, lasers, shock sensors, speed sensors, vibration sensors, and/or other sensors. In some embodiments, the equipment data 244 collected and stored by the equipment data sensor 230 includes one or more of the following: GPS or other location data, engine RPM, component (e.g., cutting blades) RPM, accelerations, orientation, incline, ambient temperature, engine temperature, transmission temperature, component temperature, nearby equipment ID codes, nearby communication system ID codes, throttle status, PTO status, brake status, clutch status, user input commands, switch statuses, fuel consumption, fuel level status, oil level status, battery level status, voltage, electrical current, velocity, operator presence in a seat or other operator station, heading, run time, ignition status, vibration, shock, tire level, tire condition, differential locking, wheel spinning, emissions, wheel slipping, humidity, force, moisture, pressure, altitude, tampering, equipment hatch opening or closing, user input, component replacement, and/or other parameters/metrics about the equipment's status, use, operation, and/or environment.

For example, in some embodiments of the equipment data sensor 230, the sensor(s) 249 include sensors for sensing the engine speed, the PTO speed, and/or the work performed by the engine. For example, the engine speed may be sensed by an RPM sensor for sensing (exactly or approximately) the revolutions per minute (RPM) of the motor shaft, which may be the crankshaft of an internal combustion engine or the shaft driven by an electric or hybrid engine. The PTO speed may be sensed by the RPM of a PTO shaft or pulley. The engine workload may be sensed by some ratio of the actual engine speed, throttle position, reference engine speed, and/or PTO speed.

According to one embodiment of the invention where the equipment data sensor 230 is arranged to collect information regarding the RPM of the equipment's internal combustion engine, the equipment data sensor 230 may include an "intelligent sensor" in the form of a registration unit mounted around or adjacent to the ignition cable. This registration unit is capable of sensing and storing electrical impulses that arise at each ignition, meaning the RPM may be retrieved since increased engine speed results in more frequent ignition pulses.

In another embodiment described in detail below with reference to FIGS. 3A, 3B, 4A, and 4B, the RPM sensor comprises a RPM antenna that is located some distance (e.g., between 1 and 40 centimeters) away from the ignition cable that is configured to determine engine RPM by sensing electromagnetic waves generated by equipment components that vary with the RPM of an internal combustion engine (e.g., waves generated by the electrical ignition pulses that arise in the ignition circuit and that change based on the engine speed). This embodiment may have an advantage over other embodiments because it may be more cost effective and permits sensing of engine RPM from a distance away from the ignition cable, senses the RPM passively, provides for easier installation, and avoids interfering with the ignition cable or other engine components since it does not require that the RPM sensor be hardwired into electrical or engine systems of the equipment 202. Hereby it may also be possible to register and store when the engine is started as well as when it is shut down, and moreover the RPM-levels between start and shut down. In some embodiments where such an RPM antenna is used and actual engine RPM may not be needed or cannot be obtained, such as for some types of riding mowers or some other vehicles, then an adapter/sensor combination may be attached to equipment to sense one or more other characteristics about the equipment or the equipment's use and convert the sensed information into electromagnetic pulses that simulate ignition circuit pulses. Different "RPM" values can be used to communicate different information according to some predetermined rules. For example, the adapter could create electromagnetic pulses consistent with an engine RPM of 500 to indicate to the equipment data sensor 230 (via the RPM antenna) something like "engine on and PTO not engaged" and an pulses consistent with an engine RPM of 1000 to indicate something like "engine on and PTO engaged." In this way, the same equipment data sensor 230, such as the universal equipment data sensor described with respect to FIGS. 3A, 3B, 4A, and/or 4B, could be used for a greater number of equipment types and to sense a greater variety of data according to the particular needs of the user and requirements or limitations of the equipment type or its environment.

In another embodiment, the RPM sensor of the equipment data sensor 230 comprises at least one intelligent powered sensor that is configured to be self-energized and, in some cases, power the rest of the equipment data sensor 230. Specifically, in some embodiments the RPM sensor of the equipment data sensor 230 includes an inductor powered by electromagnetic energy from the engine of the equipment 202. A magnet is added to one portion of the flywheel of the engine of the equipment 202. The RPM sensor is then located in such a way that passing magnetic fields (created by the magnet as the flywheel turns and the magnet passes the sensor) can be sensed and registered by the RPM sensor (e.g. by means of a RPS sensor comprising metal portions). The RPM sensor then transforms these magnetic fields into electrical signals which can be further transmitted to the processing system 232 of the equipment data sensor 230 and used thereby to estimate RPM and engine start and stop, and/or to power the equipment data sensor 230 (including charge any of the its batteries). A similar setup could be used to sense the speed (e.g., RPM) of and receive power from other rotating/moving devices on the equipment 202, such as a PTO shaft, a belt, a pulley, a cutting element, and/or the like, by similarly attaching a magnet to the rotating/moving component to be sensed. Other sensors may also be used to sense RPM or other speed indicators of an engine or component, such as Hall-effect switches located near the moving component.

In some embodiments, the equipment control system 212 is configured to control fuel supply to the internal combustion engine of the machine, and the equipment data sensor 230 is communicably coupled to the equipment control system 212. On some such embodiments, the equipment data sensor 230 may receive power from this connection. In some embodiments the equipment control system 212 may be arranged to control the carburetor of the equipment 202 and include: (i) a throttle position detecting mechanism for sensing the position of the throttle valve; and/or (ii) a fuel valve mechanism for controlling the fuel supply to the engine. The equipment data sensor 230 may be communicably coupled to the throttle position detecting mechanism (e.g., via the equipment control system 212) at least for sequentially obtaining values representing the position of the throttle valve. The equipment data sensor 230 may also be an integrated part of the equipment control system 212 and vice versa. Such an arrangement may allow for use of the equipment control system 212 for adjusting the air/fuel mixture to the engine for current conditions, thereby lowering the fuel consumption, and at the same time being able to use the equipment data sensor 230 for registering and storing information about to what extent the equipment control system 212 has been activated during the running of a machine. Thus, in embodiments where the equipment 202 includes an equipment control system 212 for, for example, controlling a fuel supply to an internal combustion engine of the machine, the equipment data sensor 230 can be configured to receive values of at least one parameter from the equipment control system 212. One such parameter could be the throttle position which, taken together with the RPM, can be used for rendering an estimated value of load and/or fuel consumption.

In some embodiments, the equipment control system 212 includes an ignition module for controlling the ignition timing of an internal combustion engine of the equipment 202. In such embodiments, the equipment data sensor 230 may be preferably integrated with the ignition module or capable of being attached to the ignition module, and said ignition module may be arranged to control the ignition timing of an internal combustion engine of the machine. In such an embodiment, the equipment data sensor 230 may be connected to the ignition system and may be arranged to become activated when the ignition system is switched on.

Powering of the equipment data sensor 230 can be achieved in different ways, some of which have been described above. According to some embodiments, the power source 246 of the equipment data sensor 230 comprises one or more batteries. In some such embodiments, the batteries are rechargeable batteries and, in some embodiments, are charged by electromagnetic induction generated by moving magnets, e.g. placed on the engine flywheel of the equipment 202. An example of electromagnetic converting means arranged to convert magnetic energy into electrical energy is described in U.S. Patent Application Publication No. 2011/0095215, which is hereby incorporated by way of reference and which is commonly owned by an assignee of the present application. Thus the batteries of the equipment data sensor 230 may be charged while the equipment 202 is running by this induction method or by otherwise connecting the batteries to the equipment's power source 208 (battery, electrical circuits, engine, solar cell, generator, etc.).

In some embodiments, the equipment data sensor 230 is configured to transmit information about battery status (e.g., voltage) to the data management server system 270 so that any worn-out battery can be identified by the fleet management system and an appropriate alert can be sent by the data management server system 270 to a person responsible for changing the battery. Furthermore, the equipment data sensor 230 may also be configured to collect, store, and communicate information related to the voltage of the ID unit 250 (e.g., via the power of the wireless signal detected by the equipment data sensor 230 when it's known how far way the ID unit 250 is from the sensor 230, for example, by determining that the ID unit 250 is carried by the actual equipment operator) whereby battery status of a battery in the ID unit 250 (in embodiments where there is such a battery) can be monitored by the fleet management system 100 and worn out batteries promptly replaced by users of the system 100.

In sum, it is to be understood that the equipment data sensor 230 may refer to any type of unit which provides one or more functions, namely to: (i) obtain/collect and store values of parameters associated with a piece of equipment 202 or the operation or environment thereof, and, optionally (unless expressly claimed otherwise) (ii) receive and store incoming operator ID-codes. In this regard, the equipment data sensor 230 typically includes a central processing device 232 arranged to sequentially obtain and store values of said at least one parameter during operation of the machine, whereby a wide variety of informative data related to a given moment in time may be achieved. The obtained parameters and any ID codes are stored together in memory 240 in a respective data packet. Each data packet may also include a timestamp so that the equipment data sensor 230 may collect various data in data packets containing information about, for example, the operator and an equipment parameter together with a timestamp whereby the collected information is correlated with the period or point in time when the information was collected or stored.

It is to be understood that the equipment data sensor 230 and the components described herein may be constituted by various sub-units (e.g. different types and number of sensors depending on what type of data is to be collected) as well as it can be mounted into the equipment 202 in many different ways, e.g. depending on the type of engine (combustion engine or electrical engine) and type of equipment 202 (e.g., wheeled, handheld, etc.), and can be powered in various ways (e.g. with separate batteries or via the engine of the powered machine). In situations where the equipment 202 is powered by an electric motor, the equipment data sensor 230 may have another composition compared to some of the previously-described embodiments for equipment having a combustion engine. For instance, for electric equipment, the equipment data sensor 230 or a portion thereof may be an integrated part of the electric motor control system, such as a data chip on a printed circuit board.

FIG. 2A also provides a block diagram of a data communication system 260 in accordance with some embodiments. The data communication system 260 may be, for example, the base station 112, the satellite station 114, the mobile phone 116, or other communication unit or combination of communication units described with reference to FIG. 1. The data communication system 260 is configured to relay information collected by one or more equipment data sensors 230 to the data management server system 270 via network 206. The data communication system 260 generally comprises a processing device 262 communicably coupled to one or more transceiver(s) 264, a network interface 265, and a memory 266. The processing device 262 uses the network interface 265 and the transceiver 264 in accordance with computer-executable instructions of the collector application 268 stored in the memory 266. In some embodiments, the equipment data sensor 202 periodically looks for a data communication system 260 so that when the equipment 202 is brought within the broadcasting range of the data communication system 260 the equipment data 244 (including any operator ID codes 255, equipment ID code 245, and captured equipment data) is submitted thereto by, for example, the equipment data sensor 230 wirelessly transmitting the information in the form of the previously-described data packets. In other embodiments, the equipment data sensor 202 may be configured so that it only looks for a data communication system 260 when the engine is shut down. The equipment data sensor 202 may determine, for example, that the engine is shut down when no ignition signals are received through the RPM sensor or by some other communication with the equipment's control system 212, user interface 209, or power source 208.

Each data communication system 260 may receive and store information from at least one, and perhaps from more than one, equipment data sensor 230 located within broadcasting range. The data communication system 260, which may temporarily store the data 244 in the memory 266, thereafter uses the network interface to transmit the data 244 (in the form of the digital data packets) to the data management server system 270. The data management server system 270 is thereby provided with information in the form of equipment and operator data, and is continuously/periodically updated about the status of a fleet in operation as new information from the data communication system 260 is received.

As illustrated in FIG. 2A, the memory 266 of the data communication system 260 may, in some embodiments, include an operator ID code 255 and/or a communication system ID code 269. The communication system ID code 269 may be uniquely associated a particular data communication system 260 and then used by the data management server system 270 to identify the particular data communication system 260. This ID code 269 may be useful to the data management server system 270 for: (i) identifying the source of data generally; (ii) identifying problems with a data communication system 260 (iii) tracking the location of one or more pieces of the equipment (e.g., by associating the location of the equipment 202 with a known location of the data communication system 260 at the time of the communication between the equipment's data sensor 230 and the data communication system 260); (iv) identifying the fleet owner or account associated with certain incoming data; and/or (v) routing communications back to a particular data communication system 260 and/or equipment data sensor 230 from the data management server system 270. This communication system ID code 269 may be transmitted to the data management server system 270 along with data 244. For example, the communication system ID code 269 may be transmitted at the beginning and/or end of any transmission from the data communication system 260 and/or the data communication system 260 could add the equipment ID code 269 to each data packet along with the captured equipment data and any operator ID codes and equipment ID code.

As described above, in some embodiments of the fleet management system 100 where the data communication system 260 comprises a mobile device 116 that can be assumed to be specific to and carried by a particular operator, the data communication system 260 may also function as an ID unit 250. Therefore, in such embodiments, the memory 266 may also contain an operator ID code 255. This may be transmitted to the equipment data sensor 230 using the transceiver 264 in much the same way(s) described above with reference to the ID unit 250 or, alternatively, it may be added to the data 244 as the data 244 passes through the data communication system 260 on its way to the data management server system 270.

The network 206 may be any data communication network. In some embodiments, the network 206 comprises a global area network such as the Internet and/or a cellular telephone network. However, the network 206 may also comprise a local area network (LAN) or a wide area network (WAN). The network 206 may comprise one or more wireless networks and/or one or more wired networks.

In one embodiment of the invention, the network 206 comprises the Internet and the data communication system's network interface 265 comprises an Ethernet interface and is configured to communicate with the data management server's network interface 272 using Hypertext Transfer Protocol (HTTP), Transmission Control Protocol/Internet Protocol (TCP/IP), Dynamic Host Configuration Protocol (DHCP), and/or Domain Name System (DNS) protocol. In another embodiment of the invention, the network 206 comprises a mobile communication network and the data communication system's network interface 265 comprises one or more known cellular/mobile antennas and is configured to communicate with the data management server's network interface 272 using one or more known cellular/mobile communication and data formatting protocols.

The data management server system 270 is configured to receive the data 244 including the various ID codes from a plurality of equipment data sensors 230 via a plurality of data communication systems 260 and process the data 244 to provide the data and other data based thereon in a useful form and/or to provide one or more services for users of a fleet management portal that is hosted on the network 206 by the data management server system 270. For example, in some embodiments, the data management server system 270 provides a fleet management service for numerous fleet owners across the world. In some embodiments, portions of the fleet management portal are geared to fleet owners while other portions may be targeted to operators, dealers, manufacturers, and/or other users. Furthermore, in some embodiments of the invention, the data management server system 270 can use the data it receives to provide other useful data back to the equipment data sensor 230 for presentation to an operator of the associated equipment 202 via the equipment user interface 209 and/or for use by the equipment control system 212.

The data management server system 270 generally includes a processing device 274 communicably coupled to a network interface 272 and memory 276. These components may be located on a single network server or distributed across several coupled or independent servers. The network interface 292 is configured to connect to the network 206 and communicate via the network's protocols, such as HTTP and/or other Internet or mobile network protocols. As such, depending on the embodiment, the network interface 292 may include, for example, a web modem and/or some other type of data transceiver.

The memory 276 includes a fleet management server application 278 comprising computer-executable code that, when executed by the processing device 274 instructs the processing device 274 to perform the various functions of the data management server system 270 described herein. For example, the fleet management server application 278 instructs the data management server system 270 to receive data from the network 206, store the data, processes the data, provide feedback to the data communication systems 260 and equipment data sensors 230, and/or host a fleet management web portal or mobile application that presents users 203 with the fleet and operator data in the form graphs, tables, charts, numbers, graphics, images, audio, alerts, and/or the like in the context of a web page or mobile application and/or via emails, text messages, printouts and/or other communication formats. In this regard, embodiments of the fleet management server application 278 may include computer-executable program code that, in combination with a processing device capable of executing the code, provides: (i) a receiver module 278A for receiving data from the data communication systems 260 (e.g., the HTTP Posts) via the network interface 272 and storing the data 282 in the fleet management system database 280; (ii) a parser module 278B for taking the data 282 received by the receiver module 278A, which in the native format as created by the equipment data sensor 230 or other devices in the data collection system, and parses and translates the data 282 for eventual conversion and presentation in a fleet management portal; and (iii) a converter module 278C for converting and enriching collected data 282 before it is presented in a fleet management portal as processed fleet data 284 (e.g., performing data conversions, performing lookups like warning levels, rules, calculated performance indicators, equipment information, baselines, references, etc., and calculating ratios, totals, averages, etc.). In some embodiments, the fleet management server application 278 also includes computer-executable program code that, when executed by the processing device 274 provides over the network 206 different versions of a fleet management portal, such as a user portal 278D intended for fleet owners, fleet managers and/or equipment operators, a dealer portal 278E intended for dealers or other sales personnel, a manufacturer portal 278F intended for equipment manufacturers, and/or a service provider portal 278G intended for the provider of the fleet management system or the provider's service personnel.

The memory 280 also includes, as mentioned above, a fleet management system database 280 that stores: (i) the collected fleet data 282 received from the equipment data sensors 230 via the data collection systems 260; (ii) processed fleet data 284 which includes data derived by the data management server system 270 from the collected fleet data 282; (iii) fleet owner account data 286 which includes data about the fleet owners, their accounts, and their account preferences; and (iv) dealer account data 288 which includes data about the equipment dealers, their products and services, equipment parts, the dealers' accounts, and their account preferences.

Users 203 of the fleet management system 100, who may be fleet owners, equipment dealers, equipment repairmen, homeowners, operators, customers, and/or others, can access the fleet management portal using a client computing device 290. The client computing device 290 may be, for example, a personal computer or a mobile smart phone. As illustrated in FIG. 2B, the client computing device 290 generally includes a processing device communicably coupled to a network interface 292, a user interface 293, and memory 295. The network interface 292 is configured to connect to the network 206 and communicate with the data management server system 270 via the network's protocols. As such, depending on the embodiment of the client computing device 290, the network interface 292 may include, for example, a web modem and/or a cell phone transceiver. The memory 295 includes a web browsing application 296 and/or a fleet management client application 297 that are executed by the processing device 291 to allow the user to access, view, and interact with the fleet management portal via the network 206. Information provided via the fleet management portal by the data management server system 270 is, in some embodiments, displayed on the display 294 or otherwise provided through other user output devices of the client computing device 290. The user 203 interacts with the fleet management portal and provides input to the data management server system 270 using one or more user input devices of the client computing device's user interface 293.

Universal Equipment Data Sensor with RPM Sensor

FIGS. 3A, 3B, 4A, 4B, and 5 provide schematic and electrical diagrams of an example equipment data sensor 300 including an example engine RPM sensor 550, according to some embodiments of the invention. This particular example of the equipment data sensor 230 described with reference to FIG. 2A is referred to herein as the "universal equipment data sensor" 300 because it is configured so that, in some embodiments of the fleet management system, it may be used across all or at least many different types of outdoor power equipment in the fleet with little or no modification to the sensor and/or the equipment. However, the universal equipment data sensor 300 may or may not be completely "universal" depending on the embodiment. Furthermore, elements of the equipment data sensor and engine RPM sensor described with reference to FIGS. 3A, 3B, 4A, and 4B may be used in other embodiments of the equipment data sensor 230 and are not necessarily limited to the universal equipment data sensor 300.

FIGS. 3A and 3B provide schematic diagrams showing a possible construction and layout of the universal equipment data sensor 300, in accordance with one embodiment of an equipment data sensor 230. Specifically, FIG. 3A illustrates a top view of the sensor's printed circuit board (PCB) 310, which in one embodiment is between thirty and forty millimeters wide and between thirty and forty millimeters long. FIG. 4A is an electrical diagram 520 showing an example embodiment of the electrical circuits of the universal equipment data sensor 300 or, more generally, the equipment data sensor 230 and components thereof.

Referring again to FIG. 3A, the PCB 310 comprises a component area 312 having a microprocessor 350 (which, in this embodiment, is part of the processing device 232 shown in FIG. 2A) located therein. The microprocessor 350 is operatively coupled to a radio 325 (which, in this embodiment, is part of the transceiver 234 of FIG. 2A), a memory device 330 (which, in this embodiment, is part of the memory 240 of FIG. 2A), a 26 MHz crystal oscillator 349 (which, in this embodiment, is part of the clock 248 of FIG. 2A), a 32 KHz crystal "wake-up" oscillator 345 (which, in this embodiment, is part of the clock 248 of FIG. 2A), a plurality of capacitors 360 (which, in this embodiment, are part of the processing device 232, the RPM sensor 249, and perhaps other components having capacitors in their circuits of FIG. 2A), and an opto-coupler 390 (which, in this embodiment, is part of the processing device 232 of FIG. 2A), which are all also located in the component area 312 of the PCB 310. The microprocessor 350 is also operatively coupled to a 2.4 GHz antenna 320 (which, in this embodiment, is part of the transceiver 234 of FIG. 2A) and a RPM antenna 380 (which, in this embodiment, is part of a RPM sensor 249 of FIG. 2A) located on the PCB 310 in the area surrounding the component area 312. It will be appreciated that, although the only sensor shown in FIGS. 3A and 3B is an engine RPM sensor, other embodiments of the universal equipment data sensor 300 may have other sensors incorporated therein and/or may receive data from other sensors located elsewhere on the equipment.

In one embodiment, the microprocessor 350 comprises an xmega256 microprocessor provided by Atmel Corporation. The micorprocessor 350 may be a low power, high performance 8/16-bit AVR microcontroller featuring an 8 KB boot code section, 16 KB SRAM, 4096-Byte EEPROM, external bus interface, 4-channel DMA controller, 8-channel event system, and up to 32 MIPS throughput at 32 MHz. FIG. 4A shows an electrical diagram of an example MicroControl Unit (MCU) circuit 525 which may comprise the microprocessor 350. Other microprocessors may be used in addition to or in place of this particular example.

The memory of the universal equipment data sensor 300 may include memory in the microprocessor for storing computer-executable code, such as a 256 KB self-programming flash program memory, and the memory device 330 for storing collected data 244 and/or additional computer-executable code. In one embodiment, the memory device 330 is a 32 MB flash memory device. FIG. 4A shows an electrical diagram of an example memory circuit 522 which may comprise the memory device 330. Other memory devices may be used in addition to or in place of these particular examples.

The radio 325 and the 2.4 GHz antenna 320 form the RF transceiver 234 of the universal equipment data sensor 300. This radio 325 is configured to use the 2.4 GHz antenna 320 to wirelessly communicate with both the ID units 250 and the data communication system 260. In one embodiment, the radio 325 comprises the CC2500 radio provided by Texas Instruments. In this regard, the radio 325 may be a low-cost, 2.4 GHz transceiver designed for very low-power wireless applications and having a circuit intended for the 2400-2483.5 MHz ISM (Industrial, Scientific and Medical) and SRD (Short Range Device) frequency band. The radio 325 may be integrated with a baseband modem that supports various modulation formats and has a configurable data rate up to 500 kBaud. The radio 325 works with the microprocessor 350 to perform packet handling, data buffering, burst transmissions, clear channel assessment, link quality indication and wake-on-radio. FIG. 4A shows an electrical diagram of an example transceiver 526 which may comprise the radio 325 and the antenna 320. Other radios and antennas may be used in addition to or in place of these particular examples.

Since accurate start-up and general system timing is desired in the universal equipment data sensor 300, the sensor 300 comprises a 32 KHz crystal oscillator 345 and a 26 MHz crystal 340. The 32 KHz crystal oscillator 345 is the "wake-up" oscillator and is used as a wake-up timer. The 32 KHz crystal oscillator 345 is calibrated by the 26 MHz oscillator, which controls start-up of components and general system timing. These crystals may be quartz crystals. FIG. 4A shows an electrical diagram of an example clock circuit 521 comprising a Real-Time Clock (RTC) circuit which may include the crystal oscillator 345 and/or crystal 340. Other crystals and oscillators may be used in addition to or in place of these particular examples.

The universal equipment data sensor 300 may also include other electrical components for managing power, safety, and/or performance of the sensor 300 such as one or more capacitors 360 for regulating power and an opto-coupler 390 (also sometimes referred to as an opto-isolator) for preventing damage to the other electrical components caused by rapidly-changing voltage or high voltage differentials across the circuit.

The universal equipment data sensor 300 also includes a RPM sensor for sensing the RPM of the equipment's engine. In this embodiment, the RPM sensor comprises an RPM antenna 380 that senses electromagnetic waves created by pulses in the equipment's ignition cable when the engine is running. The pulses and frequency of the electromagnetic waves vary with the engine's RPM and, therefore, can be used to sense the engine's RPM.

In one embodiment, the sensor 300 is capable of using the RPM antenna 380 to wirelessly sense engine RPM up to forty centimeters away from the ignition cable. As such, placement of the universal equipment data sensor 300 on the equipment is somewhat flexible. Where all of the sensors (such as the RPM sensor) used by the universal equipment data sensor 300 to collect data about the equipment are contained within the PCB 310 as shown in this example, and where the sensor 300 has its own power source such as a battery, the universal equipment data sensor 300 can be installed on a variety of machines with relative ease. In one embodiment, where a battery is used to power the sensor 300, the battery and power usage of the sensor 300 may be configured such that the 1200 hour-per-year user may have to replace the battery every year, while a 600 hour-per-year user may only have to replace the battery every other year.

FIG. 4A shows an electrical diagram of an example engine RPM sensor circuit 550 which may comprise the antenna 380. FIG. 4B provides a combination block diagram and electrical diagram illustrating the engine RPM sensor circuit 550 and how it functions in more detail according to one embodiment. As illustrated in FIG. 4B, for equipment 202 where the equipment power source 208 includes an internal combustion engine 216, the equipment control system 212 will generally include an ignition module 213 electrically coupled to one or more spark plugs 215 in the engine 216 via an ignition wire 214. The illustrated embodiment of the engine RPM sensor 550 senses engine RPM by sensing electromagnetic pulses/waves 555 emanating from the ignition wire 214 whenever the signal changes in the wire corresponding to a spark being generated in a spark plug 215. This particular solution takes no energy from the ignition system and may allow for wireless sensing of engine RPM from a variety of locations on or around the equipment 202.

More particularly, the input to the RPM sensor unit 550 is an area on the printed circuit board of the equipment data sensor 230 that works as an antenna 580 with enough area to pick up the electric field 555 generated by the ignition circuit (e.g., the ignition wire 214). The antenna 580 is electrically coupled to the rest of the RPM sensor circuit 550, which in this embodiment includes two very-low-power integrated circuits 582 and 590 and two inverters 560 and 570 (one having a Schmitt trigger input).

Together with the other components, the current consumption of this RPM sensor 550 may be a maximum of approximately 0.1 µA when the engine is turned off, and the current may vary, according to the RPM, between 0.5 and 5 µA when the engine is on. Higher RPM results in higher current consumption. In some embodiments, all electronics in the RPM sensor 550 work with a power supply at approximately three volts.

The first circuit 582 located electrically between the antenna 580 and the first inverter 560 contains a capacitor 584 and a resistor 586, which together work as a filter and set the input impedance. The filter 584 protects against noise from internal high frequencies in the equipment data sensor 230 and external sources like mobile phones or the like. At the same time the filter 584 integrates the RPM-pulse from every ignition. When the engine is turned off the inverter input for the first inverter 560 is held low "0"=>0 volt, because the resistor 586 is connected to ground. Consequently, the output from the inverter 560 is high "1"=>3 volts. When a RPM-pulse occurs on the input via the antenna 580 with a peak level passing half the supply voltage, the inverter output of the first inverter 560 changes from "1" to "0". This functionality also protects against generated noise levels on the input below half the supply voltage.

The second circuit 590 located electrically between the first inverter 560 and the second inverter 570 has two functionalities. First, when the RPM—pulse sensed by the antenna changes the output of the first inverter 560 from "1" to "0", it quickly discharges a capacitor 594 in the second circuit 590 through a diode 592 and resistor 596, which lowers the voltage on the input to the second inverter 570. When that voltage passes the lower Schmitt trigger hysteresis voltage, then the output on the second inverter 570, and hence the input to the processing device 232, goes high "1". Second, when the RPM—pulse ends and the output from the first inverter 560 goes "1" high, then the second capacitor 594 is charged slower through the second resistor 598. And when that voltage over the second capacitor 594 passes the higher Schmitt trigger hysteresis voltage, then the output on the second inverter 570 and the input to the processing device 232 goes low "0". Consequently, one RPM—pulse is generated to the processing device 232 enabling the processing device to count the RPM pulses. The slower charge of the second capacitor 594 increases the output pulse length so it covers and minimizes double pulse detection. This "disable window" does not detect any pulse after the first detection for 270 uS.

In some embodiments, the equipment data sensor 520 has the capability to sample and process engine RPM data within the range of 0 and 15,000 RPM. As described above, this may be done by registering signal changes in the machine ignition cable, but other RPM sensors are also possible. In one embodiment, the equipment data sensor 520 stores samples in sessions of 15 minutes in order to preserve memory in an effective way. Each session may be stored as a histogram containing the number of samples per RPM interval over a particular period of equipment operation.

In some embodiments, the RPM sensor 520 samples every 5 ms (200 Hz). During ten seconds it will collect the samples without the help of the processing device 525 and all the sampling will be achieved by the an event system, sampling timer. During the RPM sampling the microprocessor 525 may be in idle mode allowing the peripherals to continue working. The microprocessor 525 and peripheral clock may be driven by the external 32,768 KHz crystal and therefore the current during the sampling may be as low as 97 µA. Once the raw RPM data is stored in memory 522, it is processed by the microprocessor 525 to assign the data in the correct RPM segments. These segments will create the RPM histogram that may be used by the data management server system 270.

When it is time to process the data, the microprocessor 525 and peripheral clock 521 will be changed to 24 Mhz allowing the equipment data sensor 520 to process the data fast. (e.g., 136 ms). This processing will take place once every 10 seconds.

Referring again to the electrical diagram of the equipment data sensor 520 illustrated in FIG. 4A, battery 523 (an example of power source 246) is shown. In the illustrated embodiment, it may be important to have a small battery dimension, but the drawback is low current capability. As such the battery may be supported by a large capacitor bank for high current pulse capability. Voltage: 3.0-3.6 V; Peak current capacity: <20 mA; Battery capacity: >500 mAh; Type: CR2450 or better.

Other sensors 527 are also included in this embodiment of equipment data sensor 520, including a temperature sensor 528 and a vibration/tilt sensor 529. In the illustrated embodiment of the temperature sensor, the approximate machine temperature data is obtained from a common NTC-resistor mounted on the printed circuit board of the equipment data sensor 520. For better linearity in the lower region a bleeder resistor is used (parallel connected). The equipment data sensor also uses the RTC 521 to keep track of time and therefore it can time stamp every event when it happens. This data is stored in non-volatile memory 522. In some embodiments, the equipment data sensor 520 uses the temperature sensor 528 to log the surrounding temperature during engine-on time and twenty minutes thereafter.

An omnidirectional tilt/vibration sensor 529 is also used in the example equipment data sensor 520. When in rest, the tilt/vibration sensor 529 is normally open, giving a true zero quiescent current. An averaging filter keeps the sensor signal in rest until several movements occur, resulting in low CPU activity and power consumption. Due to low power consumption the circuit resistors have very high resistance. The tilt/vibration sensor 529 on is used during engine OFF mode, to identify two major states (engine OFF state is when data logging is not active while a base station search or a data transfer is active): (i) active base station search mode (when the vibration sensor is triggered); and (ii) passive base station search mode (when the vibration sensor is not triggered).

The example equipment data sensor 520 also includes LEDs and a lightsensor circuit 530. When the user installs the battery for the first time or has just replaced the battery, the equipment data sensor 520 will enable its indication LED's. The purpose of the LEDs is to see that the main functionality of the equipment data sensor 520 is working. These indication LEDs will be active for only 10 minutes and then they will be turned off down. There are three LEDs in this embodiment that indicate different functionalities: (i) LED 1 (green)—Communication LED—this led will light up every time the equipment data sensor 520 sends a wireless packet to the Base Station; (ii) LED 2 (red)—Tilt Sensor LED—this led will indicate when the tilt sensor is activated and, therefore, when the sensor is moved then this LED should light up for 200 ms; and (iii) LED 3 (yellow)—RPM LED—this LED should light up every time the equipment data sensor 520 is positioned next to a handheld equipment engine. It will constantly be lighted as long as the engine is on and the sensor is in an appropriate sensing distance (less than 20 cm from the engine)

The example equipment data sensor 520, also includes debug pins 531 comprised of a JTAG interface that is available for debugging and software download.

In the example equipment data sensor 520, the memory 522 includes 256 kB of In-System Self-Programmable Flash, 4 kB EEPROM, and 16 kB Internal SRAM.

FIG. 3B provides a schematic diagram of a side view/cross section of the universal equipment date sensor 300 showing a system 400 for assembling the sensor 300 and attaching the sensor 300 to the equipment in accordance with one embodiment of the invention. In this embodiment, a sensor holder 480 is mounted to the equipment surface 495 via tape 430 or another adhesive. Separately, the electronics are installed in the component area 312 of the PCB 310 and a battery holder 450 with electrical contacts for communicating battery power to the circuit is installed on PCB 310 opposite the electronics 312. A battery 440 is then installed in the battery holder 450. The PCB 310 with the battery and the electronics is then placed in the sensor holder 480 and a plastic cover 470 with sealing material 460 around its perimeter is placed over top of the PCB to protect the sensor 300 from moisture, dirt, and other debris. Screws 490 are then passed through holes in the plastic cover 470 and holes 305 in the PCB 310 and screwed into threaded holes in the sensor holder 480 in order to secure the sensor 300 and the cover 470 to the sensor holder 480 and, thereby, to the equipment surface 495.

FIG. 5 provides an exploded view of another system 500, somewhat different from the one shown in FIG. 3B, for attaching the universal equipment data sensor 300 (or another equipment data sensor 230) to a piece of equipment in accordance with an embodiment of the invention. In this embodiment, a plastic base 508 is secured to an equipment surface via screws (not shown) through holes 514. The plastic base 508 includes a cylindrical housing in which a first flexible sealing ring 506 is placed, followed by the sensor 300 (hear having a circular PCB), another sealing ring 504, and finally a plastic cover 502. The sealing rings 506 and 504 function to resist moisture and debris from reaching the sensor 300, but also create a snug fitting for holding the perimeter of the PCB while allowing free space for the electrical components. In the illustrated embodiment, the plastic cover 502 is secured to the plastic base 508 by inserting slides 512 into catches 510 and turning the cover 502 ninety degrees relative to the base 508 to tighten the cover 502 to the base 508.

Data Collection Process

FIG. 6A illustrates a process 600 by which the fleet management system 100 captures information about a fleet of outdoor power equipment and operators and uses the captured information to provide useful data and services to users 203 of the system, according to some embodiments of the invention. As block 605 illustrates, the equipment data sensor 230 in each piece of equipment 202 periodically captures and stores data about the equipment 202 and/or the equipment's environment from one or more sensors 249/222 on the equipment (which may or may not be located on the equipment data sensor 230 itself). In some embodiments, the equipment data sensor 230 is built into the equipment 202 when the equipment 202 is manufactured. In other embodiments, the equipment data sensor 230 is installed by the fleet owner, a dealer, or a service person after purchase of the equipment 202.

In some embodiments, the sensors 249 of the equipment data sensor 230 capture data about the equipment 202 and/or the equipment's environment, and then the processing device 232 stores the data 244 in the memory 240. In some embodiments, sensors 222 located on the equipment 202, but not on the equipment data sensor 230, capture data about the equipment 202 and/or the equipment's environment, and then the processing device 232 communicates with the equipment's control system 212 to capture this data 244 and store it in the memory 240. The data captured about the equipment and/or its environment may be, for example, GPS or other location data, engine speed (e.g., motor shaft RPM), component speed (e.g., PTO speed, cutting blade RPM, etc.), acceleration, orientation, ambient temperature, engine temperature, component temperature, nearby equipment ID codes, nearby communication system ID codes, throttle status, PTO status, brake status, clutch status, user input commands, switch status, fuel level status, oil level status, battery level status, operator presence in a seat or other operator station, heading, run time, ignition status, vibration, shock, tire level, tire condition, differential locking, wheel spinning, wheel slipping, chain tension, belt tension, humidity, moisture, pressure, altitude, tampering, equipment hatch opening or closing, component replacement, and/or other parameters/metrics about the equipment's status, use, operation, and/or environment. As such, the sensors 249/222 may include such sensors as GPS receivers, RPM antennas, three-axis accelerometers or other accelerometers, electromechanical switches, thermocouples or other temperature sensors, proximity sensors, fluid level sensors, pressure sensors, moisture sensors, motion detectors, magnets and magnetic field sensors, RF antennas, infrared sensors, transducers, lasers, and/or other sensors.

In some embodiments, the processing device 232 uses the clock 248 to periodically (e.g., every minute) poll the sensors 249 or the equipment control system 212 to capture data 244 at that moment in time. The processing system 232 then stores this data 244 in the memory 240 in the form of data packets that have timestamps and/or are arranged in sequential order according to time.

As illustrated by block 610 in FIG. 6, the equipment data sensor 230 also looks for signals from any nearby operator ID units 250. For example, in some embodiments, the processing device 252 of the operator ID units 250 uses the short-range transceiver 264 to periodically (e.g., every few seconds) or continuously transmit a wireless signal having the ID code 255 stored therein. Meanwhile, the processing device 232 of the equipment data sensor 230 periodically (e.g., every minute) uses its transceiver 234 to look within a relatively short range for the presence of any signals transmitted from any operator ID units 250.

If the processing device 232 identifies an operator's ID unit 250 within the range, then, as illustrated by block 615, the processing device 232 reads the ID code 255 from the received signal and stores the ID code 255 in the memory 240 with the captured sensor data as part of each data packet for as long as the signal from the ID unit 250 is still being received. If multiple ID units are found within a predetermined range, then those ID codes are also included in the data packets for as long as they continue to be in range. In order to determine if the ID unit 250 is still present, the processing device 232 may use the transceiver 234 to periodically look for the ID unit's signal at substantially the same time that the processing device 232 periodically captures data 244 from the sensors 249/222.

As illustrated by decision diamond 620, it is also periodically determined whether the electronic data sensor 230 is within range of a data communication system 260. For example, in some embodiments, the processing device 262 of the data communication system 260 continuously transmits a wireless signal using its medium/long range transceiver 264. The processing device 232 of the equipment data sensor 230 may periodically (e.g., every several seconds or minutes) look for a signal from a data communication system 260. As illustrated in FIG. 6, if the processing device 232 of the equipment data sensor 230 does not find itself within range of the data communication system's transceiver 264, then it continues its routine of periodically capturing data and ID codes and checking for any data communication systems 260 (blocks 605-620).

As illustrated by block 625, if the processing device 232 of the equipment data sensor 230 does receive a signal from the data communication system's transceiver 264, then the processing device 232 may use the equipment data sensor's transceiver 234 to communicate the data 244 stored in the memory 240 to the data communication system 260. As also illustrated, in some embodiments the processing device 232 may also continue its process of collecting data while it is also transmitting data to the data communication system 260. In other embodiments, the processing device 232 may halt the data collecting procedures while the data 244 is being uploaded to the data communication system 260.

In some embodiments, the processing device 232 may also require that one or more other conditions be satisfied before it begins uploading the data 244 to the data communication system 260. For example, in some embodiments, the processing device 232 may wait until the equipment's engine is turned off or the equipment is stationary before it transmits the data 244 to the data communication system 260. In some embodiments, the data communication system 260 is powered up automatically when the equipment 202 is powered down. For example, if the equipment 202 is powered down within range of a data communication system 260, the equipment data sensor 230 may send a signal to a the data communication system 260 waking it up so that the equipment data sensor 260 can upload the data 244 to it.

As illustrated by block 630, the data communication system 260 then communicates the data 244 to the data management server system 270. Specifically, the processing device 262 uses the network interface 265 to make a connection to the data management sensor system 270 over the network 206 and transmit the data 244 (and in some embodiments ID codes 255 and 269 as described above) to the data management server system 270 using the appropriate communication protocol(s) based on the network 206 used.

As illustrated by block 635, the data management server system 270 stores and processes the data 244 received from the one or more data communication systems 260. As described in greater detail elsewhere herein with regard to the other Figures, the processing device 274 of the data management server system 270 executes a fleet management server application 278 to calculate other parameters from the data and/or use the data and calculated parameters to create charts, graphics, tables, alerts, tools, communications, outputs, etc. that assist a user 203 with management of a fleet of outdoor power equipment (or other equipment) and/or equipment operators. Much of the output and services provided to the user 203 by the fleet management system 100 is provided via a fleet management portal hosted on the network 206 by the data management server system 270. For example, the fleet management portal may include a web portal version and a mobile app portal version. In addition to the fleet management portal, the data management server system 270 may send information or commands back to the equipment data sensor 230 so that the equipment data sensor 230 can take some action, control some part of the equipment 202 (e.g., control fuel supply and/or ignition timing of an internal combustion engine), and/or present information to the operator 204. Further, some embodiments of the data management server system 270 send text messages, emails, or other communications outside the fleet management portal directly to client computing devices 290

As such, as illustrated by block 640, the data management server system 270 communicates processed data to one or more network-enabled client computing devices 290 (which may be mobile devices or other personal computing devices), equipment data sensors 230 or control systems 212, and/or other output or feedback to systems interested in the data. In some embodiments this communication is in the form of a fleet management web portal, embodiments of which may be described in more detail herein below. With regard to the fleet management portal, different users 203 may have different access rights which provide different levels of information access, tools, and/or portals.

As mentioned above, the data collection and data communication steps of process 600 may be, in some embodiments, performed continuously, simultaneously, and/or at regular intervals, while in other embodiments some steps may be performed only in response to certain conditions which may prompt different modes of operation during which some of the steps of process 600 are performed while others are not. For example, FIG. 6B is a flow chart illustrating various modes of operation of an embodiment of the equipment data sensor 230 and a process 680 that may be performed by the equipment data sensor 230 for selecting the proper mode of operation and communicating with other devices in the fleet management system, according to some embodiments of the invention. The process 680 illustrated in FIG. 6B may be particularly advantageous in situations where the equipment data sensor 230 is self-powered by its own battery (e.g., as embodiments of the universal equipment data sensor 300 may be) since the process 680 may prolong battery life relative to other processes for collecting and communicating data.

Referring now to blocks 681 and 682 in the flow chart of FIG. 6B, when a battery is inserted into the equipment data sensor, the equipment data sensor first enters into a "shelf mode" 682. In the shelf mode 682, the equipment data sensor uses very little, if any, power (e.g., approximately 4.14 µA) and, as such, does not transmit any data externally nor communicate with any ID units or data communication systems.

As represented by decision diamond 683, if the equipment data sensor is in shelf mode 682 and it detects that the engine is turned on (e.g., via receipt of a signal from the RPM sensor or some other sensor that detects engine operation), then the equipment data sensor will enter an "engine-on mode" 684. In some embodiments the equipment data sensor will wait until the engine is running for at least some small predefined period of time (e.g., ten seconds) before it enters the engine-on state 684. When in the engine-on mode 684, the equipment data sensor will periodically sample and process data from the one or more sensors it is in communication with, such as RPM data from the engine RPM sensor. The equipment data sensor will also use its transceiver to periodically search for any nearby operator ID units. The equipment data sensor will generally consume more power operating in the engine-on mode 684 than in any of the other modes. In the illustrated embodiment, the equipment data sensor does not attempt to find or communicate with any data communication systems (e.g., base stations) while in the engine-on mode 684. In the illustrated embodiment where the equipment data sensor utilizes a vibration sensor to sense vibration of the equipment data sensor, the equipment data sensor also disables this vibration sensor in this state to conserve power. In general, whenever the engine is turned on (at least for some small predefined minimum amount of time), then the equipment data sensor enters the engine-on mode 684, regardless of which mode it is in at the time.

As represented by decision diamonds 685 and 686, if the equipment data sensor determines that the engine has been turned off and determines that it has in its memory data that it collected about the equipment, the operator, or the equipment's operation that has not yet been communicated to a data communication system, then the equipment data sensor enters into an "active base station search mode" 687. However, if the equipment data sensor determines that the engine has been turned off and determines that it does not have any data that needs to be communicated to a data communication system, then the equipment data sensor enters into a "passive base station search mode" 692.

In the active base station search mode 687, the equipment data sensor uses its transceiver to actively search for data communication systems (e.g., base stations) within range by periodically (e.g., every ten seconds) transmitting base station search packages. The base station search package tries, for example, up to three times in every attempt if no acknowledgement is received from the data communication system. As such, in one embodiment, the equipment data sensor sends up to eighteen packets each minute making the active base station search relatively power consuming, too.

As illustrated by decision diamonds 688 and block 690, if a data communication system (e.g., a base station) acknowledges a transmission from the equipment data sensor, then the equipment data sensor transmits data packages stored in its memory to the data communication system in attempts to transfer all of the data that has not yet been transferred to a data communication system, using for example, the transceiver and a proprietary communication protocol. As represented by decision diamond 691, if the equipment data sensor receives permission from the data communication system indicating that the data communication system has successfully received all of the data that the equipment data sensor needs to transmit, then the equipment data sensor enters the passive base station search mode 692.

As illustrated by decision diamonds 688 and block 689, in some embodiments, if the equipment data sensor does not receive acknowledgement from a data communication sensor and does not sense vibration using its vibration sensor for some predefined period of time (e.g., five minutes), then the equipment data sensor enters the passive base station search mode.

As mentioned above, the equipment data sensor will also go out of the active base station search mode 687 and into the engine-on mode 684 when the engine is turned on and allowed to run for some predefined minimum amount of time.

The passive base station search mode 692 is designed to reduce power consumption and, in one embodiment, the main difference between the passive base station search mode 692 and the active base station search mode 687 is the longer time between transmissions of search packages. For example, in some embodiments, the equipment data sensor in the passive base station search mode 692 will only transmit packages once every 300 seconds.

As illustrated by decision diamonds 693, 694, and 695, the equipment data sensor will remain in the passive base station mode until it determines (using its sensors and/or clock) that any one of three different events happen. Specifically, as represented by decision diamond 693, if the equipment data sensor senses some predefined minimum amount of vibration (e.g., some minimum vibration amplitude and/or length of time of vibration sensed by the vibration sensor) then, if there is data stored in the equipment data sensor that still needs to be transmitted to a data communication system, then the equipment data sensor again enters the active base station search mode 687. As represented by decision diamond 694, the equipment data sensor will also go out of the passive base station search mode 692 and into the engine-on mode 684 when the engine is turned on and allowed to run. As represented by decision diamond 695, if the equipment data sensor is in the passive base station search mode 692 and detects that it has not been used for 30 days (or some other predefined and relatively lengthy period of time), then it enters back into the previously-described extremely-low-power shelf mode 682. Otherwise it continues in the passive base station search mode 692 until one of the three conditions 693, 694, and 695 is satisfied.

Operator-Equipment Pairing

In situations where the equipment data sensor 230 detects two or more operator ID codes 255 within range, the fleet management system 100 may automatically determine which operator is operating the equipment 202 on which the equipment data sensor 230 is located. FIGS. 7A and 7B illustrate a process by which the fleet management system 100 locates multiple persons within proximity to a piece of equipment and determines which one of these people is the operator of the piece of equipment. Specifically, FIGS. 7A, 7B and 7C provide a schematic diagram and flow charts illustrating operator-equipment pairing according to some embodiments of the invention.

FIG. 7A shows a piece of equipment 705 (here a string trimmer) including an equipment data sensor 720 thereon. The equipment 705 is operated by a person named Karl 710, who holds an operator ID unit 730. Two other persons, Linda 712 and Sven 714, work nearby and also have their own operator ID units 732 and 734, respectively.

Referring to block 752 in the process flow 750 shown in FIG. 7B, the equipment data sensor 720 of the equipment 705 periodically captures and stores data about the equipment 705 from one or more sensors on the equipment, as described in greater detail above. As illustrated by block 754, concurrently with capturing data from the sensors, the equipment data sensor 720 also periodically looks for ID units within a predetermined range. As described above and as illustrated in the graphic 745 in FIG. 7A, the equipment data sensor 720 is arranged to be capable of receiving, and preferably also of transmitting, short range radio frequency signals. The operator ID units 730, 732, and 734 are carried by three operators 710, 712, and 714 shown in FIG. 7A and are arranged to transmit radio frequency communication signals, such as, but not limited to, frequencies that are typically unlicensed.

In some embodiments, the equipment data sensor's transceiver has a maximum range that can be varied between five centimeters and thirty meters by varying the power available depending on the situation. For instance, in the case of communication between the equipment data sensor 720 and an operator ID unit 730 it may suffice with only a narrow range (e.g., maximum two meters) while the communication between an equipment data sensor 720 and a base station (not shown) might require a range more vast (e.g., twenty meters or more). A low-power short-range signal may be desired when searching for ID units so that the equipment data sensor 230 does not identify too many ID units at one time and so that, as described below, signal strength between multiple identified ID units are distinguishable, thereby allowing for an approximation of relative distance to each identified ID unit.

The equipment data sensor 720 is designed to receive any signal transmitted from an operator ID unit and store the related specific operator ID code obtained therefrom in the memory of the equipment data sensor 720. As illustrated in graphic 745 in FIG. 7A, intercommunication could, for instance, be performed in time intervals in order to save energy. For example, the equipment data sensor 720 could be activated to listen to known ID units once every minute, while said ID units could be activated to transmit their ID-codes once every second. Furthermore, the equipment data sensor 720 may be configured to only look for new operator ID units every several minutes. An example of this type of process for identifying and monitoring nearby ID units is illustrated in FIG. 7C and described in greater detail below.

In FIG. 7A, Karl 710 is operating the equipment 705 and is therefore well within the range of the equipment data sensor 720. As such, the equipment data sensor 720 quickly finds Karl's ID unit 730 and listens approximately every minute for the ID code communicated by Karl's ID unit 730. This listening by the equipment data sensor 720 is synchronized with its capturing of equipment data from the sensors, and the equipment data sensor 720 stores Karl's ID code with the sensor data in a new data packet periodically (approximately every minute in the illustrated example). Because Karl 710 and his ID unit 730 are very close to the equipment data sensor 720, the equipment data sensor 720 receives a strong radio signal and many data packages with little, if any, interruption (brief interruptions due to random interferences may be possible as Karl 710 is operating the equipment 705).

When the equipment data sensor 720 searches again for nearby ID units, not only does it still find Karl's ID unit 730, it also finds Linda's ID unit 732 because Linda 712 has begun working within the broadcasting range of the equipment data sensor 720. Accordingly, the equipment data sensor 720 stores both Linda's ID code and Karl's ID code in each data new data packet that it stores in its memory along with the corresponding sensor data, until it stops receiving signals from one or both of the two ID units. Without more, one could not know by looking at the data packages whether Linda 712 was merely in close proximity to the equipment 705 operated by Karl 710 or whether Linda actually took over operation of the equipment 705 and Karl 710 merely remained in the vicinity. However, since embodiments of the invention track operator performance, it can be very important to the accuracy and/or usefulness of the information that the fleet management system 100 can accurately identify the actual equipment operator and the roles of other nearby persons.

In order to assist with determining which ID code represents the actual operator of the equipment 705, the equipment data sensor 720 is, in some embodiments, configured to identify and record a received signal strength indicator (RSSI) which is a measure of the signal strength of the ID code signal received from a ID unit (e.g., the power present in the received radio signal as measured by the power generated in the antenna of the equipment data sensor's transceiver). As illustrated by block 756 in FIG. 7B, the RSSI value of each transmission that the equipment data sensor 720 listens to is recorded in each data packet created by the equipment data sensor 720 along with the corresponding ID code. In one embodiment, the RSSI ranges between −100 dB and −1 dB.

As illustrated by graphic 740 in FIG. 7A, RSSI (and signal strength generally) is a function of distance and decreases as the distance between the ID unit and the equipment data sensor 720 increases. In some embodiments, certain zones are created to approximate different areas of distance (e.g., zone A=very close proximity to equipment; zone B=close proximity to equipment; and zone C=medium to long distance from equipment) and the fleet management system 100 recognizes these zones by a RSSI value that marks the transition from one zone to another.

In some embodiments, the equipment data sensor 720 is configured to ignore (e.g., not store or identify) ID units having a RSSI below a certain threshold in order to reduce noise or data that is not likely to be useful. For example, in the embodiment illustrated in FIG. 7A, the equipment data sensor 720 may be configured to ignore, filter-out, or otherwise exclude Sven 714 from the ID codes stored in the current data packet since the RSSI (here 0.7) of the radio signal currently received from Sven's ID unit 734 does not surpass a particular threshold (e.g., within zone C).

As illustrated by block 758 in FIG. 7B, the equipment data sensor 720 transmits data to the data management server system (e.g., via a base station or other data communication system). As illustrated by block 760, the data management server system then automatically determines which ID code corresponds to the operator of the equipment 705 based at least in part on RSSI (i.e., signal strength), number of data packages, and/or other information received about operation of the equipment 705 and nearby equipment. For example, the highest RSSI generally indicates the operator, however, the data management server system may also look at the number of data packages received and the change in the RSSI over time since the operator ID code will typically be seen in most data packets received and, while it may not be the highest RSSI at all points in time, it will usually be the highest RSSI for most points in time. Other data that may also be used in the data management server system's algorithm may include, for example, information about whether the equipment 705 is running and/or ID codes and RSSI values received from other nearby equipment that indicate that one of the ID codes is clearly associated with the operator of the other equipment and therefore cannot likely be the operator of equipment 705. In the illustrated embodiment, Karl's RSSI is 4.0, is fairly regular, and his ID code is present in many data packages, while Linda's RSSI is 1.3 and is also fairly regular, but her ID code is included in somewhat fewer data packages. Therefore, the data management server system 270 would determine that Karl is the most likely operator and would identify in the database that Karl was the operator at this point in time. Once this is determined, it may also be used, in some embodiments, by the data management server system 270 to help determine that Karl is not likely to be operating other equipment at the same time, despite other equipment sensing Karl's ID unit amongst one or more other operator ID units. An example of a process performed by the data management server system 270 to use RSSI values and other information to determine the likely operator is described in greater detail below.

As illustrated by block 762, the data management server system may also be configured to determine and flag (e.g., send out an alert in the fleet management portal) any safety concerns or other issues based on RSSI of non-operators and the operational status of the equipment 705. For example, the data management server system may be configured to alert the fleet owner or a team manager, in near real-time or after the fact, if Linda's RSSI value indicated that she crossed into zone A while equipment 705 had its cutting element in operation.

Although the flow charts describe an embodiment of the fleet management system where the operator is determined at the server level of the fleet management system, other embodiments may be configured so that the equipment data sensor, or even the data communication system, performs this operation of determining which ID code from a plurality of sensed ID codes represents the equipment operator at each point in time.

In some embodiments of the invention, the equipment data sensor 230 is arranged to also transmit radio signals so that two or more powered machines within broadcasting range of each other are able to sense each other's presence using their equipment data sensors 230. As a safety measure the fleet management system may comprise a warning system arranged to alert a user of a powered machine in case the equipment data sensor registers a radio signal transmitted from another machine within its broadcasting range or with greater than some signal strength threshold. Such an alert may be any or a combination of audio, visual, or tactile signals such as for instance a sound alarm, a light signal and/or vibration signals. Hereby, unintentional interference between two operators may be prevented or avoided. In some embodiments instead of or in addition to a warning system, the fleet management system creates a safety record that is presented to a user after the fact.

In cases where the equipment is powered by a combustion engine, said communication device may further include a safety system arranged to be activated in case the equipment data sensor registers a signal transmitted from another machine within a pre-set range, where the safety system when activated may be arranged to put the engine of the powered machine on idle, shut off the engine, disengage the clutch, shutoff the PTO, and/or the like. This can be achieved for instance by means of restricting the fuel supply and/or air supply as has been described for instance in U.S. Patent Application Publication No. 2011/0095215. Also this aspect may prove to be advantageous in order to minimize the risk of two operators interfering with each other's work.

FIG. 7C is a flow chart illustrating a process 770 that may be performed by an equipment data sensor 720/230 (e.g., via the processing device executing computer-readable program code stored in the memory and utilizing the transceiver, sensors, clock, and/or memory devices according to rules specified by the code) to look for, monitor, and store operator identification codes from a plurality of operator identification units within range of the equipment data sensor, according to some embodiments of the invention. This process may be performed as part of steps 754 and 756 of the process illustrated in FIG. 7B.

As represented by block 772 in FIG. 7C, when the equipment data sensor 720 determines that the engine is running (e.g., it senses engine RPM using the engine RPM sensor) it then, as represented by block 774, spend some particular period of time (e.g., one minute) looking for any ID units within range.

As represented by decision diamond 776 and block 778, if the equipment data sensor 720 does not identify any ID units within range, then it waits some particular period of time (e.g., seven minutes) before returning to step 774 to try again to find any nearby ID units.

As represented by decision diamond 776 and block 780, when the equipment data sensor 720 does identify one or more ID units, then the equipment data sensor determines the number of ID units that can be identified and each ID unit's specific transmission period (since each ID unit will be periodically transmitting signals many times per minute and the periods of ID unit's transmission cycle will likely be offset in time at least slightly).

As represented by block 782, based on the number of ID units and their specific transmission periods, the equipment data sensor 720 calculates a schedule for exactly when to listen to each ID unit once per minute (of course, periods of time other than one minute are also possible in other embodiments).

As represented by blocks 784 and 786, the equipment data sensor then spends a particular period of time (e.g., fourteen minutes) listening for each identified ID unit's transmission according to the calculated synchronization schedule and storing the ID codes and RSSI values for each ID unit's transmission. After the period of time expires, the equipment data sensor may then then return to step 774 to again look for any and all of the ID units within range and repeat the above-described process for another, for example, fifteen minute session.

The illustration 745 in FIG. 7A shows conceptually an example of how the operator sensing technique described with reference to FIG. 7C works. It should be appreciated that there are basically two modes in this illustration: an operator search mode and an operator synchronization mode. The first mode, the operator search mode, starts in minute 0 and finishes in minute 1. This mode is later repeated between minute 8 and minute 9 of the RPM session. During the first operator search session, the equipment data sensor 720 managed to find operator ID unit 710. After the first operator search session ends, the equipment data sensor 720 will enter the first operator synchronization session where it will attempt to synchronize with the ID unit 710 once per minute. The equipment data sensor 720 will record if there was a "hit" or if there was not for each minute. In this example, the equipment data sensor 720 managed to have three hits in the first eight minutes of the RPM session. In minute 8, a second operator search session was started and lasted a minute. During this second operator search session, two operator ID units were found: ID unit 710 (again) and ID unit 712. At the conclusion of the second operator search session, the second operator synchronization session begins and the same procedure described for the first synchronization session repeats but with the equipment data sensor 720 synchronizing with both ID units according to a schedule where it is specifically looking for each identified ID unit once per minute, but with slightly offset cycles so that it synchronizes with each ID unit at different points in time during each minute. In the example shown in FIG. 7A, the equipment data sensor 720 received 3 "hits" with the ID unit 710 and 3 hits with the ID unit 712 during the second operator synchronization schedule. After the whole RPM session ends (e.g., when the engine is turned off) the data from the equipment data sensor 720 will be put in a table and analyzed by the data management server system 270 to determine which of the ID codes 710 and 712 represented the operator of the equipment associated with the equipment data sensor 720 during the sessions when both ID codes where received.

Process for Deciding Who is the Operator:

When there is more than one detected operator in the module data, the data management server system 270 uses logic in the operator module of the parser module 278B to decide which of the ID codes is the one associated with the operator who is actually the one operating the machine. To do this, in one embodiment the data management server system 270 goes through one or more tests until it reaches a particular level of confidence that one of the ID codes represents the operator.

Test 1—Unique Operator

The first test that the server 270 performs is to check if in the operator table if there is one or no operators. If there are no operators, then the result of the pairing will be unknown and the process stops for this session. If the operators list has only one operator, then that operator will be paired with the equipment as the operator and, in some embodiments, no more tests will be performed. If there are two or more operators, then the server 270 proceeds to the next test to check some other variables in the operators table to attempt to pair the equipment with a single operator.

In one embodiment, for every Operator Session there could be up to five Operator Search Sessions, so the following calculations may need to be performed for every Operator Search Session. For every Operator Search Session there will be one or several "wining operator" and the operator or operators that appear in more "winning" session lists will be the one that should be paired to the equipment data sensor 230 and, thereby, to the equipment 202.

Test 2—Synchronized Hits

The first variable to consider will be the Synchronized Hits; this variable represents how many times the equipment data sensor 230 found the operator between two search sessions. It is not possible just to see which operator has the greatest amounts of hits, because then the server 270 would eliminate all other important information like RSSI. So the operator with the greatest amount of hits has at least a certain percentage more hits than the operator with the second greatest amount of hits. This percentage difference is called the Synchronized Hits Threshold. This threshold is a value between 0 and 1.

The server 270 first organizes the operators in an array arranged in descending order by synchronized hits where the operator with the greatest amount of hits is in position 0 (Operator[0]) and the operator with the least amount of hits is in the last position (Operator[TDO-1]).

After the arrangement by synchronized hits is done, the server 270 checks if the operator at position 0 has more hits than the operator at position 1 and has at least the Synchronized Hits Threshold difference between both of them. For example, in one embodiment, this threshold has a value of 0.2. As such, the test may be codes something like this:

```
if (Operator[0].SynchronizedHits > (Operator[0].SynchronizedHits * (1 + SynchronizedHitsTH)))
{
    /*The Operator has been found*/
    return Operator[0];
}
```

If this test fails, then the server 270 next will eliminate all the operators that have less synchronized hits than the operator with the highest amount of synchronized hits multiplied by 1 minus the Synchronized Hits Threshold. So any operator that has less synchronized hits than: (Operator[0].SynchronizedHits*(1−SynchronizedHitTH)), will be eliminated. This means that in the next test the server will have fewer operators to work with.

Test 3—Average Synchronized Hits RSSI

The next variable to check is the Average Synchronized Hits RSSI. A similar logic must be applied to the new check in that the server will also have an Average Synchronized Hits RSSI Threshold which will have a value between 0 and 1. For example, this threshold may be set to have a value of 0.1. The next thing for the server 270 to do is to organize the remaining operators in descending order in terms of the Average Synchronized Hits RSSI. Once this is done, the server 270 checks if the operator at position 0 has a greater Average Synchronized Hits RSSI than the operator at position 1 and at least having the Average Synchronized Hits Threshold difference between both of them. The check may be coded something like this:

```
if (Operator[0].AverageSynchronizedRSSI >
(Operator[0].AverageSynchronizedRSSI * (1 +
AverageSynchronizedRSSITH)))
{
    /*The Operator has been found*/
    return Operator[0];
}
```

If this check doesn't yield any result, then the server 270 will try to eliminate some operators in a way very similar to the previous elimination. Specifically, all the operators are eliminated that have less Average Synchronized Hits RSSI than the operator with the highest Average Synchronized Hits RSSI multiplied by 1 minus the Average Synchronized Hits Threshold. This means that all operators with less Average Synchronized RSSI than: (Operator[0]. AverageSynchronizedRSSI*(1−SynchronizedHitTH)), will be eliminated from the list.

Test 4—Average Search RSSI

The next variable that the server 270 considers is the Average Search RSSI by applying the same logic as before:

(i) organize the operators in descending order in terms of Average Search RSSI;

(ii) check if the difference of Average Search RSSI between the operator at position 0 and the operator at position 1 is at least the Average Search RSSI of operator 0 multiplied by 1 minus the Average Search RSSI Threshold (suggested value 0.1);

(iii) if there is no result from the check, then eliminate all operators that have a smaller RSSI than the operator at position 0 multiplied by 1 minus the Average Search RSSI Threshold (Operator[0]. AverageSynchronizedRSSI*(1−AverageSearchRSSITH)).

Test 5—Search Packages

The next, and in this embodiment the final, variable that the server 270 considers and is the Search packages, again following a similar routine:

(i) organize the operators in descending order in terms of Search packages;

(ii) check if the difference of Search packages between operator at position 0 and the operator at position 1 is at least the Search packages of operator 0 times the Search Packages Threshold (suggested value 0.3); and (iii) if there is no result from the check, eliminate all operators that have a smaller RSSI than the operator at position 0 times the Search Packages Threshold (Operator [0]. SearchPackages*(1−SearchPackagesTH)).

If after analyzing all the operator variables there is still not a single "winner," then the server 270 should select all operators as winners, and then check the next Search session. After selecting the wining operator(s) of the first Search Session, the server 270 does the same evaluation for all other Search Sessions. After evaluating all Search Sessions there will be one or several winning operator(s) per Search Session. So the operator that appears the most in the winner list across all Search Sessions is the one that should be paired with the equipment data sensor 230 and, thereby, to the equipment 202. If there are two or more operators with the same amount of Search Sessions won, then the server may then make one final test.

Test 6—Random or Historic Selection

In the final test the server may select all the operators that have the same number of wins. Then out of this list the server 270 may select one of them randomly, or use other history parameters to be able to decide which operator should be paired. For example, if in the last ten sessions Operator Number 1000 was paired to this equipment data sensor 230, and suddenly we have a session with a very tight decision between Operator Number 1000 and Operator Number 2012, then because of history parameters the server should select Operator 1000 again. In another example, if Operator Number 2012 is already paired with another equipment data sensor during this period of time and that equipment data sensor is associated with equipment that is not likely to be used at the same time as equipment 202, then Operator 2012 may be eliminated.

RPM Monitoring and Data Usage

FIG. 8 is a flow chart illustrating a process flow 800 performed by the fleet management system 100 for collecting and using engine speed data (e.g., RPM of an engine crankshaft), according to some embodiments of the invention. As illustrated by block 805, the equipment data sensor 230 uses an antenna to sense electromagnetic waves generated around an ignition cable (or elsewhere in the equipment 202) due to pulses created in the ignition cable (or elsewhere in the equipment 202) when the engine is running. As illustrated by block 810, the equipment data sensor 230 then determines (e.g., estimates) RPM based on the sensed electromagnetic waves (e.g., based at least partially on the frequency of pulses detected in the wave profile).

At substantially the same time that the equipment data sensor 230 is sensing the electromagnetic waves in the ignition cable, the equipment data sensor 230 senses the nearby ID code 255 of the operator 204, as illustrated by block 815.

As illustrated by block 820, the equipment data sensor 230 then associates the RPM value at each point in time that it stores RPM in memory with the ID code 255 of the operator at that time. For example, for each of a plurality of periodic points in time, the equipment data sensor 230 generates a data packet in its memory 240 that has both an RPM value and the operator's ID code 255.

As illustrated by block 830, the equipment data sensor 230 then transmits the RPM data and associated operator ID code 255 for a plurality of points in time (e.g., in the form of a plurality of data packets representing different sequential moments in time) to the data management server system 270.

As illustrated by block 840, the data management server system 270 may then be configured to calculate the percentage of time spent by the operator 204 during a defined session (e.g., a defined period of time, a particular job or work period, etc.) at each of a plurality of RPM ranges across the RPM spectrum for the particular type of equipment 202.

Once the data management server system 270 has calculated this data, it may process it in several possible ways. For example, as illustrated by block 850, the data management server system 270 may create and output to a user a chart showing percentage of time versus rpm range. For example, in one embodiment the data management server system 270 has a RPM Histogram Module as part of the parser module 278B and a data convention for RPM histogram data stored in the memory 276. In other embodiments the module or a portion thereof is located on and operated by the equipment data sensor 230. The RPM histogram module may be responsible creating a RPM histogram from the samplings of engine RPM data received from the RPM sensor of the equipment data sensor 230. The purpose of this histogram is to know how much time or how much percentage of time the engine is running at specific RPM intervals. The RPM Module may be able to create RPM Histogram Files when a session is ended. The RPM sampling is done within one session. A session may be started upon the operator trying to start or starting the machine. The session may end when a session period expires. The session period can be configurable by a user or provider of the fleet management system from, for example, two minutes up to nine hours. In one embodiment, the RPM sampling is done every five milliseconds. Thus, the RPM Histogram Module will have a new RPM value for every five milliseconds. The module may then compare this RPM value with a table to be able to determine in which RPM segment the sampled value belongs. The number of segments may also be configurable by the system user or provider, and depends on the segment resolution. The segment resolution represents how wide each RPM segment is in the histogram chart. The RPM Histogram Module may also store other important data. For example the number of unsuccessful starts of the engine (Number of Bad Starts) or the number of successful starts of the engine (Number of Starts). The module may also record the configurable data like the session period, the segment resolution, and the time when the session started.

As described below with reference to FIG. 9, such a chart provides a lot of information about the operator and the equipment. Accordingly, in some embodiments, as illustrated by block 855, the data management server system 270 uses the calculated information to determine (e.g., estimate) information about the state of the equipment. In some embodiments, as illustrated by block 860, the data management server system 270 uses the calculated information to determine information about the operator (e.g., operator skill). In some embodiments, as illustrated by block 865, the data management server system 270 uses the calculated information to determine information about the health or safety. Systems and methods for using RPM data to calculate information about the operator, equipment, or health and safety, are described in greater detail below with reference to FIGS. 9 through 13.

In FIGS. 9-13 there are shown examples of ways to view, process, analyze, present, and use engine speed data (e.g., the sensed real or estimated engine crankshaft RPM). Referring to FIG. 9, a chart 900 is provided that analyzes RPM of a particular piece of outdoor power equipment during a defined period of operation by a particular operator, according to some embodiments of the invention. This chart 900 may be displayed on the display 294 of a client computing device 290 and the processed data contained therein may be used in a variety of ways to determine information about the particular operator and/or equipment.

The x-axis 904 shows engine speed, here from 0-12000 RPM, where RPM here is split into bars 905 of two-hundred RPM each. The RPM may be registered in time intervals of five milliseconds. The y-axis 902 shows the percentage of time spent at each RPM. Here, the x-axis 904 is divided into intervals A-E 910, where each interval covers a certain RPM-range which can be correlated to a machine state or behavior, here: start-up A, idling B, clutch engagement C, working D, and racing/free-running E.

Information processed into the form shown in FIG. 9 can be very beneficial for monitoring and/or evaluating the running of a hand-held powered machine (e.g. a chain saw or a trimmer), walk-behind equipment (e.g., a walk-behind mower), or other equipment, as well as for monitoring and/or evaluating the behavior of the operator, particularly where the machine comprises an engine and a working tool driven by the engine. In some embodiments, e.g., for some ride-on vehicles, PTO speed, such as RPM of a blade spindle or other selectively driven implement, may also be tracked in the same way that engine RPM is processed and used in FIGS. 9-13 and may yield RPM ranges where the percentage time spent in the range illustrates different machine behaviors or states and, thereby, operator performance. Other parameters may be used in a similar way.

Referring again to FIG. 9, for retrieving the information to create the RPM diagram 900, the equipment 202 is arranged with an equipment data sensor 230 as descried above. As also described above, the equipment data sensor 230 includes a memory 240; at least one sensor 249 for obtaining values of at least one parameter associated with running of the equipment (wherein at least one of the parameters is the engine speed); and a processing device 232 for sequentially obtaining and storing values of the at least one parameter during operation of the equipment 202 in the memory 240. Accordingly, for every registered RPM-value there is also a registered a time stamp. As shown in FIG. 9, the data management server system then analyzes the RPM data and divides the RPM ranges into in at least two, but here five, engine speed intervals (A, B, C, D, E), and the percentage operating time of total operating time in the at least one engine speed interval is determined for a particular use session or other defined time period.

Often the equipment 202 comprises a clutch between the engine and the working tool, where the clutch is engaging at a clutch-engagement speed, and wherein at least one of the engine speed intervals corresponds to a working speed interval D, where said working speed interval D is above the clutch engagement speed. As understood by the skilled person, the clutch engagement speed is the speed where the clutch engages, which will be different for different types of equipment as well as it will vary between individual pieces of equipment. However the clutch engagement speed is typically found within an interval in many types of equipment, which in FIG. 9 is referred to as interval C. The clutch engagement interval covers, with a margin, both the clutch engagement speed and slipping. The upper value of the working speed can be the maximum speed of the engine, meaning that all values above the clutch engagement speed are considered, however preferably the working speed is at a predetermined RPM-distance from the maximum speed (or the cut-out speed) or from the free-running speed. Often the engine has a fixed maximum speed (a cut-out speed) whereat the engine speed is controlled by limiting the engine in some way, e.g. limiting the fuel injection or the ignition.

The working speed interval D has an upper threshold below the maximum speed of the engine, preferably at a predetermined RPM-distance from a predetermined cut-out speed of the engine, where said maximum speed (e.g. cut-out speed) corresponds to a speed to which the engine is restricted, e.g. by means of cutting ignition or by affecting fuel supply to the engine or electronic control. Preferably the working speed interval D is below the free-running speed interval E, which in turn corresponds to an interval E above the working speed interval D and below the maximum speed of the engine. The free-running speed is typically when the engine is run without load.

By means of presenting RPM as in FIG. 9, the behavior of an operator can be studied and evaluated. For instance, it is possible to discover if an operator spends a lot of time at an interval which should be avoided (e.g. intervals C and E), whereupon further training for improvement of skills could be necessary.

It is further possible to monitor the improvements of an operator and/or comparing operators with each other. This is illustrated in FIGS. 10 and 11, where FIGS. 10A and 11A are examples of operator behavior of an inexperienced person, and FIGS. 10B and 11B are examples of operator behavior of an experienced professional user of a piece of equipment 202. Specifically, FIGS. 10A and 10B compare the RPM charts like the one in FIG. 9 for two different operators to indicate information that can be gathered therefrom about the skill or technique of individual operators, according to some embodiments of the invention. These figures show how the beginner show in FIG. 10A, when compared to the experienced professional shown in FIG. 10B, spends a higher percentage of his time in start attempts, idling 1012/1022, in clutch engagement 1014/1024, and racing 1018/1028, and a smaller percentage of his time in the working zone 1016/1026. Furthermore, even when the beginner is in the working zone, the beginner spends time all over the working zone. In contrast, the experienced professional has very smooth transitions between RPM zones (equipment states) and consistently works around the same RPM. FIGS. 11A and 11B illustrate other RPM charts comparing the technique of the two different operators over a plurality of different periods of operation, according to some embodiments of the invention. The same trends can be seen here and it can further be seen that the beginner is not consistent from day to day, while the experienced professional is much more consistent, having similarly-shaped percentage time/RPM curves each day. Therefore, in some embodiments the data management server system 270 is configured to calculate statistical measures of operator performance for each operator by comparing the operator's RPM histogram or average RPM histogram to an "optimal" or baseline histogram distribution or histogram distribution range determined for each type or model of product through testing and/or by calculating a statistical measure of consistency in an operator's histogram over time for each product or product type. The values or a combination of these values that weights them differently can be displayed to a fleet manager and/or operator via the fleet management portal. Likewise, similar measures can be calculated using a histogram for a particular piece of equipment regardless of operator in order to automatically detect possible problems with the equipment as opposed to the operator of the equipment.

Collected data, such as RPM, could be used for assessing equipment status and serve as a basis for determining whether and when an individual piece of equipment should be inspected and/or served, as well as deciding if one or more components of a piece of equipment should be replaced. For instance by continuously registering the time when a particular piece of equipment has been run, e.g., in clutch engagement speed (i.e. within interval C) and summing up the total clutch engaging time, it is possible to set a threshold of total clutch time when it is required to have the equipment serviced. In a corresponding way the total time in each of the intervals A-E could be summed up and the information could be used in different ways to determine equipment status and take different actions.

For instance the working implement (e.g. the chain of a chain saw) is normally inspected or replaced after a certain time period and it is often possible to estimate an expected lifetime of a tool. Analyzing equipment history in the form of RPM information such as that shown in FIG. 9, allows for summing up of the total hours that an equipment's working implement has been in use—that is when the engine has been run within working speed interval D. At a particular threshold corresponding to a total work-time there is a certain likelihood of implement breakage (e.g. 50%). A controller in the data management server system 270 may set this threshold to a certain time-value, and have the machine inspected when this threshold is reached.

FIGS. 12A and 12B provide a process flow 1200 for using engine speed (e.g., RPM), cutting element speed (e.g., RPM), PTO speed, or the like to calculate various other equipment and/or operator metrics therefore, according to some embodiments of the invention. As illustrated by block 1205, the equipment data sensor 230 first senses engine speed (e.g., RPM of a crankshaft or other motor shaft) and/or PTO speed (e.g., RPM of cutting rotary cutting element) for a particular piece of equipment over a period of time for one or multiple operators. The PTO is the power-take-off unit present in some equipment for transmitting power from the engine to a working implement when the clutch is engaged (e.g., a cutting deck's belt and pulley drive system on a tractor or the like). Whether engine speed or PTO speed should be tracked and analyzed in the ways described herein depends on the type of equipment and the intended use for the data. However, the processes can be the same or similar for any RPM data or other data. With RPM data (or other speed data) alone or in combination with one or two other parameters, the data management server system 270 may be configured to calculate (exactly or approximately) numerous other useful parameters about the equipment, the operator, health and safety, and/or the like. Such parameters include operator performance, fuel consumption, emissions, noise, wear and tear, vibration, and/or the other parameters that can be, e.g. through testing, expressed as a function of RPM for the particular equipment model or type of equipment. Then the total or average parameter over some working period can be calculated for a piece of equipment and/or an operator since it is known how long each piece of equipment and each operator is at each RPM value or approximate value and the parameter value at each RPM value or approximate value.

For example, in some embodiments the data management server system 270 is configured to provide information about an operator's or a team of operators' work performance when using a particular piece of equipment. As illustrated by block 1210, the data management server system 270 determines engine on/off and clutch on/off from engine and/or PTO speed data. As illustrated by block 1212, the data management server system 270 creates a RPM chart (such as the one shown in FIG. 9) from sensed engine and/or PTO speed data. As illustrated by block 1214, the data management server system 270 then uses engine speed and/or PTO speed (e.g., rpm chart and/or engine and clutch on/off data) to determine operator performance for the type of equipment.

Figure 13A:
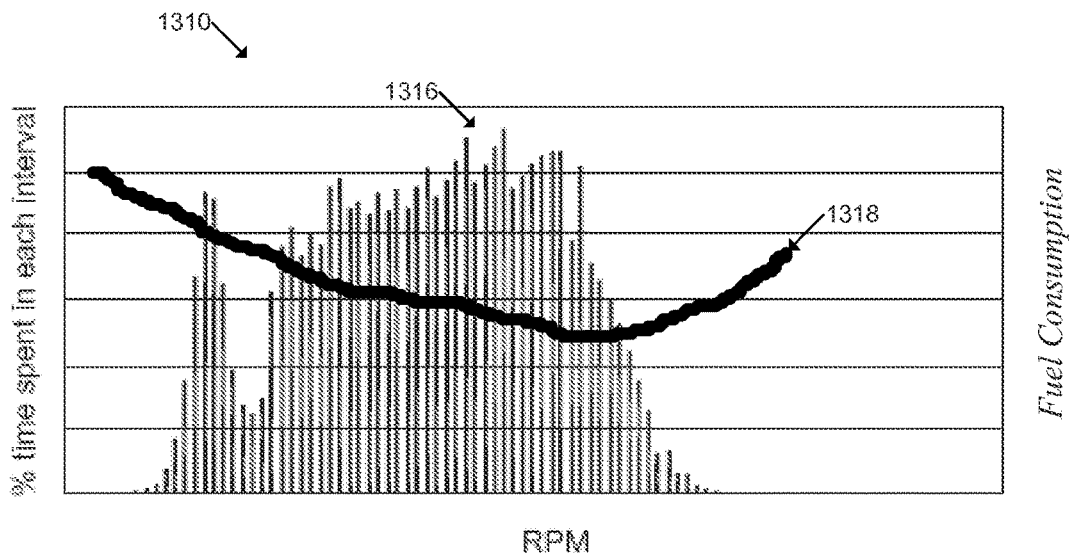

In some embodiments, the data management server system 270 is configured to estimate fuel consumption for a particular machine or operator over a defined period of time. As illustrated by block 1220, the equipment data sensor 230 may also sense throttle position in addition to RPM. As illustrated by block 1222, the data management server system 270, through testing, has stored in its memory fuel consumption for the type of equipment as a function of engine speed, throttle position, and/or PTO speed. For example, FIG. 13A shows an example of fuel consumption as a function 1318 of engine RPM for a particular piece of handheld outdoor power equipment. FIG. 13A also compares the fuel consumption curve 1318 to the engine RPM histogram 1316 so the viewer can see how, for this piece of equipment, fuel consumption is optimized somewhere in the designed working RPM range and is higher at the low and high RPM ranges. As illustrated by block 1224, the data management server system 270 may be configured to use the function and the sensed engine speed, throttle position, and/or PTO speed to estimate the fuel consumption of a particular piece of equipment or associated with a particular operator over the period of time.

Figure 13B:
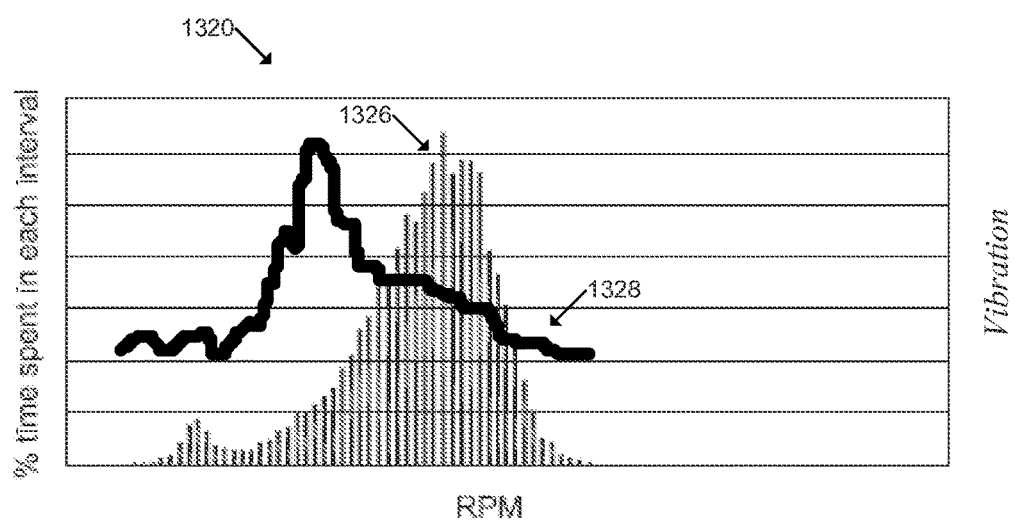
Figure 13C:
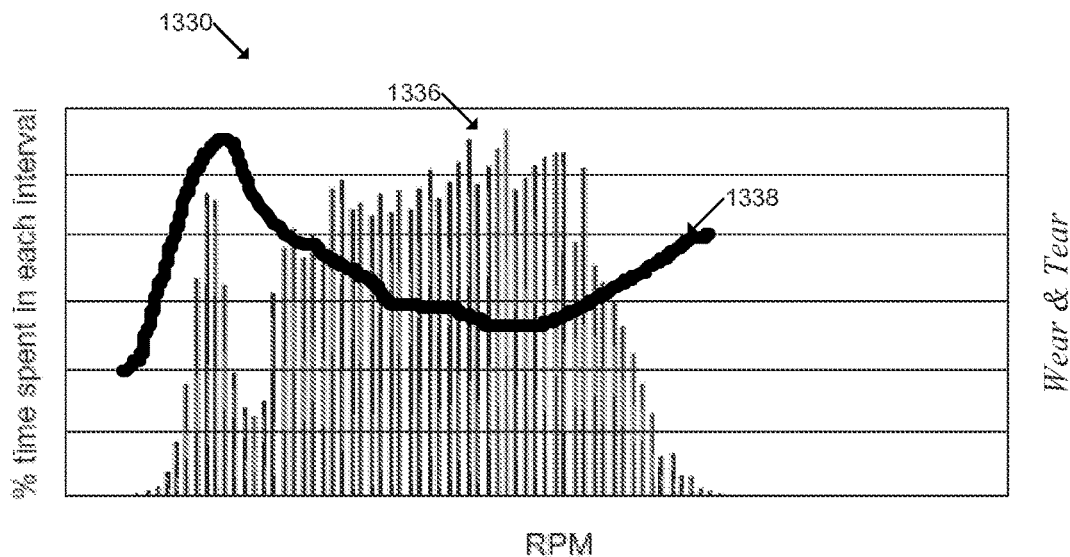

In some embodiments, the data management server system 270 is configured to estimate wear and tear for a particular machine or operator over a defined period of time. As illustrated by block 1230, the data management server system 270, through testing, may have a function stored in its memory that estimates wear and tear (e.g., maintenance requirements) for the type of equipment (or for a person) as a function of engine speed and/or PTO speed. For example, FIG. 13C shows an example of a wear & tear parameter as a function 1338 of engine RPM for a particular piece of handheld outdoor power equipment. FIG. 13C also compares the wear & tear curve 1338 to the engine RPM histogram 1336 so the viewer can see how, for this piece of equipment, wear & tear is minimized somewhere in the designed working RPM range and is higher at the clutch engagement and racing RPM ranges. As illustrated by block 1232, the data management server system 270 uses the function and sensed engine speed and/or PTO speed to estimate the wear and tear on a particular piece of equipment or associated with a particular operator over the period of time.

In some embodiments, the data management server system 270 is configured to estimate emissions for a particular machine or operator over a defined period of time. As illustrated by block 1240, the data management server system 270, through testing, may have stored in its memory a function that estimates engine emissions for the type of equipment as a function of engine speed and/or PTO speed. As illustrated by block 1242, the data management server system 270 uses the function and the sensed engine speed and/or PTO speed to estimate engine emissions associated with the particular piece of equipment or operator over the period of time.

In some embodiments, the data management server system 270 is configured to estimate vibration for a particular machine or operator over a defined period of time. As illustrated by block 1250, the data management server system 270, through testing, may have a function stored in its memory that estimates vibration for the type of equipment as a function of engine speed and/or PTO speed. For example, FIG. 13B shows an example of vibration as a function 1328 of engine RPM for a particular piece of handheld outdoor power equipment. FIG. 13B also compares the vibration curve 1328 to the engine RPM histogram 1326 so the viewer can see how, for this piece of equipment, vibration is maximum around the clutch engagement RPM range and is significantly lower at the low, high, and even the working RPM ranges. As illustrated by block 1252, the data management server system 270 uses the function and engine speed and/or PTO speed to estimate vibration levels associated with the particular piece of equipment or experienced by a particular operator over the period of time.

In some embodiments, the data management server system 270 is configured to estimate noise for a particular machine or operator over a defined period of time. As illustrated by block 1260, the data management server system 270, through testing, may have a function stored in its memory for estimating noise levels for the type of equipment as a function of engine speed and/or pto speed. As illustrated by block 1262, the data management server system 270 uses the function and engine speed and/or pto speed to estimate noise levels associated with the particular piece of equipment or experienced by a particular operator over the period of time.

Figure 13D:
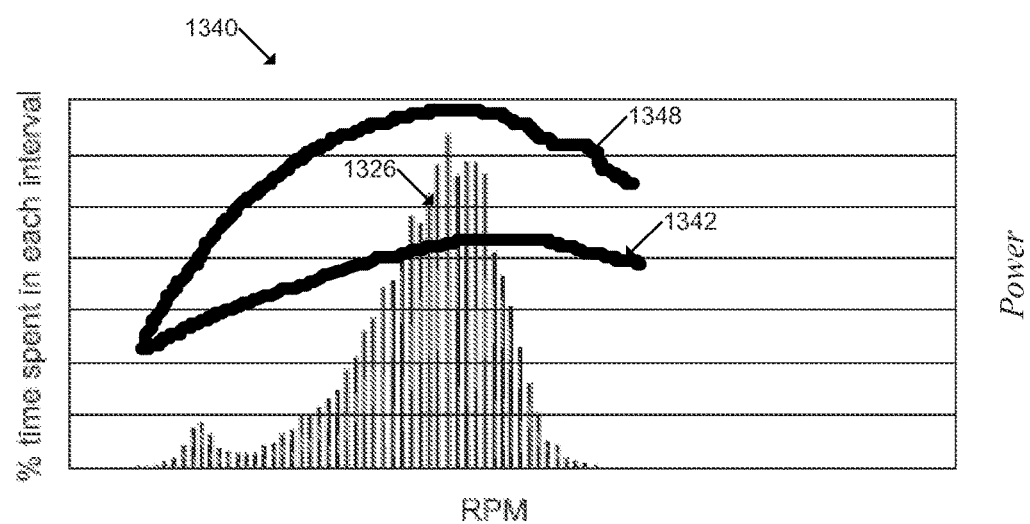

Once such parameters as operator performance, fuel consumption, emissions, noise, wear and tear, vibration, power (see e.g., FIG. 13D showing engine power and torque curves as a function of RPM and compared to the RPM histogram) and/or the like are estimated by the data management server system 270 in these ways, the data management server system 270 may use these estimates to: (i) graph the estimated parameters over time for the particular operator and/or particular piece of equipment and display the graph to a user of the fleet management portal, as illustrated by block 1280; (ii) determine, display, and utilize maximum, minimums, and totals of the parameters over a particular period of time for the particular operator and/or particular piece of equipment, as illustrated by block 1282; and (iii) send alerts to users electronically when estimated parameters reach certain benchmarks, as illustrated by block 1284.

In addition to RPM, the equipment data sensor 230 may be arranged to also obtain and register data relating to one or more of: vibration, fuel consumption, position of a throttle valve, oil temperature, battery voltage, oil pressure, transmission temperature, inclination of the machine, and/or geographic position of the machine. Also this information could be integrated into a diagram as the one seen in FIG. 9 or other graphs, meaning that a vast and extensive amount of information can be displayed providing many opportunities of retrieving information which will promote efficient fleet management. Yet another beneficial method for monitoring and evaluating running of a powered machine according to an embodiment of the invention is achieved by means of collecting and evaluating information about the RPM together with the geographic position, as will now be described. According to this method the machine comprises (in addition to a communication device) a GPS-unit for registering geographic positions of the machine in addition to data relating to the engine speed. According to this method, geographic position and engine speed are obtained and stored together with a time stamp during a certain operating time period while the operator is working in a specific area. Once maintenance is completed data is transmitted e.g. to a server, whereat the geographic positions are paired with the engine speed obtained. Thereafter the paired data is evaluated to determine, for each registered geographic position, whether the engine was in idle mode or in active operating mode. Based on the evaluation it is thereafter possible to determine the total area on which the machine was in active operating mode during the operating time period, meaning the controller can assess how much of a given area was actually treated (cut, mowed or landscaped). This is advantageous for instance if the area to be treated comprises land portions which are not to be treated (such as stones, lakes, etc.), which makes it rather difficult to estimate how large of an area was actually maintained. The method according to the invention provides a way of easily and quickly assessing the real area where active work was performed, which could be very advantageous for instance when relating performed work to cost (e.g. for an invoice).

Fleet Management Portal

FIGS. 14 through 25 provide screenshots of exemplary pages of the fleet management portal according to some embodiments of the invention. In one embodiment, as described above, this fleet management portal is hosted by the data management server system 270 and may be a web-based portal provided over the Internet and accessible by authorized users 203 via a login ID and a password. Accordingly, these pages are generally viewed on a display 294 of a client computing device 290. It will be appreciated that the fleet management server application 278 stored in the memory 276 of the data management server system 270 includes computer-readable program code that, when executed by the processing device 274 causes the processing device 274 to: generate the pages shown herein; use the database 280 of collected data and account data to perform the calculations required to provide the data and tools shown in the pages herein; use the database 280 of collected data and account data to perform other actions or create other feedback described herein; and/or receive and respond to user input entered into pages of the portal from a remote client computing device 290.

In some embodiments of the invention, a fleet owner first creates an account with, for example, a dealer of the equipment. Thereafter, some embodiments of the fleet management system are configured to be mostly "plug-and-play". For example, in some embodiments a fleet owner may only need to register an ID code of a particular ID unit to associate the ID code with the fleet owner's account. Once the unique ID code is registered, any equipment data sensor that reads the ID code from the ID unit and transmits data to the data management server system having the ID code therein causes the equipment associated with that equipment data code to be automatically added to the fleet owner's fleet of machines in the fleet management portal. In other embodiments, the equipment and equipment data sensors must be individually registered like the ID units in order to be associated with the fleet owner's account. In still other embodiments, the equipment and/or equipment data sensors are registered, but the ID units and associated ID codes are automatically associated with the fleet owner's account when they're read by a registered equipment data sensor.

FIG. 14 illustrates a fleet owner's home dashboard 1400 in the fleet management portal, in accordance with an embodiment of the invention. This may be, for example, the first page presented to the user each time the user logs in to the fleet management portal. As shown, the user can use buttons near the top of the dashboard 1400 to select between the other various areas and dashboards within the fleet management portal. The logo 1402 of the company that provides the fleet management service, which may be, for example, the manufacturer of the equipment and/or the equipment data sensors, may also be displayed near the top of the web page and throughout the fleet management portal.

The dashboard 1400 includes a graph 1420 showing productivity of the entire fleet for the last month. Specifically, this graph shows the total amount of engine time 1424 and cutting time 1422 recorded by the all of the fleet owner's machines for the last month. Because high productivity for cutting machinery (e.g., lawn mowers, chainsaws, trimmers, etc.) is often equivalent to maximizing cutting time while the engine is running, high productivity would be easily visible from this graph 1420 by the cutting time line 1422 being just slightly below the engine time line 1424.

The dashboard 1400 also includes a graph 130 comparing productivity of the teams that make up the fleet over time. Also, the dashboard 1400 includes a chart 1440 graphically showing the contractual age of the fleet's equipment and the number and age of three different types of warranty contracts that cover different portions of the fleet.

The dashboard 1400 also includes a summary of any warnings and new messages 1450. These individual notices can be selected to take the user to a page or pop-up that has more detail about the warning or notice. The dashboard 1400 also includes a notices about new purchases 1460 which may include new outdoor power equipment purchases or new fleet management system purchases (e.g., new tags or sensors). Also, a notice is provided showing the user if there are any unassigned operator tags 1470.

In some embodiments, the home dashboard 1400 is customizable to include whatever data from the other pages that fleet owner wants to see first or quickly when the fleet owner logs in. In some embodiments, the default home dashboard 1400 (and a users access rights in general) varies depending on the type of user (e.g., fleet owner, operator, owner-operator, corporate fleet owner, team manager, customer, dealer, manufacturer, repairman, etc.) since the data management server system 270 may have preset default account profiles for different types of users.

The user can select the machines link 1406 to be taken to the machine fleet overview dashboard 1500 shown in FIG. 15. The user can select the operators link 1408 to be taken to the operator fleet overview dashboard 2200 shown in FIG. 22.

FIG. 15 illustrates a fleet owner's machine fleet overview dashboard 1500 in the fleet management portal, in accordance with an embodiment of the invention. This dashboard provides an overview of the fleet owner's equipment at the current time and is updated with alerts and/or other information about the fleet of equipment as new data is received by the data management server system 270. Specifically, the dashboard 1500 shows a summary record 1530 for each piece of equipment.

This summary record 1530 may include an image 1532 (e.g., a photo or graphic) showing the actual machine, a generic image of the machine, or a generic image of the type of machine. This image 1532 may be stored in the memory 276 of the data management server system 270 and, for example, may be stock photos or graphics provided by the equipment manufacturer or dealer for each type and model of equipment. In some embodiments, this stock image can be replaced by an image of the actual piece of equipment taken by a user of the fleet management portal using a camera, if the user has the appropriate access rights.

The summary record 1530 may also include a name 1534 that identifies the particular piece of equipment. In some embodiments, this name 1534 may be automatically generated when a new piece of equipment is registered into the fleet management system. The automatically generated name may include a team identifier (if the equipment is associated with a particular team in the fleet), the equipment's product name and/or model number provided by the manufacturer, and/or a unique code to distinguish the equipment record from others in the fleet. In some embodiments, a user of the fleet management portal can instead create a customized name 1534 during registration or at other times if the user has the appropriate access rights. Here the name "Team 1 256BTX #1" 1534 includes a team identifier ("Team 1 "), an equipment model and type identifier ("256BTX"), and an identifier ("#1") that distinguishes this equipment from similar equipment on the same team. Combined, this name provides a unique identifier associated with this particular machine and its data record.

The summary record 1530 also includes two alert icons: a maintenance alert icon 1537 and a handling alert icon 1538. These icons light-up, flash, and/or are otherwise highlighted when there is some warning or new information that data management server system 270 determines that the user may be interested in.

The maintenance alert icon 1537 may, for example, alert the user to one or more maintenance or repair tasks that may be due or overdue for the particular machine, or may alert the user to a new problem that the machine is having that may require maintenance or repair. Such maintenance-related alerts may be based on: (i) service plans and/or historical service records stored in the memory 276 for the particular machine; (ii) data collected from the equipment data sensor 230 where the data management server system 270 automatically determines a possible maintenance or repair issue therefrom based on, for example, sudden changes in equipment performance; (iii) information entered into the fleet management portal by a user (e.g., a fleet mechanic) to alert the user to some particular maintenance or repair-related issue; (iv) a new product notice, recall, or service bulletin issued by the manufacturer, dealer, or repair company; and/or (v) other information stored in the memory 276.

The handling alert icon 1538 may alert the user to one or more problems associated with handling of the particular machine. Such handling-related alerts may be based on: (i) data collected from the equipment data sensor 230 where the data management server system 270 automatically determines a possible handling, operator, or safety issue therefrom based on, for example, preset rules stored in the memory that identify improper handling, proper handling, unauthorized use, etc.; (ii) bulletins issued by the manufacturer, a dealer, a regulatory agency, a trade association, and/or the like that regard handling of this machine; (iii) information entered into the fleet management portal by an operator or other user to alert the user to some particular handling-related issue; and/or (iv) other information stored in the memory 276.

The alert icons may not only alert the user to problems, but may also inform the user if there are no problems with the machine or if, for example, handling of the machine is being performed very well. For example, the icon may be configured to change colors to indicate information to the user. Bright red may indicate a significant problem, light red may indicate a minor problem, yellow may indicate important information, light green may indicate no known issues, and bright green may indicate something positive, like expert handling. In the illustrated example, the maintenance and handling alert icons 1537 and 1538 for the blower 1530 are not highlighted, but the maintenance and handling alert icons 1547 and 1548 for the brushcutter 1540 are highlighted. Clicking-on (or otherwise selecting) one of the alert icons 1547 or 1548 brings the user to another dashboard or pop-up window that shows the user the one or more alerts that prompted highlighting of the selected icon. In other embodiments of the invention, other icons may be provided to alert a user viewing the summary records to other information about the equipment. For example, an icon could appear over a portion of the image 1530 to indicate that the equipment is new, old, under warranty, not under warranty, etc.

The summary record 1530 may also include a button 1536 that directs the user to a machine summary page that shows more detail about the selected machine and the machine's performance and handling.

As illustrated, the machines may be sorted by equipment category and type, and then within each category by team. Equipment category buttons 1510 are provided and selecting a particular category button displays equipment in the viewing area of the dashboard 1500 that correspond to the selected category. For example, here the category buttons 1510 include a handheld equipment button 1511, a walk-behind equipment button 1512, and a ride-on equipment button 1513. Selection of the handheld equipment button 1511 displays the fleet's trimmers 1520, blowers 1522, and brushcutters 1524 in the viewing area of the dashboard 1500, as shown. Other handheld equipment displayed could include chainsaws and other cutting equipment, sprayers, edgers, hedge cutters, pole saws, augers, and/or the like. Selection of the walk-behind, equipment button 1512 may display the fleet's walk-behind mowers, brushcutters, tillers, dethatchers, seeders, stump grinders, aerators, snow throwers, and/or other walk-behind equipment. Selection of the ride-on equipment button 1513 may display the fleet's riding mowers (e.g., tractors, articulating riders, front-mount riders, zero-turns, stand-ons, cross mowers, etc.), brushcutters, tillers, dethatchers, seeders, aerators, snow throwers, plows, brushes, utility vehicles, and/or other ride-on equipment. Other categories may be provided in other embodiments, such as, for example, a robotic mower category and an accessories or attachments category.

Using buttons 1502 and 1504, the user can go back and forth between the thumbnail view (shown here) and a list view that lists the equipment and information about the equipment in a more text-based and/or compressed form (e.g., without the equipment images in each summary record).

Clicking-on or otherwise selecting an equipment summary record, such as the summary record 1540 for the brushcutter "Team 1 545RX #1", by selecting button 1546 brings the user to the machine summary dashboard 1600 shown in FIG. 16, in accordance with an embodiment of the invention. Referring now to FIG. 16, the machine summary dashboard 1600 provides detailed information about a particular selected piece of equipment in the fleet. As shown, the user can use buttons near the top of the dashboard 1600 to select between various machine-related dashboards, including machine summary 1604 (shown here in FIG. 16), work day log 1606 (shown in FIG. 17), handling 1608 (not shown, but which may display collected handling data such as the RPM charts described above), service plan 1610 (shown in FIG. 18), service history 1612 (shown in FIG. 19), and register service 1614 (for registering new equipment where it's not done automatically).

FIG. 17 illustrates a fleet owner's machine work day log dashboard 1700 in the fleet management portal, in accordance with an embodiment of the invention. The word day log dashboard 1700 includes a chart 1710 of equipment productivity that monitors how efficiently the equipment has been used on each day of a user-specified other period of time. The user enters a period of time using an input interface 1712 and then the data management server system 270 gets the appropriate data from the database for this equipment over the specified time period and plots total engine running time 1714 per day and total engine working time 1716 per day versus dates in the specified period.

The user can then select a data in the chart 1710 and then the date 1720 is displayed at the bottom of the page along with more details about productivity during the selected date. These details include the identity of the one or more operators 1722 that operated the equipment on that date. This may include an image of the operator(s), each operator's name, and each operator's team. A timeline 1724 is also provided, which details engine running time and engine working time by shading in time periods in the day's timeline 1724. In some embodiments, other operational states are shown in the timeline, such as engine idling, clutch engagement, safety risk events, misuse events, unauthorized use events, breakdowns, and/or the other data that may be useful in assessing operation of a particular machine. A key 1726 is provided so that the meaning of the shading in the timeline can be understood. Other information about operation of the equipment on this particular date may also be included, such as total engine running time 1728 and total engine working time 1729.

FIG. 18 illustrates a fleet owner's machine service plan dashboard 1800, in accordance with an embodiment of the invention. This dashboard 1800 shows the service plan for the selected piece of machinery. This service plan may be one of a plurality of service plans stored in the memory 280 for various pieces of equipment or types of equipment. These service plans may be provided by the manufacturer or dealer of the equipment and may be automatically linked to the service plan page of a particular piece of equipment based on the equipment's type, model, manufacturer, brand, etc. In one embodiment, the service plan linked to the equipment is based at least in part on the type of warranty or guarantee that came with the equipment or was purchased by the fleet owner for the fleet or the particular piece of equipment. In some embodiments, the service plan is customizable in that the user can modify the provided service plan or create a new service plan. In some embodiments, this service plan is followed by the data management server system 270 when determining whether to issue service alerts and the like. In this regard, the data management server system 270 compares, for example, total engine hours for the equipment to the hour milestones in the equipment's particular service plan to determine, in view of the equipment's service records, what services will be due soon, are due now, and/or are overdue. As illustrated, in some embodiments the service plan includes a first column 1802 that describes the part to be serviced, and then columns 1804 following that are for various consecutive hour milestones. Each cell 1808 in the service plan table thus corresponds to a particular part and hour milestone, and includes a description of the task due for this part at this milestone (e.g., verify, replace, clean, inspect, test, etc.). The parts may also be sorted by equipment system 1806 (e.g., engine, starter system, fuel system, PTO system, cutting system, etc.).

FIG. 19 illustrates a fleet owner's machine service history dashboard 1900, in accordance with an embodiment of the invention. FIGS. 20A, 20B, 20C, and 20D illustrate the process and interfaces used to allow a fleet owner to enter new service events into the fleet management portal, in accordance with an embodiment of the invention.

FIG. 21 illustrates a fleet owner's dashboard in the fleet management portal for pairing a particular operator with a particular operator ID code and ID unit, in accordance with an embodiment of the invention. FIG. 22 illustrates an operator fleet overview dashboard 2200 in the fleet management portal, in accordance with an embodiment of the invention. If the user selects a particular operator from the operator fleet overview dashboard 2200, the is directed to an operator overview dashboard 2300 for the selected operator as shown in FIG. 23, in accordance with an embodiment of the invention.

FIG. 24 illustrates a fleet owner's operator vibration dashboard 2400, in accordance with an embodiment of the invention. This dashboard 2400 includes a chart 2442 of the selected operator's vibration exposure per day over a user-specified period of time 2402. As described above, this data may be obtained from vibration sensors attached to the equipment data sensors 230 or estimated based on RPM data. As shown, the chart 2442 may also highlight areas of relatively high vibration exposures, which may be based industry standards, testing, studies, and/or average vibration data in the fleet management database 278 for peer operators. The dashboard 2400 also shows a value of average daily vibration exposure 2410 for the user-selected period. A link 2412 is also provided that takes the user to the library portion of the web portal so the user can choose to read more about vibration levels and acceptable levels of exposure.

FIG. 25 illustrates a fleet owner's operator machine handling dashboard 2500, in accordance with an embodiment of the invention. This dashboard 2500 includes a graph 2510 showing the operator's handling trends charted over a user-specified period of time 2502. These parameters may vary depending on the type of equipment that the operator has used. In the illustrated example, the graph 2510 uses the percentage of time spent each day running equipment at RPMs consistent with clutch engagement 2512 and racing speed 2514 (as described above with reference to the RPM charts) to determine if the operator performed at an "optimal," "good," "average," "poor," or "bad" level. In the case of racing speed 2514 and clutch engagement 2512, the less time spent in these RPM ranges per day, the better the operator's performance (and generally the higher the operator's skill).

If the user selects a particular date 2516 in the graph 2510 as shown in FIG. 25, the dashboard 2500 displays near the bottom of the page a chart 2522 showing the percentage time spent in different operational states (e.g., percentage time spent in different RPM ranges), such as idling 2530, clutch engagement 2532, working 2534, and racing 2536. This may be based, for example, on the RPM data and charts described herein above. This chart 2522 may also include indicators 2524 on the chart that show ideal or average levels or ranges for these parameters for different types of uses (e.g., lawn care and forestry). These ranges may be based on testing, industry standards, and/or on averages of data collected by the fleet management system 100 and stored in the fleet management database 280 for many accounts and operators. In this regard, the data management serve system 270 may also be able to automatically make certain conclusions or statements about the particular operator's performance over a certain time period by comparing it to certain rules, industry standards, test data, and/or averaged data across the database. FIG. 25 shows some such conclusions 2526 which here have indicators 2528 to also help the user quickly spot positive and negative statements about the operator's performance on this selected date.

The skilled person realizes that a large variety of modifications may be performed and are contemplated and made known or obvious by the above description. For instance, according to one aspect of the invention a machine which has been operated is arranged to be paired with the operator who has been running/handling the machine in order to later be able to evaluate e.g. performance for training purposes. This can be achieved in different ways. According to some embodiments of the invention, one way is to provide the machine with a communication device able to receive and store an ID-code associated with an operator. The ID-code can be transmitted to the communication device as an RF-signal, via WiFi or any other suitable communication signal. The communication device will subsequently send all registered information, including stored values of parameters associated with running of the machine and ID-code/s, to a server, and the pairing is thereafter done at a server-level. However, another possibility is that the operator actively identifies himself/herself to the communication device, for instance by means of submitting a code (e.g. a code number) by means of a keypad connected to the communication device or by means of biometrics, meaning the pairing is done already at the machine level and the communication device will register the proper user by means of registering said code number.

Yet another possibility is that the identification unit is a cell phone containing the ID-code in a data-packet which can be transmitted to the communication device, where the pairing between the operator and the machine is done either already in the cell phone or in the communication device which receives the ID-code from the cell phone. Common for many of the embodiments is the collection and storing of data associated with running of the machine, pairing of the machine with the operator and evaluating the information. Evaluation is preferably done in a server. The server may be a remote, stationary server e.g. in a control centre, or it may be a mobile smart phone which can be used in close connection to the working fleet.

In various example embodiments described herein, a device (e.g., an equipment data sensor 230, a data communication system 260, a data management server system 270, a client computing device 290, etc.), which may comprise one or more sub-devices, may execute certain functionalities described above by employing software. When software is employed, it should be understood that the software may function responsive to the operation of processing circuitry configured to execute the corresponding functionalities. In some embodiments, the processing circuitry may include at least a memory and a processor. The memory may include one or more non-transitory memory devices such as, for example, volatile and/or non-volatile memory that may be either fixed or removable. The memory may be configured to store information, data, applications, instructions or the like for enabling the corresponding device to carry out various functions in accordance with exemplary embodiments of the present invention. For example, the memory could be configured to buffer input data for processing by the processor. Additionally or alternatively, the memory could be configured to store instructions for execution by the processor. As yet another alternative, the memory may include one or more databases that may store a variety of data sets responsive to input from a sensor network or other devices described herein. Among the contents of the memory, applications may be stored for execution by the processor in order to carry out the functionality associated with each respective application.

The processor may be embodied in a number of different ways. For example, the processor may be embodied as various processing means such as one or more of a microprocessor or other processing element, a coprocessor, a controller or various other computing or processing devices including integrated circuits such as, for example, an ASIC (application specific integrated circuit), an FPGA (field programmable gate array), or the like. In an example embodiment, the processor may be configured to execute instructions stored in the memory or otherwise accessible to the processor. As such, whether configured by hardware or by a combination of hardware and software, the processor may represent an entity (e.g., physically embodied in circuitry—in the form of processing circuitry) capable of performing operations according to embodiments of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the operations described herein. As such, in some embodiments, the processor (or the processing circuitry) may be said to cause each of the operations or functions described in connection with the devices mentioned above by directing, responsive to the execution of corresponding instructions and/or algorithms, the storage, processing, generation, display, rendering, and/or communication of the data and/or information as described herein.

As will be appreciated by one of skill in the art, the present invention may be embodied as a method (including, for example, a computer-implemented process, a business process, and/or any other process), apparatus (including, for example, a system, machine, device, computer program product, and/or the like), or a combination of the foregoing. Accordingly, embodiments of the present invention may take the form of an entirely hardware embodiment, an entirely software embodiment (including firmware, resident software, micro-code, etc.), or an embodiment combining software and hardware aspects. Furthermore, embodiments of the present invention may take the form of a computer program product on a computer-readable medium having computer-executable program code embodied in the medium.

Any suitable transitory or non-transitory computer readable medium may be utilized. The computer readable medium may be, for example but not limited to, an electronic, magnetic, optical, electromagnetic, infrared, or semiconductor system, apparatus, or device. More specific examples of the computer readable medium include, but are not limited to, the following: an electrical connection having one or more wires; a tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device.

In the context of this document, a computer readable medium may be any medium that can contain, store, communicate, or transport the program for use by or in connection with the instruction execution system, apparatus, or device. The computer usable program code may be transmitted using any appropriate medium, including but not limited to the Internet, wireline, optical fiber cable, radio frequency (RF) signals, or other mediums.

Computer-executable program code for carrying out operations of embodiments of the present invention may be written in an object oriented, scripted or unscripted programming language such as Java, Perl, Smalltalk, C++, or the like. However, the computer program code for carrying out operations of embodiments of the present invention may also be written in conventional procedural programming languages, such as the "C" programming language or similar programming languages.

Embodiments of the present invention are described above with reference to flowchart illustrations and/or block diagrams of methods, apparatus (systems), and computer program products. It will be understood that each block of the flowchart illustrations and/or block diagrams, and/or combinations of blocks in the flowchart illustrations and/or block diagrams, may be implemented by computer-executable program code portions. These computer-executable program code portions may be provided to a processor of a general purpose computer, special purpose computer, or other programmable data processing apparatus to produce a particular machine, such that the code portions, which execute via the processor of the computer or other programmable data processing apparatus, create mechanisms for implementing the functions/acts specified in the flowchart and/or block diagram block or blocks.

These computer-executable program code portions may also be stored in a computer-readable memory that can direct a computer or other programmable data processing apparatus to function in a particular manner, such that the code portions stored in the computer readable memory produce an article of manufacture including instruction mechanisms which implement the function/act specified in the flowchart and/or block diagram block(s).

The computer-executable program code may also be loaded onto a computer or other programmable data processing apparatus to cause a series of operational steps to be performed on the computer or other programmable apparatus to produce a computer-implemented process such that the code portions which execute on the computer or other programmable apparatus provide steps for implementing the functions/acts specified in the flowchart and/or block diagram block(s). Alternatively, computer program implemented steps or acts may be combined with operator or human implemented steps or acts in order to carry out an embodiment of the invention.

As the phrase is used herein, a processor/processing device may be "configured to" perform a certain function in a variety of ways, including, for example, by having one or more general-purpose circuits perform the function by executing particular computer-executable program code embodied in computer-readable medium, and/or by having one or more application-specific circuits perform the function.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, combinations, and modifications of the just described embodiments can be configured without departing from the scope and spirit of the invention. Therefore, it is to be understood that, within the scope of the appended claims, the invention may be practiced other than as specifically described herein.

The invention claimed is:

1. A system comprising:
a communication device including a memory;
a powered machine provided with said communication device, the powered machine being a handheld outdoor power equipment and comprising an equipment data sensor and a GPS-unit for registering geographic positions of the powered machine and engine speed data of an engine of the powered machine;
an identification unit associated with an operator ID-code for an operator of the powered machine, the identification unit being a separate entity from the powered machine and configured to be worn or carried by the operator, wherein the identification unit is further configured to communicate said operator ID-code to the communication device; and
a server,
wherein the communication device is configured to obtain values of parameters associated with running of the powered machine, receive the operator ID-code, and store at least said values and said operator ID-code in said memory,
wherein the parameters associated with running of the powered machine include geographic positions of the operator and the engine speed data of the powered machine,
wherein the equipment data sensor comprises an RPM sensor that is configured to sense RPM of the engine of the powered machine,
wherein the RPM sensor comprises an RPM antenna that is configured to sense electromagnetic waves created by pulses when the engine is running,
wherein the pulses and frequency of the electromagnetic waves vary with the RPM of the powered machine and are used to sense the engine speed data,
wherein the communication device is further configured to: collect and evaluate the engine speed data together with the geographic positions of the operator, obtain and store the engine speed data and geographic positions of the operator together with a time stamp during an operating time period while the operator is working in a specific area, and transmit the obtained data to the server, and
wherein the server is configured to pair the geographic positions of the operator with the engine speed data obtained and determine, for each geographic position, whether the engine was in idle mode or in active operating mode.

2. A system as claimed in claim 1, wherein the parameters further include at least one of temperature, vibration exposure, fuel consumption, oil temperature, battery voltage, oil pressure, transmission temperature and inclination of the powered machine.

3. A system as claimed in claim 1, wherein said RPM is used for calculating an amount of vibration exposure during running of the powered machine.

4. A data collection system as claimed in claim 1, wherein the communication device is powered by being connected to at least one electromagnetic coil that is energized by at least one magnet provided on a rotating flywheel of the engine of the machine.

5. A system as claimed in claim 1, wherein the machine further includes a control module for at least controlling a fuel supply to the engine of the powered machine, wherein the communication device is connectable to or connected to the control module at least through a power supply connection so as to be supplied with power through said connection.

6. A system as claimed in claim 1, wherein the machine further includes a control module for at least controlling a fuel supply to the engine of the powered machine, wherein the communication device is configured to receive values of the at least one parameter from said control module.

7. A system as claimed in claim 1, wherein the machine further includes a throttle position sensor for sensing the position of a throttle valve of the engine of the powered machine, wherein the communication device is connectable to or connected to the throttle position sensor at least for sequentially obtaining values representing the position of the throttle valve.

8. A system as claimed in claim 1, wherein the machine further includes a control module for at least controlling a fuel supply to the engine of the powered machine, wherein the communication device is an integrated part of the control module.

9. A system as claimed in claim 1, wherein the communication device further comprises a warning system arranged to alert a user of the powered machine in response to said obtained parameters being indicative of poor performance of the powered machine.

10. A system comprising:
a communication device including a memory;
a powered machine provided with the communication device, the powered machine being a handheld outdoor power equipment and comprising an equipment data sensor and a GPS-unit for registering geographic positions of the powered machine and engine speed data of an engine of the powered machine;
an identification unit associated with an operator ID-code for an operator of the powered machine, the identification unit being a separate entity from the powered machine and configured to be worn or carried by the operator, wherein the identification unit is further configured to communicate the operator ID-code to the communication device; and a server system,
wherein the communication device is configured to obtain values of parameters associated with running of the powered machine, receive the operator ID-code, and store the values and the operator ID-code in the memory,
wherein the parameters associated with running of the powered machine include geographic positions of the operator and the engine speed data of the powered machine,
wherein the equipment data sensor comprises a processing device communicably coupled to transceivers, a battery, memory and sensors contained within a printed circuit board and communicably coupled to the processing device and configured to collect data related to the powered machine, and a GPS-unit for registering geographic positions of the powered machine, wherein one of the sensors of the equipment data sensor is an RPM sensor and is configured to sense RPM of the engine of the powered machine,
wherein the RPM sensor comprises an RPM antenna located on the printed circuit board and is configured to sense electromagnetic waves created by pulses when the engine is running, wherein the pulses and frequency of the electromagnetic waves vary with the RPM of the powered machine and are used to sense the engine speed data,
wherein the communication device is further configured to collect and evaluate the engine speed data together with the geographic positions of the operator, obtain and store the engine speed data and the geographic positions of the operator together with a time stamp during an operating time period while the operator is working in a specific area, and transmit the obtained data to the server system,
wherein the server system is configured to pair the geographic positions of the operator with the engine speed data obtained and determine, for each geographic position, whether the engine was in idle mode or in active operating mode, and
wherein the server system is further configured to estimate vibration as a function of the engine speed for the powered machine or operator over a defined period time.

11. A system as claimed in claim 10, wherein the parameters further include at least one of temperature, vibration exposure, fuel consumption, oil temperature, battery voltage, oil pressure, transmission temperature and inclination of the powered machine.

12. A system as claimed in claim 10, wherein the RPM is used for calculating an amount of vibration exposure during running of the powered machine.

13. A system as claimed in claim 10, wherein the communication device is powered by being connected to at least one electromagnetic coil that is energized by at least one magnet provided on a rotating flywheel of the engine of the machine.

14. A system as claimed in claim 10, wherein the machine further includes a control module for at least controlling a fuel supply to the engine of the powered machine, wherein the communication device is connectable to or connected to the control module at least through a power supply connection so as to be supplied with power through said connection.

15. A system as claimed in claim 10, wherein the machine further includes a control module for at least controlling a fuel supply to the engine of the powered machine, wherein the communication device is configured to receive values of the at least one parameter from said control module.

16. A system as claimed in claim 10, wherein the machine further includes a throttle position sensor for sensing the position of a throttle valve of the engine of the powered machine, wherein the communication device is connectable to or connected to the throttle position sensor at least for sequentially obtaining values representing the position of the throttle valve.

17. A system as claimed in claim 10, wherein the machine further includes a control module for at least controlling a fuel supply to the engine of the powered machine, wherein the communication device is an integrated part of the control module.

18. A system as claimed in claim 10, wherein the communication device further comprises a warning system arranged to alert a user of the powered machine in response to the obtained parameters being indicative of a predetermined performance of the powered machine.

* * * * *